United States Patent
Clay et al.

(10) Patent No.: US 12,551,582 B2
(45) Date of Patent: Feb. 17, 2026

(54) GRANZYME B DIRECTED IMAGING AND THERAPY

(71) Applicant: CytoSite Biopharma Inc., Sudbury, MA (US)

(72) Inventors: Julia Marie Clay, Indianapolis, IN (US); Hui Xiong, Indianapolis, IN (US); Kevin Michael Ruley, Indianapolis, IN (US); Francisco A. Valenzuela, Indianapolis, IN (US); Adam T. Hoye, Indianapolis, IN (US); Mark A. Castanares, Indianapolis, IN (US); James Kronauge, Sudbury, MA (US)

(73) Assignee: CytoSite Biopharma Inc., Boston, MA (US)

( * ) Notice: Subject to any disclaimer, the term of this patent is extended or adjusted under 35 U.S.C. 154(b) by 684 days.

(21) Appl. No.: 18/001,384

(22) PCT Filed: Jun. 9, 2021

(86) PCT No.: PCT/US2021/036661
§ 371 (c)(1),
(2) Date: Dec. 9, 2022

(87) PCT Pub. No.: WO2021/252664
PCT Pub. Date: Dec. 16, 2021

(65) Prior Publication Data
US 2024/0165278 A1    May 23, 2024
US 2024/0390530 A9    Nov. 28, 2024

Related U.S. Application Data

(60) Provisional application No. 63/036,918, filed on Jun. 9, 2020.

(51) Int. Cl.
A61K 51/04    (2006.01)
A61K 45/06    (2006.01)
C07D 487/04   (2006.01)
C07F 5/06     (2006.01)

(52) U.S. Cl.
CPC ......... *A61K 51/0482* (2013.01); *A61K 45/06* (2013.01); *A61K 51/0468* (2013.01); *C07D 487/04* (2013.01); *C07F 5/067* (2013.01); *A61K 2121/00* (2013.01); *A61K 2123/00* (2013.01)

(58) Field of Classification Search
CPC .......................... A61K 51/04; A61K 51/0468
See application file for complete search history.

(56) References Cited

U.S. PATENT DOCUMENTS

| 2002/0016321 A1 | 2/2002 | Karanewsky et al. |
| 2016/0083422 A1 | 3/2016 | Cameron |
| 2019/0224348 A1* | 7/2019 | Mahmood ................ C12Q 1/34 |

OTHER PUBLICATIONS

Fersing et al., A Comprehensive Review of Non-Covalent Radiofluorination Approaches Using Aluminum [18F]fluoride: Will [18F]AlF Replace 68Ga for Metal Chelate Labeling? Molecules. Aug. 7, 2019;24(16):2866.

Lasalle et al., Granzyme B PET imaging of immune-mediated tumor killing as a tool for understanding immunotherapy response. J Immunother Cancer. May 2020;8(1):e000291.

* cited by examiner

*Primary Examiner* — Michael G. Hartley
*Assistant Examiner* — Jagadishwar R Samala
(74) *Attorney, Agent, or Firm* — McDermott Will & Schulte LLP

(57) ABSTRACT

Compounds of Formula (I) and Formula (II), which are capable of binding to granzyme B. Also provided herein are pharmaceutical compositions comprising such for use in, for example, imaging Granzyme B and/or treating immunoregulatory abnormalities.

26 Claims, 8 Drawing Sheets

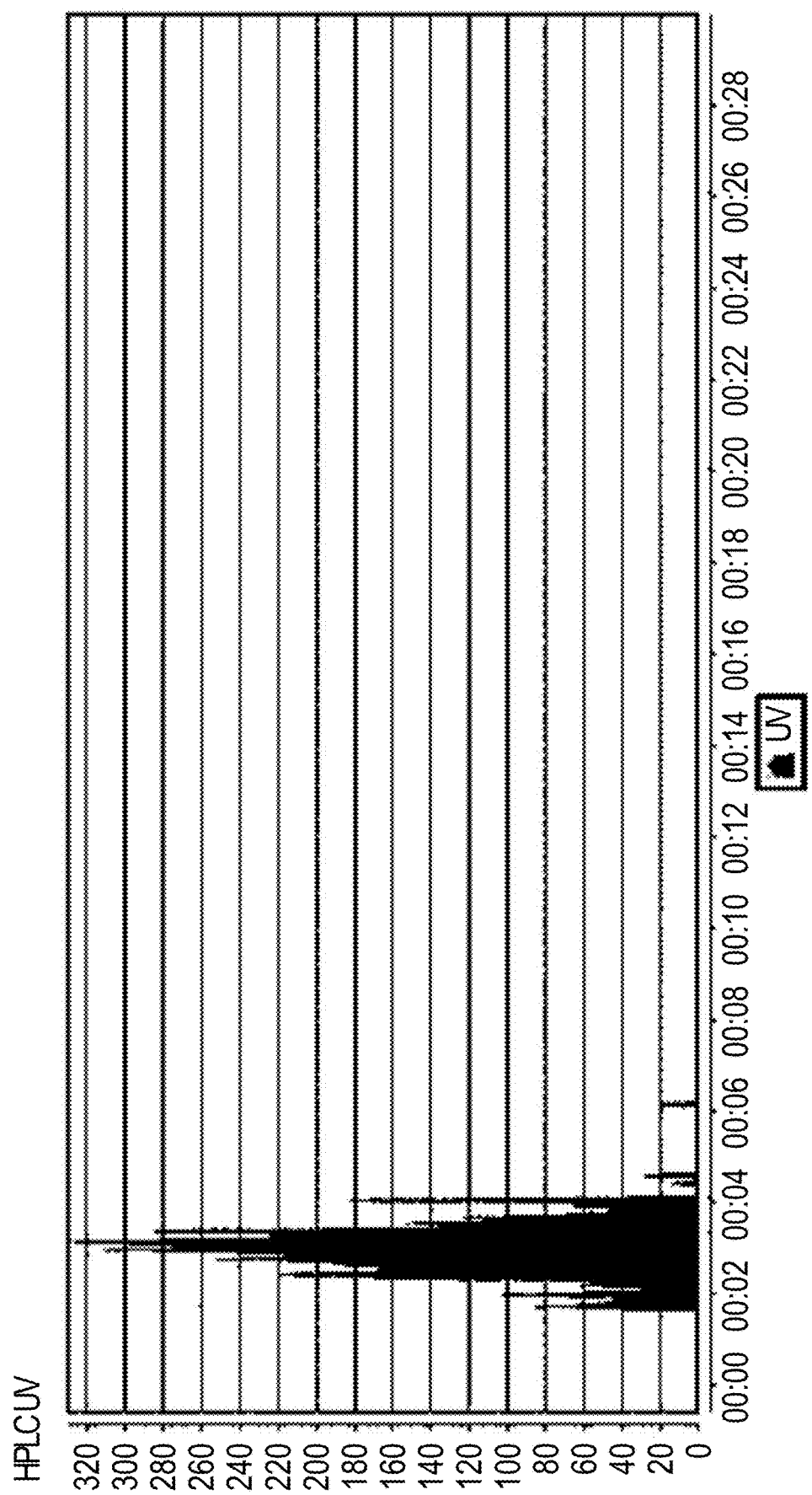

GRANZYME B DIRECTED IMAGING AND THERAPY

RELATED APPLICATIONS

The present application is a United States National Phase under 35 U.S.C. § 371 of International Application No. PCT/US2021/036661, filed Jun. 9, 2021, which claims the benefit of the filing date of U.S. Provisional Application No. 63/036,918, filed Jun. 9, 2020, both of which are incorporated by reference herein in their entirety.

TECHNICAL FIELD

This disclosure relates to compounds useful for imaging techniques, and more particularly to compounds that are useful for imaging Granzyme B using medical imaging, including positron emission tomography.

BACKGROUND

Granzyme B is a serine-protease most commonly found in the granules of natural killer cells and cytotoxic T cells. Granzyme B is released along with the pore-forming protein perforin at the immunological-synapse formed between T-cells and their targets. A portion of the released Granzyme B then enters cancer cells, primarily through perforin-pores, where it activates multiple substrates leading to activation of the caspase cascade. As a downstream effector of tumoral cytotoxic T cells, granzyme B has been used as an early biomarker for tumors responding to immunotherapy.

There is a need to develop new compounds that act as effective Granzyme B imaging agents, and therapies for treating immunoregulatory abnormality such as cancer.

SUMMARY

The present application provides specific compounds capable of targeting Granzyme B and uses thereof as imaging agents or therapy.

In one aspect, this disclosure features compounds, and pharmaceutically acceptable salts thereof, of formula (I):

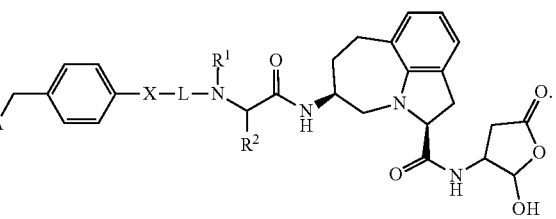

(I)

In Formula (I):
A is a chelating moiety;
X is —CH$_2$C(NH)—, —CH$_2$C(O)—, —CH$_2$C(S)—, —NHC(NH)—, —NHC(O)—, —NHC(S)—, —OC(NH)—, —OC(O)—, and —OC(S)—, optionally wherein X is —CH$_2$C(O)— or —NHC(S)—;
L is a peptide linker having 1-6 amino acid residues, inclusive;
R$^1$ is H or C$_{1-6}$ alkyl (e.g., methyl); and
R$^2$ is C$_{1-6}$alkyl or C$_{3-6}$ cycloalkyl.
In some examples, R$^1$ may be H. In other examples, R$^1$ may be methyl.
In some embodiments, the compound, or pharmaceutically acceptable salt thereof, is of formula (Ia):

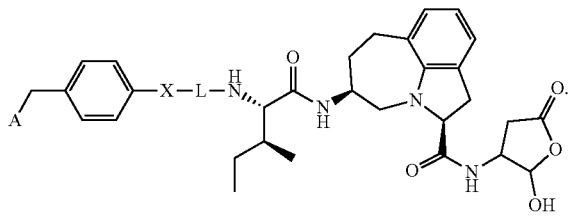

(Ia)

In some embodiments, L has 1-3 (1, 2 or 3) amino acid residues, inclusive. In one example, L includes 3 amino acid residues.

In some examples, the compound, or pharmaceutically acceptable salt thereof, is of formula (Ia-A):

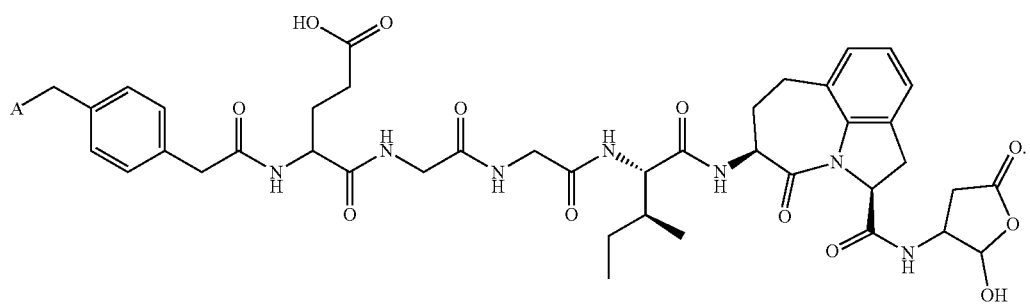

(Ia-A)

Alternatively, the compound, or pharmaceutically acceptable salt thereof, is of formula (Ia-B):

(Ia-B)

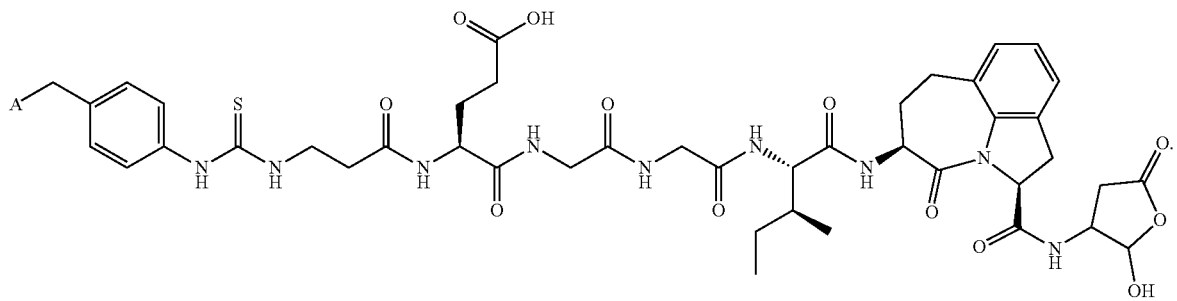

In any of the Formula (I) compounds disclosed herein, the chelating moiety A can be 1,4,7-triazacyclononane-N,N',N''-triacetic acid (NOTA). Alternatively, the chelating moiety A can be 1,4,7-triazacyclononane-4,7-diyl diacetic acid (NODA).

In specific examples, the compound, or pharmaceutically acceptable salt thereof, is any of Compounds 1-22 listed in Table 1 below.

In another aspect, the disclosure features a compound, or a pharmaceutically acceptable salt thereof, of formula (II):

(II)

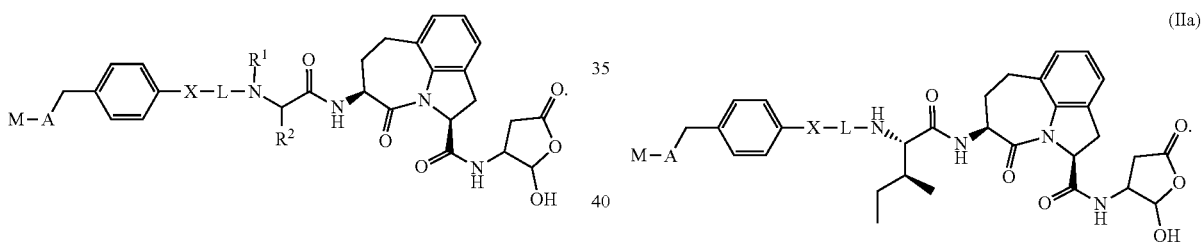

In Formula (II):
M is a metal or a metal linked to a radioisotope;
A is a chelating moiety chelating the metal;
X is selected from —CH$_2$C(NH)—, —CH$_2$C(O)—, —CH$_2$C(S)—, —NHC(NH)—, —NHC(O)—, —NHC(S)—, —OC(NH)—, —OC(O)—, and —OC(S)—, optionally wherein X is —CH$_2$C(NH)— or —NHC(S)—;
L is a peptide linker having 1-6 amino acid residues, inclusive;

$R^1$ is H or $C_{1-6}$ alkyl (e.g., methyl); and
$R^2$ is $C_{1-6}$ alkyl or $C_{3-6}$ cycloalkyl.

In some examples, $R^1$ may be H. In other examples, $R^1$ may be methyl.

In some embodiments, the compound, or pharmaceutically acceptable salt thereof, is of formula (IIa):

(IIa)

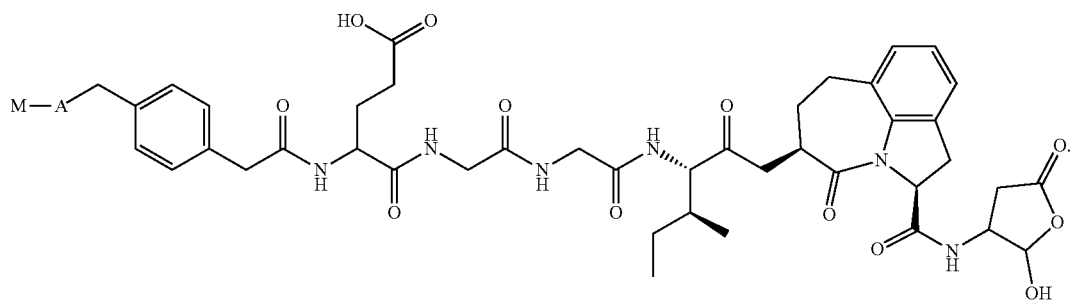

In some embodiments, L has 1-3 amino acid residues, inclusive (1, 2, or 3). In one example, L has 3 amino acid residues.

In some examples, the compound, or pharmaceutically acceptable salt thereof, is of formula (IIa-A):

(II-A)

In other examples, the compound, or pharmaceutically acceptable salt thereof, is of formula (IIa-B):

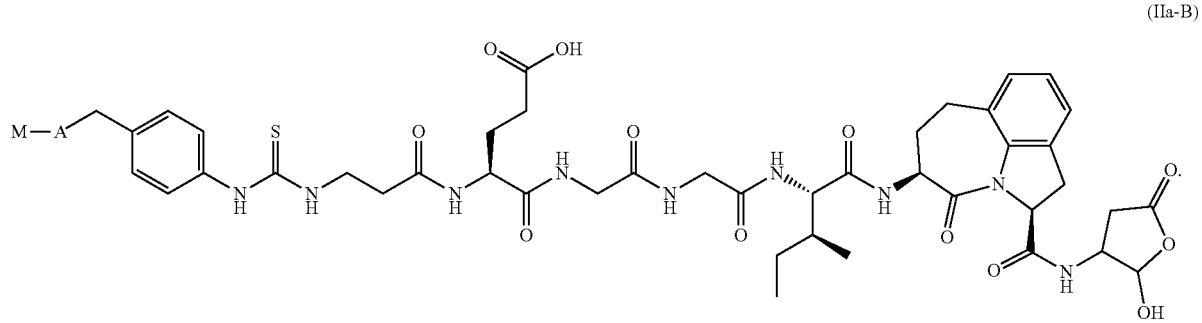

(IIa-B)

In any of the Formula (II) compounds disclosed herein, the chelating moiety can be 1,4,7-triazacyclononane-N,N', N"-triacetic acid (NOTA). In other examples, the chelating moiety can be 1,4,7-triazacyclononane-4,7-diyl diacetic acid (NODA).

Alternatively or in addition, the metal M in any of the Formula (II) compounds disclosed herein can be a radioisotope of Ga. In one example, the radioisotope of Ga is $^{68}$Ga. In other embodiments, the metal M in the Formula (II) compound disclosed herein can be Al, which is linked to a radioisotope. In one example, the radioisotope is $^{18}$F.

Specific examples of Formula (II) compounds provided here include any of the Compounds listed in Table 2 below.

In another aspect, this disclosure provides a composition comprising any of the Formula (I) or Formula (II) compounds disclosed herein, or or a pharmaceutically acceptable salt thereof, and a pharmaceutically acceptable carrier.

Further, the present disclosure provides a kit comprising: (i) a compound of Formula (I) or Formula (II), or a pharmaceutically acceptable salt thereof, disclosed herein; and (ii) one or more additional therapeutic agents. Also within the scope of the present disclosure is a combination therapy comprising the compound of Formula (I) or Formula (II) as disclosed herein, or a pharmaceutically acceptable salt thereof, and one or more additional therapeutic agents.

In another aspect, the present disclosure features a method of treating an immunoregulatory abnormality, the method comprising administering to a subject in need thereof a compound of Formula (II) as disclosed herein, and optionally one or more additional therapeutic agents.

Exemplary immunoregulatory abnormalities include, but are not limited to, an autoimmune disorder, an inflammatory disorder, a skin disorder, cancer, and a cardiovascular disorder. In one example, the immunoregulatory abnormality is cancer.

Exemplary therapeutic agents as disclosed herein include, but are not limited to, anti-inflammatory agents, steroids, immunotherapy agents, chemotherapeutic agents, and therapeutic antibodies.

In yet another aspect, the present disclosure features a method of imaging granzyme B in a cell or tissue, a sample, a cell or tissue sample. The method may comprise contacting the cell or tissue, the sample, the cell or tissue sample with a compound of Formula (II) as disclosed herein, or a pharmaceutically acceptable salt thereof, and imaging the cell or tissue, the sample, the cell or tissue sample with a suitable imaging technique, thereby imaging granzyme B in the cell or tissue, the sample, the cell or tissue sample. In some examples, the Formula (II) compound contains radioisotope $^{18}$F or $^{68}$Ga.

Also within the scope of the present disclosure are (a) pharmaceutical compositions comprising a compound of Formula (I) or Formula (II) and optionally one or more therapeutic agents as disclosed herein for use in imaging Granzyme B or treating an immunoregulatory abnormality; or (b) any of the compounds of Formula (I) or Formula (II), either alone or in combination of one or more therapeutic agents, for manufacturing a medicament for use in imaging Granzyme B or for treating a target disease as disclosed herein.

The details of one or more embodiments of the invention are set forth in the description below. Other features or advantages of the present invention will be apparent from the following drawings and detailed description of several embodiments, and also from the appended claims.

BRIEF DESCRIPTION OF THE DRAWINGS

The following drawings form part of the present specification and are included to further demonstrate certain aspects of the present disclosure, which can be better understood by reference to the drawing in combination with the detailed description of specific embodiments presented herein.

FIGS. 5A and 5B depict semi-preparative HPLC purification chromatograms of Compound $^{18}$F-20-Al Peak 1 and Peak 2 combined. FIG. 5A: HPLC Rad. FIG. 5B: HPLC UV.

FIG. 6A: HPLC Rad. FIG. 6B: HPLC UV.

DETAILED DESCRIPTION

Figure 1:
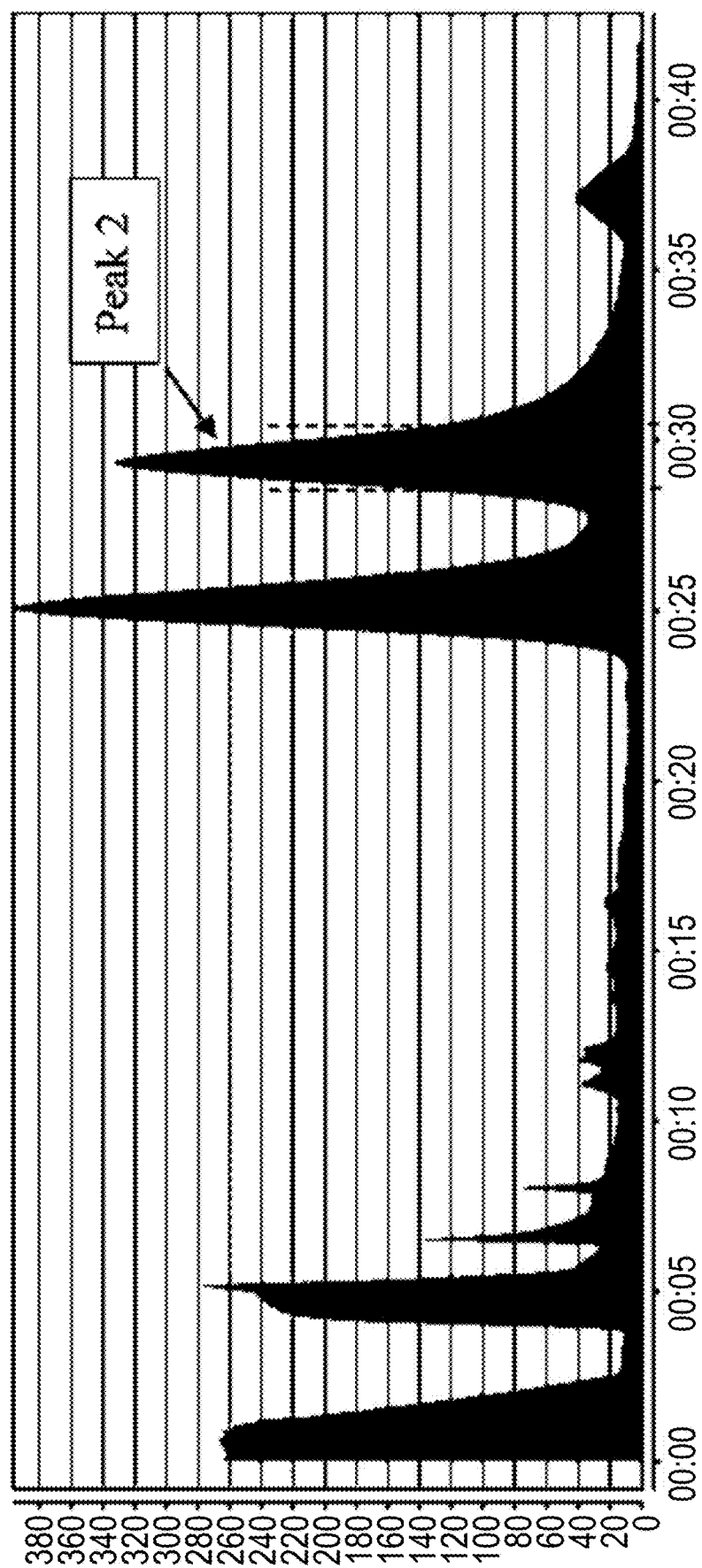
FIG. 1 depicts semi-preparative HPLC purification chromatogram of Compound $^{18}$F-7-Al Peak 2 via radiosynthesis with ORA Neptis Radiosynthesizer.

Cancer immunotherapies have represented a significant advance in cancer therapy over recent years. Antibodies directed against immune checkpoints such as programmed cell death protein 1 (PD-1) and cytotoxic t lymphocyte-associated protein 4 (CTLA-4) have been approved with positive outcomes for some patients. Research into the field of immune-oncology continues, with strategies including CAR-T cells, vaccines, small molecules, and antibodies under development. Despite the promise of these therapies, they are not a panacea. These immunotherapies can be associated with significant adverse events, which are costly, and the response rates are typically 20-50%, meaning the majority of patients do not respond to therapy. Furthermore, determining an individual patient's response to therapy can be challenging using conventional methods, as response is frequently associated with an immune-cell infiltrate that can make responding tumors appear to grow on anatomic imaging (e.g., CT, MRI), and demonstrate increased avidity with FDG-PET imaging due to the influx of metabolically active immune cells. Given the constraints of current imaging technologies, clinical studies for cancer immunotherapies typically employ overall survival as their study endpoint as opposed to progression-free survival.

Granzyme B, a downstream marker of cytotoxic T-cell activity, could serve as a novel biomarker to assess cancer immunotherapy efficacy. Granzyme B expression within a tumor can be assessed not only for CTL presence or absence, but also as an effector protein released by active T-cells that also integrates a measure of CTL activity, thus accounting for issues of T-cell exhaustion that make assessment of CTL presence difficult to accomplish.

The present application provides certain specific compounds, e.g., Formula (I) compounds and Formula (II) compounds, which show high binding affinity to Granzyme B. Such compounds can serve as Granzyme B imaging agents and can be used to identify patients who are responsive to an immunotherapeutic agent. Such compounds also can be used for therapeutic purposes, for example, in combination with one or more therapeutic agents such as immunotherapeutic agents.

Definitions

It is to be understood that the terminology employed herein is for the purpose of describing particular embodiments, and is not intended to be limiting. Further, although any methods, devices and materials similar or equivalent to those described herein can be used in the practice or testing of the invention, the preferred methods, devices and materials are now described. In addition to the foregoing, as used in the specification and appended claims, unless specified to the contrary, the following terms have the meaning indicated:

"Amino" refers to the —NH$_2$ radical.
"Cyano" refers to the —CN radical.
"Hydroxyl" refers to the —OH radical.
"Imino" refers to the =NH substituent.
"Nitro" refers to the —NO$_2$ radical.
"Oxo" refers to the =O substituent.
"Thioxo" refers to the =S substituent.
"Trifluoromethyl" refers to the —CF$_3$ radical.
"Alkyl" refers to a linear, saturated, acyclic, monovalent hydrocarbon radical or branched, saturated, acyclic, monovalent hydrocarbon radical, having from one to six carbon atoms, and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylpentyl, 2-methylpentyl and the like. An alkyl moiety may be unsubstituted. Alternatively, an alkyl moiety may be optionally substituted. An optionally substituted alkyl radical is an alkyl radical that is optionally substituted, valence permitting, by one, two, three, four, or five substituents independently selected from the group consisting of halo, cyano, nitro, aryl, cycloalkyl, heterocyclyl, heteroaryl, oxo, trimethylsilanyl, —OR$^3$, —OC(O)—R$^3$, —N(R$^3$)$_2$, —C(O)R$^4$, —C(O)OR$^3$, —C(O)N(R$^3$)$_2$, —N(R$^3$)C(O)OR$^5$, —N(R$^3$)C(O)R$^5$, —N(R$^3$)S(O)$_t$R$^5$ (where t is 1 or 2), —S(O)$_t$OR$^5$ (where t is 1 or 2), —S(O)$_p$R$^5$ (where p is 0, 1, or 2) and —S(O)$_t$N(R$^3$)$_2$ (where t is 1 or 2), where each R$^3$ is independently hydrogen, alkyl, haloalkyl, cycloalkyl, cycloalkylalkyl, aryl, aralkyl, heterocyclyl, or heteroaryl; each R$^4$ is independently hydrogen, cycloalkyl, aryl, heterocyclyl, or heteroaryl; and each R$^5$ is independently alkyl, haloalkyl, cycloalkyl, aryl, heterocyclyl, or heteroaryl.

"Cycloalkyl" refers to a stable non-aromatic monocyclic or polycyclic hydrocarbon radical having from three to fifteen carbon atoms, preferably having from three to ten carbon atoms, and which is saturated or unsaturated, and which attaches to the rest of the molecule by a single bond. A polycyclic hydrocarbon radical is bicyclic, tricyclic, or tetracyclic ring system. An unsaturated cycloalkyl contains one, two, or three carbon-carbon double bonds and/or one carbon-carbon triple bond. Monocyclic cycloalkyl radicals include, for example, cyclopropyl, cyclobutyl, cyclopentyl, cyclohexyl, cycloheptyl, and cyclooctyl. Polycyclic cycloalkyl radicals include, for example, adamantyl, norbornyl, decalinyl, and the like. A cycloalkyl moiety may be unsubstituted. Alternatively, a cycloalkyl moiety may be optionally substituted. An optionally substituted cycloalkyl is a cycloalkyl radical that is optionally substituted by one, two, three, four, or five substituents independently selected from the group consisting of alkyl, alkenyl, halo, haloalkyl, haloalkenyl, cyano, nitro, oxo, aryl, aralkyl, cycloalkyl, heterocyclyl, heteroaryl, —R$^4$—OR$^3$, —R$_4$—OC(O)—R$^3$, —R$^4$—N(R$^3$)$_2$, —R$^4$—C(O)R$^3$, R$^4$—C(O)OR$^3$, —R$^4$—C(O)N(R$^3$)$_2$, —R$^4$—N(R$^3$)C(O)OR$^5$, —R$^4$—N(R$^3$)C(O)R$^5$, —R$^4$—N(R$^3$)S(O)$_t$R$^5$ (where t is 1 or 2), —R$^4$—S(O)$_t$OR$^5$ (where t is 1 or 2), —R$^4$—S(O)$_p$R$^5$ (where p is 0, 1, or 2) and —R$^4$—S(O)$_t$N(R$^3$)$_2$ (where t is 1 or 2) where each R$^3$ is independently hydrogen, alkyl, haloalkyl, cycloalkyl, aryl, heterocyclyl, or heteroaryl; each R$^4$ is independently a direct bond or a linear or branched alkylene or alkenylene chain; and each R$^5$ is independently alkyl, haloalkyl, cycloalkyl, cycloalkylalkyl, aryl, aralkyl, heterocyclyl, or heteroaryl.

In some embodiments, preparation of compounds can involve the addition of acids or bases to affect, for example, catalysis of a desired reaction or formation of salt forms such as acid addition salts.

Exemplary acids can be inorganic or organic acids and include, but are not limited to, strong and weak acids. Some example acids include hydrochloric acid, hydrobromic acid, sulfuric acid, phosphoric acid, p-toluenesulfonic acid, 4-nitrobenzoic acid, methanesulfonic acid, benzenesulfonic acid, trifluoroacetic acid, and nitric acid. Some weak acids include, but are not limited to acetic acid, propionic acid, butanoic acid, benzoic acid, tartaric acid, pentanoic acid, hexanoic acid, heptanoic acid, octanoic acid, nonanoic acid, and decanoic acid.

Exemplary bases include lithium hydroxide, sodium hydroxide, potassium hydroxide, lithium carbonate, sodium carbonate, potassium carbonate, and sodium bicarbonate. Some example strong bases include, but are not limited to, hydroxide, alkoxides, metal amides, metal hydrides, metal dialkylamides and arylamines, wherein; alkoxides include lithium, sodium and potassium salts of methyl, ethyl and t-butyl oxides; metal amides include sodium amide, potassium amide and lithium amide; metal hydrides include sodium hydride, potassium hydride and lithium hydride; and metal dialkylamides include lithium, sodium, and potassium salts of methyl, ethyl, n-propyl, iso-propyl, n-butyl, tert-butyl, trimethylsilyl and cyclohexyl substituted amides.

As used herein, the phrase "pharmaceutically acceptable salts" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the present application include the conventional non-toxic salts of the parent compound formed, for example, from non-toxic inorganic or organic acids. The pharmaceutically acceptable salts of the present application can be synthesized from the parent compound, which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, non-aqueous media like ether, ethyl acetate, alcohols (e.g., methanol, ethanol, iso-propanol, or butanol) or acetonitrile (MeCN) are preferred. Lists of suitable salts are found in *Remington's Pharmaceutical Sciences*, 17th ed., Mack Publishing Company, Easton, Pa., 1985, p. 1418 and *Journal of Pharmaceutical Science*, 66, 2 (1977). Conventional methods for preparing salt forms are described, for example, in *Handbook of Pharmaceutical Salts: Properties, Selection, and Use*, Wiley-VCH, 2002.

In some embodiments, the compounds provided herein, or salts thereof, are substantially isolated. By "substantially isolated" is meant that the compound is at least partially or substantially separated from the environment in which it was formed or detected. Partial separation can include, for example, a composition enriched in the compounds provided herein. Substantial separation can include compositions containing at least about 50%, at least about 60%, at least about 70%, at least about 80%, at least about 90%, at least about 95%, at least about 97%, or at least about 99% by weight of the compounds provided herein, or salt thereof. Methods for isolating compounds and their salts are routine in the art.

The expressions, "ambient temperature" and "room temperature" or "rt" as used herein, are understood in the art, and refer generally to a temperature, e.g. a reaction temperature, that is about the temperature of the room in which the reaction is carried out, for example, a temperature from about 20° C. to about 30° C.

I. Granzyme B-Targeting Compounds

Provided herein are Granzyme B-targeting compounds disclosed herein, e.g., Formula (I) or Formula (II) compounds. The compounds disclosed herein encompass the compounds per se, their pharmaceutically acceptable salt thereof, and stereoisomers thereof.

Compounds described herein can comprise one or more asymmetric centers, and thus can exist in various isomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., Enantiomers, Racemates and Resolutions (Wiley Interscience, New York, 1981); Wilen et al., Tetrahedron 33:2725 (1977); Eliel, Stereochemistry of Carbon Compounds (McGraw-Hill, NY, 1962); and Wilen, Tables of Resolving Agents and Optical Resolutions p. 268 (E. L. Eliel, Ed., Univ. of Notre Dame Press, Notre Dame, IN 1972). The disclosure additionally encompasses compounds described herein as individual isomers substantially free of other isomers, and alternatively, as mixtures of various isomers.

A. Compounds of Formula (I)

In some embodiments, the disclosure provides compounds of Formula (I), shown below, which are capable of binding to Granzyme B with high binding affinity.

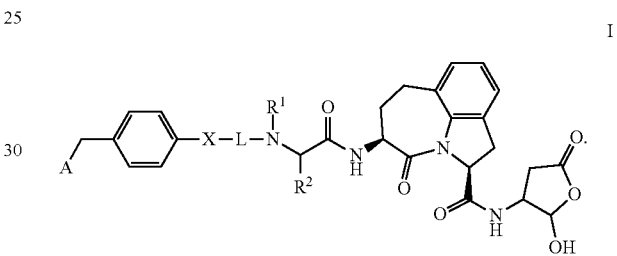

In Formula (I), A is a chelating moiety. Chelating moieties are those molecules or ions, which are able to act as a polydentate ligand to a metal ion. For example, molecules with multiple atoms with available lone pairs (including but not limited to nitrogen and oxygen) may act as chelating moieties. Chelating moieties may be linear (e.g., EDTA), or cyclic (including macrocycles e.g., DOTA, porphyrin) and may involve macrocyas commonly known in the art. Chelating moieties may have 2, 3, 4, 5, or 6 functional groups (e.g., amines, amides, hydroxyls, carboxylic acids etc.) with available lone pairs to coordinate with a metal. Exemplary chelating moieties for use in the Granzyme B-targeting compounds disclosed herein include, but are not limited to, 1,4,7-triazacyclononanetriacetic acid (NOTA), 1,4,7,10-tetraazacyclododecane-1,4,7,10-tetraacetic acid (DOTA), 1,4,7-triazacyclononane-1-glutaric acid-4,7-diacetic acid (NODAGA), ethylene diamine tetra-acetic acid (EDTA), diethylene triaminepentaacetic acid (DTPA), cyclohexyl-1,2-diaminetetraacetic acid (CDTA), ethyleneglycol-0,0'-bis (2-aminoethyl)-N,N,N',N'-tetraacetic acid (EGTA), N,N-bis (hydroxybenzyl)-ethylenediamine-N,N'-diacetic acid (HBED), triethylene tetramine hexaacetic acid (TTHA), hydroxyethyidiamine triacetic acid (HEDTA), 1,4,8,11-tetraazacyclotetradecane-N,N',N'',N'''-tetraacetic acid (TETA), 1,4,7,10-tetraaza-1,4,7,10-tetra-(2-carbamoyl methyl)-cyclododecane (TCMC), 1,4,7-triazacyclononane-4,7-diyl diacetic acid (NODA) and Desferrioxamine B (DFO). In some embodiments, the chelating agent is selected from the group consisting of 1,4,7-triazacyclononanetriacetic acid (NOTA), 1,4,7,10-tetraazacyclododecane-1,4,7,10-tetraacetic acid (DOTA), 1,4,7-triazacyclononane-4,7-diyl diacetic acid (NODA) and 1,4,7-triazacyclononane-1-glutaric acid-4,7-diacetic acid (NODAGA). In some embodiments, the chelating agent is 1,4,7-triazacyclononanetriacetic acid (NOTA). In other embodiments, the chelating agent is 1,4,7,10-tetraazacyclododecane-1,4,7,10-tetraacetic acid (DOTA). In some embodiments, the chelating agent is 1,4,7-triazacyclononane-4,7-diyl diacetic acid (NODA).

X can be —CH2C(NH)—, —CH2C(O)—, —CH2C(S)—, —NHC(NH)—, —NHC(O)—, —NHC(S)—, —OC(NH)—, —OC(O)—, or —OC(S)—. In one example, X is —CH$_2$C(O)—. In another example, X is —NHC(S)—.

L can be a peptide linker having 1-6 amino acid residues, inclusive. In some examples, L includes 1-3 amino acid residues, inclusive. In other examples, L includes 4-6 amino acid residues, inclusive. In one example, L includes 1 amino acid residue. In another example, L includes 2 amino acid. In yet another example, L includes 3 amino acid residues. Alternatively, L includes 4 amino acid residues. In still another example, L includes 5 amino acid residues. Alternatively, L includes 6 amino acid residues.

Compatible amino acid residues in the peptide linker L may include natural and non-natural amino acid residues (including (β-amino acid residues and D-amino acids) and is not limited to proteinogenic amino acid residues. Amino acid residues may form a chain through standard peptide bonds, or by forming amide bonds with compatible side chains (e.g., glutamic acid (e.g., D-Glu), aspartic acid). Exemplary peptide linkers include, but are not limited to Glu-Gly-Gly, D-Glu-β-Ala-β-Ala, Gly-Gly, Gly, Glu-Gly, Glu, D-Glu, Arg-Gly, Lys-Gly.

In some embodiments, $R^1$ is H. In other embodiments, $R^1$ is $C_{1-6}$ alkyl. For example, $R^1$ can be methyl.

In some embodiments, $R^2$ can be $C_{1-6}$ alkyl. Alternatively, $R^2$ can be $C_{3-6}$ cycloalkyl (e.g., branched or unbranched, substituted or unsubstituted) or $C_{3-6}$ cycloalkyl (e.g., cyclopropyl, cyclobutyl, cyclopentyl, cyclohexyl).

The hemiacetal unit in a compound of Formula (I) can be in an open chain aldehyde form. As a result, the compound of formula (I), can have the following structure:

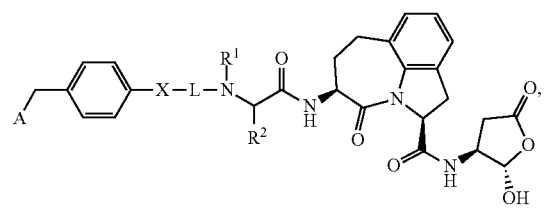

(I-1)

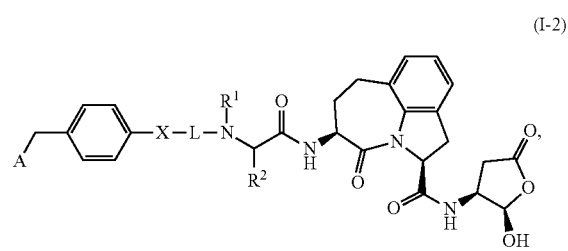

(I-2)

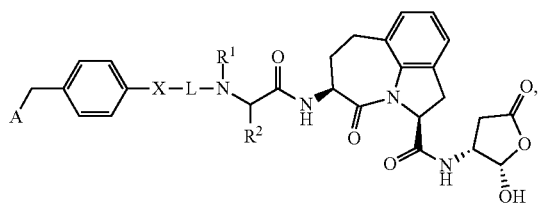

(I-3)

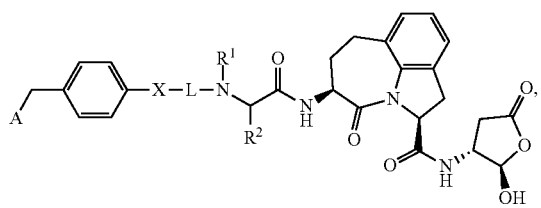

(I-4)

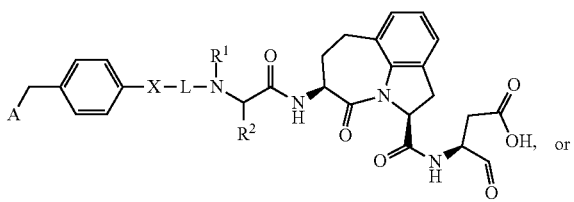

(I-5)

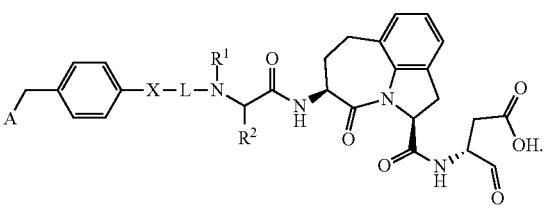

(I-6)

In any of Formulae (I-1) to (I-6), each of A, X, L, $R^1$ and $R^2$ is as described herein.

In some embodiments, $R^1$ is H, and $R^2$ is $C_4$ alkyl as in compounds of Formula (Ia):

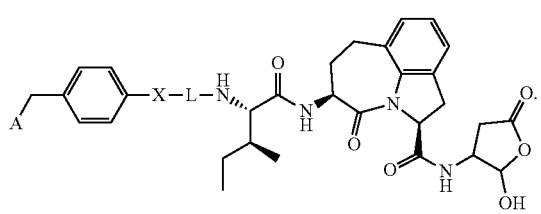

(Ia)

In some specific examples, X is —CH$_2$C(O)—, as in compounds of Formulae (Ia-A).

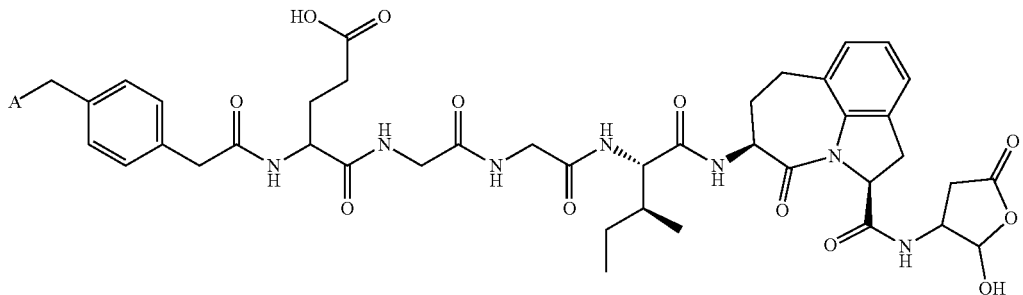
In other specific examples, X is —NHC(S)— as in compound of Formula (Ia-B):
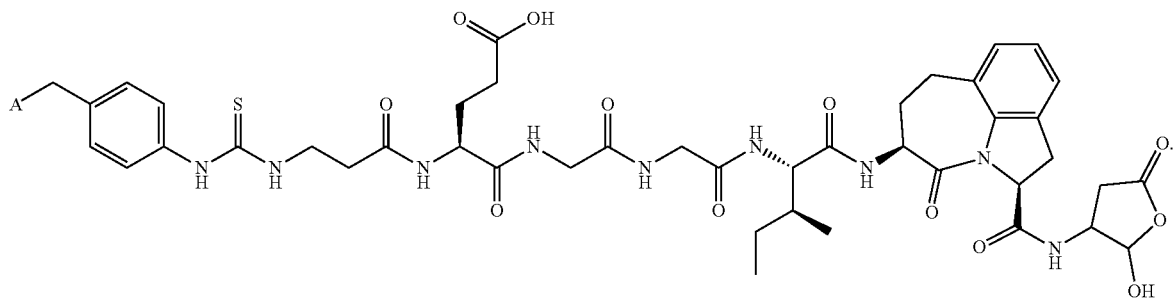
Exemplary compounds of Formula (I) include those listed in Table 1.
TABLE 1
Exemplary Compounds of Formula (I)
| Compounds | ID |
|---|---|
| | 1 |
| | 2 |

TABLE 1-continued

Exemplary Compounds of Formula (I)

| Compounds | ID |
|---|---|
| | 3 |
| | 4 |
| | 5 |
| | 6 |
| | 7 |
| | 8 |

TABLE 1-continued

Exemplary Compounds of Formula (I)

| Compounds | ID |
|---|---|
| | 9 |
| | 10 |
| | 11 |
| | 12 |
| | 13 |

TABLE 1-continued

Exemplary Compounds of Formula (I)

| Compounds | ID |
|---|---|
| | 14 |
| | 15 |
| | 16 |
| | 17 |
| | 18 |
| | 19 |

In some examples, the compound of Formula (I) is Compound 1, 2, 3, 4, 5, 6, 7, 9, 10, 11, 12, 13, 17, or 18. In one specific example, the compound of Formula (I) is Compound 7.

B. Compounds of Formula (II)

In some embodiments, the disclosure provides for compounds of Formula (II), shown below, which are capable of binding to Granzyme B with high binding affinity and specificity.

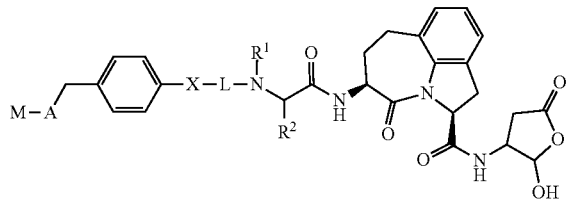

(II)

In Formula (II), M is a metal or a metal linked to a radioisotope. Suitable metals for use in the present disclosure include those which are useful in imaging Granzyme B, for instance metals which are suitable radioimaging agents, as well as metals which can bind non-metal radioisotopes which are suitable radioimaging agents. An exemplary metal radioisotope is $^{68}$Ga. An exemplary non-metallic radioisotope is $^{18}$F, which may be conjugated with Al for loading into the Granzyme B binding compounds disclosed herein Each of A, X, L, $R^1$, and $R^2$ is as defined herein. See, e.g., the section titled Compounds of Formula (I) above.

Exemplary compounds with radioisotopes include those in Table 2.

TABLE 2

Exemplary Compounds of Formula (II)

| Compounds | ID |
|---|---|
| | 1-Al |
| | 2-Al |
| | 3-Al |

TABLE 2-continued
Exemplary Compounds of Formula (II)
| Compounds | ID |
|---|---|
| 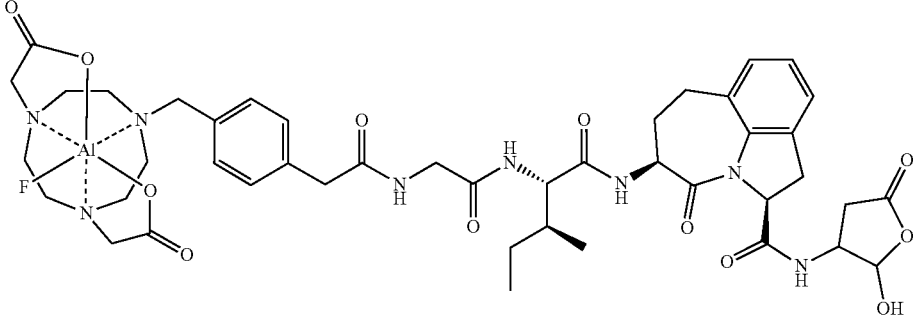 | 4-Al |
| 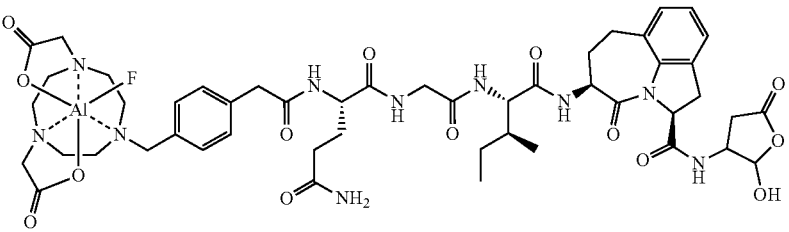 | 5-Al |
| 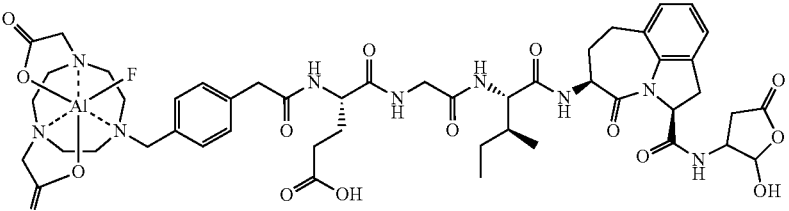 | 6-Al |
| 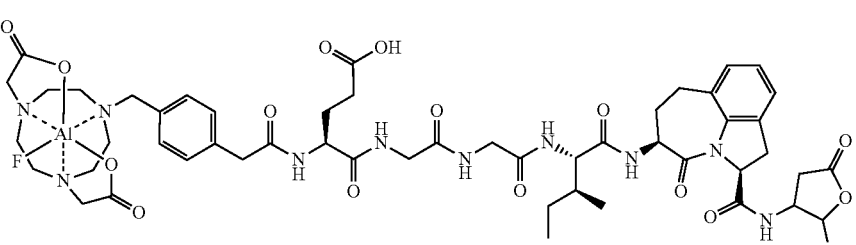 | 7-Al |
| 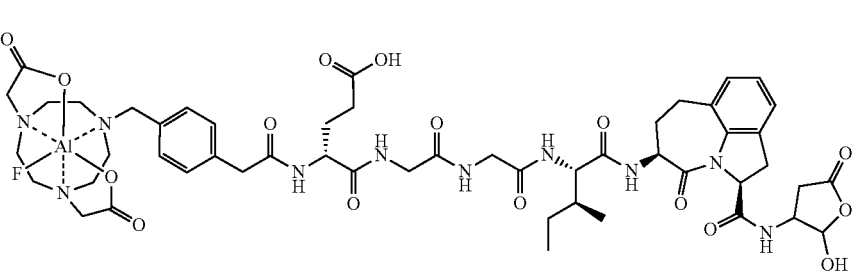 | 8-Al |

TABLE 2-continued

Exemplary Compounds of Formula (II)

| Compounds | ID |
|---|---|
| | 9-Al |
| | 10-Al |
| | 11-Al |
| | 12-Al |
| | 13-Al |

TABLE 2-continued
Exemplary Compounds of Formula (II)
| Compounds | ID |
|---|---|
| 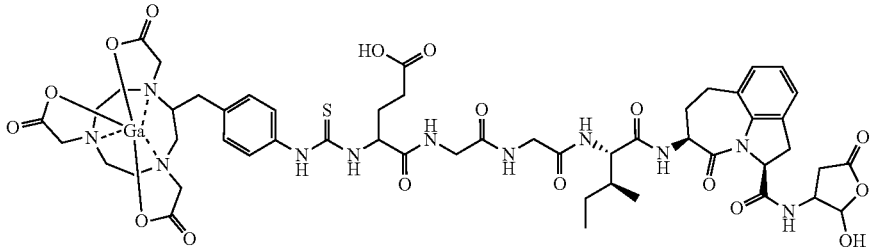 | 14-Ga |
| 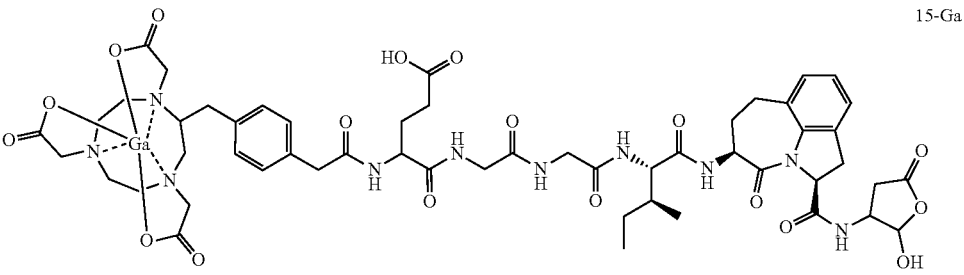 | 15-Ga |
| 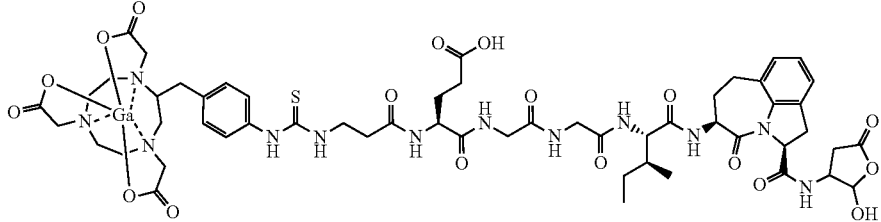 | 16-Ga |
| 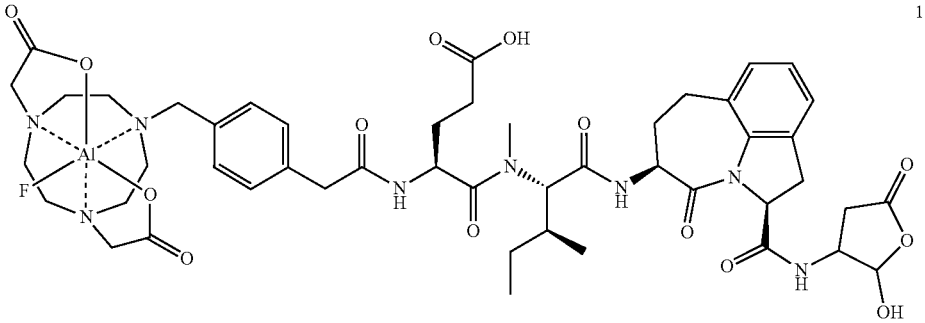 | 17-Al |
| 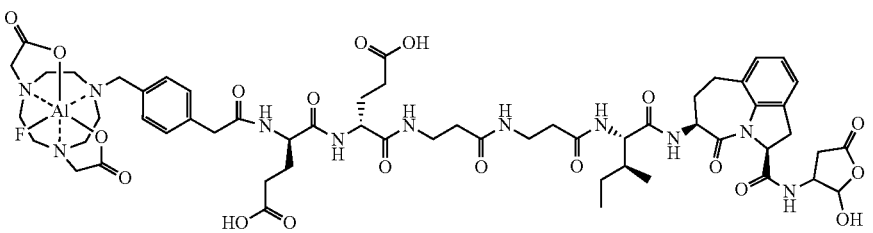 | 18-Al |

TABLE 2-continued

Exemplary Compounds of Formula (II)

| Compounds | ID |
|---|---|
| 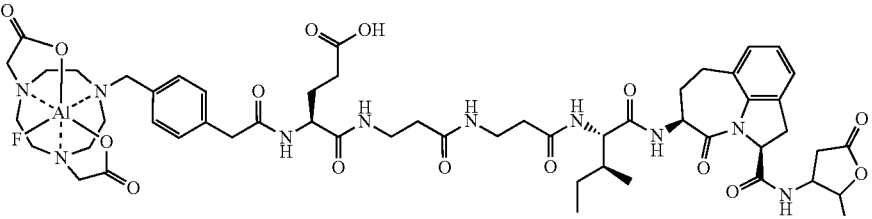 | 19-Al |

In some examples, the compound of Formula (II) is Compound 1-Al, 2-Al, 3-Al, 4-Al, 5-Al, 6-Al, 7-Al, 9-Al, 10-Al, 11-Al, 12-Al, 13-Al, 17-Al, or 18-Al. In one example, the compound of Formula (II) is Compound 7-Al, which may be loaded with $^{18}$F.

Also within the scope of the present disclosure are variants of the Formula (I) and Formula (II) compounds disclosed herein, wherein the lactone ring in a Formula (I) or Formula (II) compound can be substituted with other moieties, e.g., aryl rings, heteroaryl rings etc. In a specific embodiment, a variant may have the following structure:

provided herein. In addition, the radioisotope-containing compounds provided herein may also be useful in one or more therapeutic applications, when administered to a subject in a therapeutically effective amount. For example, the above compounds containing $^{18}$F may be useful as imaging agents (e.g., as non-toxic and/or non-therapeutic radioisotopes) when administered to the subject at low concentrations (e.g., 5 mCi). In some embodiments the isotope can be toxic. As pointed out above, the present application also includes pharmaceutically acceptable salts of the compounds described herein. The phrase "pharmaceutically (Compound 20)

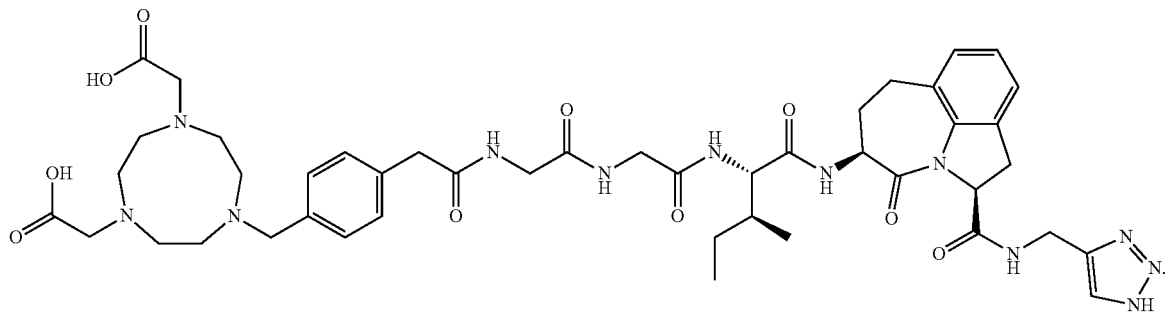

The above variant compound may be loaded with a metal, which may be conjugated with a radioisotope, (e.g., $^{18}$F). One example is provided below:

acceptable" is employed herein to refer to those compounds, materials, compositions, and/or dosage forms which are, within the scope of sound medical judgment, suitable for use (Compound 20-Al)

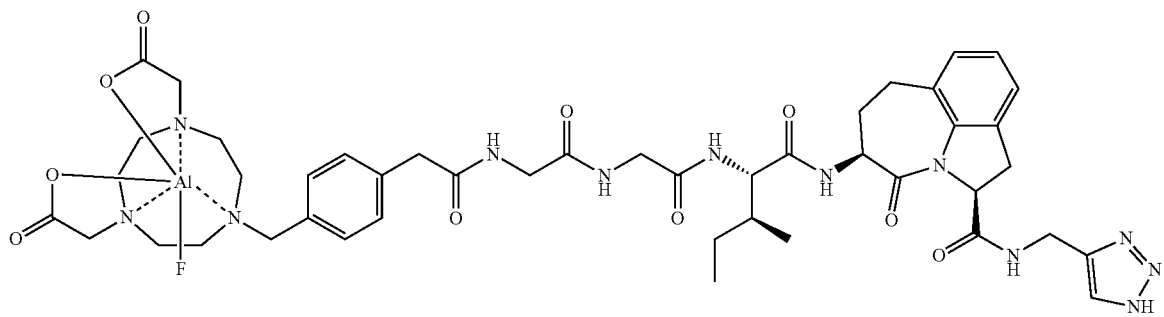

The above compounds containing a radioisotope are useful as imaging agents in one or more of the methods in contact with the tissues of human beings and animals without excessive toxicity, irritation, allergic response, or other problem or complication, commensurate with a reasonable benefit/risk ratio.

The present application also includes stereoisomers of the compounds, such as stereoisomers of Compounds 7 and 7-Al described herein. See below. The stereoisomers result from the two chiral centers (closed ring) or one chiral center (open chain) of the hemiacetal unit as indicated by the wiggle lines.

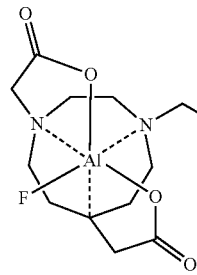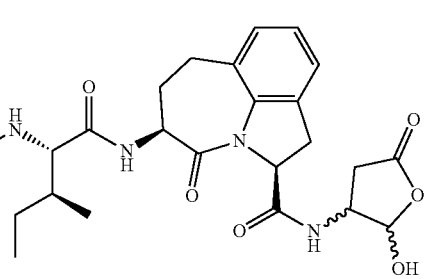

C. Chemical Synthesis of Granzyme B-Targeting Compounds

As will be appreciated, the compounds provided herein, including stereoisomers and salts thereof, can be prepared using known organic synthesis techniques and can be synthesized according to any of numerous possible synthetic routes.

The compounds disclosed herein, or a pharmaceutically acceptable salt thereof, can be prepared by following the exemplary protocols described below. Appropriate protective groups for use in such syntheses are known in the field. See, e.g., McOmie, *Protective Groups in Organic Chemistry*, (1973):98. Briefly, synthesis of a Granzyme B targeting compound as disclosed herein may involve the following processes: A) coupling (e.g., peptide coupling) a desired tricycle (e.g., in Formula (I)) to a resin and deprotecting the tricycle; B) attaching any of the L peptide linker (which may be formed by repeated coupling of amino acid residues to a desired length, to the resin-bound tricycle to form a tricycle-peptide linker moiety; and C) coupling the tricycle-peptide linker moiety to a chelating moiety to form a compound of Formula (I), which can be cleaved form the resin followed optionally by D) chelating a metal with the Formula (I) compound to form a compound of Formula (II).

For example, in step A, a tricycle as found in the compounds of Formulae (I) and (II) (e.g., Fmoc-Haic(2S, 5S)—OH) can be coupled to a resin (e.g., H-Asp(OtBu)-H) and deprotected. In step B, the free amine of the tricycle can then be coupled with an Fmoc protected amino acid (e.g., isoleucine) and the Fmoc can then be removed. The resulting free amine can be coupled to a desired number of amino acids using conventional peptide synthesis methods to arrive at the tricycle-peptide linker moiety. Fmoc protection and deprotection can be performed in each round of amino acid residue addition. In step C, a chelating moiety with a terminal coupling group (e.g., carboxylic acid, carbamothioic O-acid, isothiocyanate, or thiocyanate) can be coupled to the final free amine of the amino acid chain in the tricycle-peptide linker moiety to produce a compound of Formula (I), which can be freed from the resin and purified, if needed. The compound of Formula (I) thus prepared can then be chelated with a metal as disclosed herein (e.g., Ga, Al) to produce a compound of Formula (II). Illustrative examples for synthesizing exemplary Formula (I) and Formula (II) compounds are provided in Examples below. In an alternative embodiment of step C, the compounds may be cleaved from the resin prior to coupling to a chelating moiety.

Many appropriate imaging agents (e.g., radioisotopes) are known in the art (see, for e.g., U.S. Pat. Nos. 5,021,236; 4,938,948; and 4,472,509, the disclosure of each of which is incorporated herein by reference in its entirety). Radioactively labeled compounds, or a pharmaceutically acceptable salt thereof, provided herein may be prepared according to well-known methods in the art. Synthetic methods for incorporating radioisotopes into organic compounds are well known in the art, and one of ordinary skill in the art will readily recognize other methods applicable for the compounds provided herein.

It will be appreciated by one skilled in the art that the processes described herein are not the exclusive means by which compounds provided herein may be synthesized and that a broad repertoire of synthetic organic reactions is available to be potentially employed in synthesizing compounds provided herein. The person skilled in the art knows how to select and implement appropriate synthetic routes. Suitable synthetic methods of starting materials, intermediates and products may be identified by reference to the literature, including reference sources such as: *Advances in Heterocyclic Chemistry*, Vols. 1-107 (Elsevier, 1963-2012); *Journal of Heterocyclic Chemistry* Vols. 1-49 (Journal of Heterocyclic Chemistry, 1964-2012); Carreira, et al. (Ed.) *Science of Synthesis*, Vols. 1-48 (2001-2010) and Knowledge Updates KU2010/1-4; 2011/1-4; 2012/1-2 (Thieme, 2001-2012); Katritzky, et al. (Ed.) *Comprehensive Organic Functional Group Transformations*, (Pergamon Press, 1996); Katritzky et al. (Ed.); *Comprehensive Organic Functional Group Transformations II* (Elsevier, $2^{nd}$ Edition, 2004); Katritzky et al. (Ed.), *Comprehensive Heterocyclic Chemistry* (Pergamon Press, 1984); Katritzky et al., *Comprehensive Heterocyclic Chemistry II*, (Pergamon Press, 1996); Smith et al., *March's Advanced Organic Chemistry: Reactions, Mechanisms, and Structure*, $6^{th}$ Ed. (Wiley, 2007); Trost et al. (Ed.), *Comprehensive Organic Synthesis* (Pergamon Press, 1991).

The reactions for preparing compounds described herein can be carried out in suitable solvents which can be readily selected by one of skill in the art of organic synthesis. Suitable solvents can be substantially non-reactive with the starting materials (reactants), the intermediates, or products at the temperatures at which the reactions are carried out, (e.g., temperatures which can range from the solvent's freezing temperature to the solvent's boiling temperature). A given reaction can be carried out in one solvent or a mixture of more than one solvent. Depending on the particular reaction step, suitable solvents for a particular reaction step can be selected by the skilled artisan.

Preparation of the compounds described herein can involve the protection and deprotection of various chemical groups. The need for protection and deprotection, and the selection of appropriate protecting groups, can be readily determined by one skilled in the art. The chemistry of protecting groups can be found, for example, in T. W. Greene and P. G. M. Wuts, *Protective Groups in Organic Synthesis*, 3$^{rd}$ Ed., Wiley & Sons, Inc., New York (1999).

Reactions can be monitored according to any suitable method known in the art. For example, product formation can be monitored by spectroscopic means, such as nuclear magnetic resonance spectroscopy (e.g., $^1$H or $^{13}$C), infrared spectroscopy, spectrophotometry (e.g., UV-visible), mass spectrometry, or by chromatographic methods such as high performance liquid chromatography (HPLC), liquid chromatography-mass spectroscopy (LCMS), or thin layer chromatography (TLC). Compounds can be purified by those skilled in the art by a variety of methods, including high performance liquid chromatography (HPLC) and normal phase silica chromatography.

II. Pharmaceutical Compositions

Any of the compounds of Formula (I) and Formula (II), or a pharmaceutically acceptable salt thereof, may be mixed with a pharmaceutically acceptable carrier to form a pharmaceutical composition for use in Granzyme B imaging and/or for therapeutic purposes as disclosed herein. In some embodiments, provided herein pharmaceutical compositions comprising, as the active ingredient, a compound with a metal as provided herein (a Formula (II) compound), or a pharmaceutically acceptable salt thereof, in combination with one or more pharmaceutically acceptable carriers (excipients). "Acceptable" means that the carrier must be compatible with the active ingredient of the composition (and preferably, capable of stabilizing the active ingredient) and not deleterious to the subject to be treated. Suitable carriers include microcrystalline cellulose, mannitol, glucose, defatted milk powder, polyvinylpyrrolidone, and starch, or a combination thereof.

Some examples of suitable excipients include, without limitation, lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, water, syrup, and methyl cellulose. The pharmaceutical formulations can additionally include, without limitation, lubricating agents such as talc, magnesium stearate, and mineral oil; wetting agents; emulsifying and suspending agents; preserving agents such as methyl- and propylhydroxy-benzoates; sweetening agents; flavoring agents, or combinations thereof. See *Remington's Pharmaceutical Sciences*, 17$^{th}$ ed., Mack Publishing Company, Easton, Pa., 1985, p. 1418 for more information on acceptable pharmaceutical compositions.

Conventional methods, known to those of ordinary skill in the art of medicine, can be used to administer the pharmaceutical composition to the subject, depending upon the type of disease to be treated or the site of the disease. This composition can also be administered via other conventional routes, e.g., administered orally, parenterally, by inhalation spray, topically, rectally, nasally, buccally, vaginally or via an implanted reservoir. The term "parenteral" as used herein includes subcutaneous, intracutaneous, intravenous, intramuscular, intraarticular, intraarterial, intrasynovial, intrasternal, intrathecal, intralesional, and intracranial injection or infusion techniques. Parenteral administration can be in the form of a single bolus dose, or may be, for example, by a continuous perfusion pump. In addition, it can be administered to the subject via injectable depot routes of administration such as using 1-, 3-, or 6-month depot injectable or biodegradable materials and methods.

Injectable compositions may contain various carriers such as vegetable oils, dimethylactamide, dimethyformamide, ethyl lactate, ethyl carbonate, isopropyl myristate, ethanol, and polyols (glycerol, propylene glycol, liquid polyethylene glycol, and the like). For intravenous injection, water soluble antibodies can be administered by the drip method, whereby a pharmaceutical formulation containing the antibody and a physiologically acceptable excipients is infused. Physiologically acceptable excipients may include, for example, 5% dextrose, 0.9% saline, Ringer's solution or other suitable excipients. Intramuscular preparations, e.g., a sterile formulation of a suitable soluble salt form of the antibody, can be dissolved and administered in a pharmaceutical excipient such as Water-for-Injection, 0.9% saline, or 5% glucose solution.

For oral administration, the composition can take the form of, for example, tablets or capsules, prepared by conventional means with acceptable excipients such as binding agents (for example, pre-gelatinised maize starch, polyvinylpyrrolidone or hydroxypropyl methylcellulose); fillers (for example, lactose, microcrystalline cellulose or calcium hydrogen phosphate); lubricants (for example, magnesium stearate, talc or silica); disintegrants (for example, potato starch or sodium starch glycolate); or wetting agents (for example, sodium lauryl sulphate). The tablets can be coated by methods well known in the art.

In some embodiments, the above compounds, or a pharmaceutically acceptable salt thereof, provided herein are suitable for parenteral administration. In some embodiments, the above compounds, or a pharmaceutically acceptable salt thereof, are suitable for intravenous administration.

Pharmaceutical compositions and formulations for topical administration may include transdermal patches, ointments, lotions, creams, gels, drops, suppositories, sprays, liquids and powders. Conventional pharmaceutical carriers, aqueous, powder or oily bases, thickeners and the like may be necessary or desirable.

In making the pharmaceutical compositions provided herein, the active ingredient is typically mixed with an excipient, diluted by an excipient or enclosed within such a carrier in the form of, for example, a capsule, sachet, paper, or other container. When the excipient serves as a diluent, it can be a solid, semi-solid, or liquid material, which acts as a vehicle, carrier or medium for the active ingredient.

Thus, the pharmaceutical compositions can be in the form of tablets, pills, powders, lozenges, sachets, cachets, elixirs, suspensions, emulsions, solutions, syrups, aerosols (as a solid or in a liquid medium), ointments, soft and hard gelatin capsules, suppositories, sterile injectable solutions, and sterile packaged powders.

III. Methods of Use

The present application further provides a method of imaging Granzyme B using one of the above-described compounds, or a pharmaceutically acceptable salt thereof. In some embodiments, the method is an in vitro method. In some embodiments, the method is an in vivo method.

In some embodiments, the method of imaging is performed in a cell, a tissue, a cell sample, a tissue sample, or a subject.

As used herein, the term "subject," refers to any animal, including mammals and invertebrates. For example, mice, rats, other rodents, rabbits, dogs, cats, swine, cattle, sheep, horses, primates, fish, and humans. In some embodiments, the subject is a human. In some embodiments, the subject is a mouse. In some embodiments, the subject is a fish (e.g., a zebra fish).

The present application further provides a method of imaging Granzyme B in a cell or tissue, comprising:
i) contacting the cell or tissue with an effective amount of one of the above compounds, or a pharmaceutically acceptable salt thereof, and
ii) imaging the cell or tissue with a suitable imaging technique, thereby imaging Granzyme B in the cell or tissue.

The present application further provides a method of imaging Granzyme B in a sample, cell sample or tissue sample, comprising:
i) contacting the sample, cell sample or tissue sample with effective amount of one of the above compounds, or a pharmaceutically acceptable salt thereof, and
ii) imaging the sample, cell sample or tissue sample with a suitable imaging technique, thereby imaging Granzyme B in the sample, cell sample or tissue sample.

As used herein within the context of imaging, the term "sample" refers to a biological sample other than cell or tissue sample which is obtained from a subject. For example, the sample includes but not limited to saliva, blood, and urine.

The present application further provides a method of imaging Granzyme B in a subject, comprising:
i) administering to the subject an effective amount of one of the above compounds, or a pharmaceutically acceptable salt thereof, and
ii) imaging the subject with a suitable imaging technique, thereby imaging Granzyme B in the subject.

The present application further provides a method of imaging an immune response in a cell or tissue sample, comprising:
i) contacting the cell or tissue sample with an effective amount of one of the above compounds, or a pharmaceutically acceptable salt thereof, and
ii) imaging the cell or tissue sample with a suitable imaging technique, thereby imaging the immune response in the cell or tissue sample.

The present application further provides a method of imaging an immune response in a subject, comprising:
i) administering to the subject an effective amount of one of the above compounds, or a pharmaceutically acceptable salt thereof, and
ii) imaging the subject with a suitable imaging technique, thereby imaging the immune response in the subject.

The present application further provides a method of monitoring treatment of a disease in a subject, comprising:
i) administering to the subject an effective amount of one of the above compounds, or a pharmaceutically acceptable salt thereof, and
ii) imaging the subject with a suitable imaging technique.

The present application further provides a method of monitoring an immune response in the treatment of a disease in a subject, comprising:
i) administering to the subject an effective amount of one of the above compounds, or a pharmaceutically acceptable salt thereof, and
ii) imaging the subject with a suitable imaging technique.

In some embodiments, the methods provided herein further comprise waiting a time sufficient to allow the compound, or a pharmaceutically acceptable salt thereof, to accumulate at a cell or tissue site (e.g., a cell or tissue site in a subject) associated with the disease, prior to imaging.

In some embodiments, the methods provided herein further comprise waiting a time sufficient to allow the compound, or a pharmaceutically acceptable salt thereof, to bind Granzyme B at a cell or tissue site (e.g., a cell or tissue site in a subject) associated with the disease, prior to imaging.

In some embodiments, the time sufficient is from about 30 seconds to about 24 hours, for example, about 30 seconds to about 24 hours, about 30 seconds to about 12 hours, about 30 seconds to about 6 hours, about 30 seconds to about 2 hours, about 30 seconds to about 1 hour, about 30 seconds to about 30 minutes, about 30 seconds to about 10 minutes, about 10 minutes to about 24 hours, about 10 minutes to about 12 hours, about 10 minutes to about 6 hours, about 10 minutes to about 2 hours, about 10 minutes to about 1 hour, about 10 minutes to about 30 minutes, about 30 minutes to about 24 hours, about 30 minutes to about 12 hours, about 30 minutes to about 6 hours, about 30 minutes to about 2 hours, about 30 minutes to about 1 hour, about 1 hour to about 24 hours, about 1 hour to about 12 hours, about 1 hour to about 6 hours, about 1 hour to about 2 hours, about 2 hours to about 24 hours, about 2 hours to about 12 hours, about 2 hours to about 6 hours, about 6 hours to about 24 hours, about 6 hours to about 12 hours, or about 12 hours to about 24 hours.

In some embodiments, the suitable imaging technique is a non-invasive imaging technique. In some embodiments, the suitable imaging technique is a minimally invasive imaging technique. As used herein, the term "minimally invasive imaging technique" comprises imaging techniques employing the use of an internal probe or injection of one of the above compounds, or a pharmaceutically acceptable salt thereof, or radiotracer via syringe.

Exemplary imaging techniques include, but are not limited to, fluoroscopic imaging, x-ray imaging, magnetic resonance imaging (MRI), ultrasound imaging, photoacoustic imaging, thermographic imaging, tomographic imaging, echocardiographic imaging, positron emission tomography (PET) imaging, PET with computed tomography (CT) imaging, PET-MRI, single-photon emission computed tomography (SPECT), and ultrasound imaging. In some embodiments, the suitable imaging technique is selected from the group consisting of PET imaging, PET-CT, PET-MRI, and SPECT.

In some embodiments, the suitable imaging technique is selected from the group consisting of PET imaging, PET with computed tomography imaging, and PET with magnetic resonance imaging (MRI). In some embodiments, the suitable imaging technique is selected PET imaging.

In some embodiments, a disease as described herein is selected from the group consisting of an autoimmune disorder, an inflammatory disorder, a skin disorder, cancer, and a cardiovascular disorder. As used herein, the term "disease" is used interchangeable with the term "immunoregulatory abnormality."

In some embodiments, the disease is a cancer. In some embodiments, the cancer comprises a solid tumor. In some embodiments, the cancer is a hematological cancer (e.g., leukemia, lymphoma, and the like). In some embodiments, the cancer is selected from the group consisting of brain, breast cancer, cervical cancer, colorectal cancer, lung cancer, lymphoma, melanoma, bladder cancer, renal cell carcinoma, multiple myeloma, pancreatic cancer, and prostate cancer. In some embodiments, the cancer is selected from the group consisting of Hairy-cell leukemia, Kaposi's sarcoma, follicular lymphoma, chronic myeloid leukemia, cutaneous T-cell lymphoma, peripheral T-cell lymphoma, T-cell prolymphocytic leukemia, Classical Hodgkin's lymphoma, B-cell non-Hodgkin's lymphoma, chronic lymphocytic leukemia, acute myeloid leukemia, myelodysplastic syndrome, primary myelofibrosis, post-essential thrombocythemia myelofibrosis, post-polycythemia vera myelofibrosis, melanoma, renal cell carcinoma, prostate cancer, non-small cell lung cancer, small cell lung cancer, glioblastoma, hepatocellular carcinoma, urothelial carcinoma, esophageal carcinoma, gastroesophageal carcinoma, gastric cancer, multiple myeloma, colon cancer, rectal cancer, squamous cell carcinoma of the head and neck, epithelial ovarian cancer (EOC), primary peritoneal cancer, fallopian tube carcinoma, HER2+ breast cancer, ER+/PR+/HER2− breast cancer, triple-negative breast cancer, gastric cancer, pancreatic cancer, bladder cancer, Merkel cell cancer, nasopharyngeal cancer, adrenocortical carcinoma, meningioma, neuroblastoma, retinoblastoma, osteosarcoma, rhabdomyosarcoma, Ewing's sarcoma, liposarcoma, fibrosarcoma, leiomyosarcoma, peripheral primitive neuroectodermal tumor, squamous cell carcinoma of the cervix, squamous cell carcinoma of the vagina, and squamous cell carcinoma of the vulva. In some embodiments, the cancer is colon cancer.

In some embodiments, the disease is selected from the group consisting of graft-versus-host disease, rheumatoid arthritis, systemic lupus erythematosus, Hashimoto's thyroiditis, multiple sclerosis, myasthenia gravis, type I diabetes, uveitis, posterior uveitis, allergic encephalomyelitis, glomerulonephritis, rheumatic fever, post-infectious glomerulonephritis, psoriasis, atopic dermatitis, contact dermatitis, eczematous dermatitis, seborrhoeic dermatitis, lichen planus, pemphigus, bullous pemphigoid, epidermolysis bullosa, urticaria, angioedemas, vasculitis, erythema, cutaneous eosinophilia, lupus erythematosus, acne, alopecia areata, keratoconjunctivitis, vernal conjunctivitis, uveitis associated with Behcet's disease, keratitis, herpetic keratitis, conical cornea, dystrophia epithelialis corneae, corneal leukoma, ocular pemphigus, Mooren's ulcer, scleritis, Graves' opthalmopathy, Vogt-Koyanagi-Harada syndrome, sarcoidosis, pollen allergies, reversible obstructive airway disease, bronchial asthma, allergic asthma, intrinsic asthma, extrinsic asthma, dust asthma, chronic or inveterate asthma, late asthma and airway hyper-responsiveness, bronchitis, gastric ulcers, vascular damage caused by ischemic diseases and thrombosis, ischemic bowel diseases, inflammatory bowel diseases, necrotizing enterocolitis, intestinal lesions associated with thermal burns, coeliac diseases, proctitis, eosinophilic gastroenteritis, mastocytosis, Crohn's disease, ulcerative colitis, migraine, rhinitis, eczema, interstitial nephritis, Goodpasture's syndrome, hemolytic-uremic syndrome, diabetic nephropathy, multiple myositis, Guillain-Barre syndrome, Meniere's disease, polyneuritis, multiple neuritis, mononeuritis, radiculopathy, hyperthyroidism, Basedow's disease, pure red cell aplasia, aplastic anemia, hypoplastic anemia, idiopathic thrombocytopenic purpura, autoimmune hemolytic anemia, agranulocytosis, pernicious anemia, megaloblastic anemia, anerythroplasia, osteoporosis, sarcoidosis, fibroid lung, idiopathic interstitial pneumonia, dermatomyositis, leukoderma vulgaris, ichthyosis vulgaris, photoallergic sensitivity, cutaneous T cell lymphoma, arteriosclerosis, atherosclerosis, aortitis syndrome, polyarteritis nodosa, myocardosis, scleroderma, Wegener's granuloma, Sjogren's syndrome, adiposis, eosinophilic fascitis, lesions of gingiva, periodontium, alveolar bone, substantia ossea dentis, glomerulonephritis, male pattern alopecia, alopecia senilis by preventing epilation, alopecia senilis by providing hair germination and/or promoting hair generation and hair growth, muscular dystrophy, pyoderma, Sezary's syndrome, Addison's disease, ischemia-reperfusion injury of organs, transplantation disease, ischemic disease, endotoxin-shock, pseudomembranous colitis, colitis caused by drug or radiation, ischemic acute renal insufficiency, chronic renal insufficiency, toxinosis caused by lung-oxygen or drugs, lung cancer, pulmonary emphysema, cataracta, siderosis, retinitis pigmentosa, senile macular degeneration, vitreal scarring, corneal alkali burn, dermatitis erythema multiforme, linear IgA ballous dermatitis and cement dermatitis, gingivitis, periodontitis, sepsis, pancreatitis, aging, carcinogenesis, metastasis of carcinoma and hypobaropathy, histamine or leukotriene-C4 release associated diseases, Behcet's disease, autoimmune hepatitis, primary biliary cirrhosis, sclerosing cholangitis, partial liver resection, acute liver necrosis, necrosis caused by toxin, viral hepatitis, shock, anoxia, B-virus hepatitis, non-A/non-B hepatitis, cirrhosis, alcoholic cirrhosis, hepatic failure, fulminant hepatic failure, late-onset hepatic failure, acute-on-chronic liver failure, cytomegalovirus infection, HCMV infection, AIDS, senile dementia, trauma, chronic bacterial infection, malignancy of lymphoid origin, acute lymphocytic leukemia, chronic lymphocytic leukemia, acute lymphocytic lymphoma, and chronic lymphocytic lymphoma.

In some embodiments, the disease is selected from the group consisting of systemic lupus erythematosis, chronic rheumatoid arthritis, type I diabetes mellitus, inflammatory bowel disease, biliary cirrhosis, uveitis, multiple sclerosis, Crohn's disease, ulcerative colitis, bullous pemphigoid, sarcoidosis, psoriasis, autoimmune myositis, Wegener's granulomatosis, ichthyosis, Graves ophthalmopathy, asthma, scleroderma and Sjogren's syndrome.

In some embodiments, the disease is selected from the group consisting of bone marrow rejection, organ transplant rejection, and graft-versus-host disease.

As used herein, the phrase "therapeutically effective amount" refers to the amount of an active compound described above, or a pharmaceutically acceptable salt thereof, or pharmaceutical agent that elicits the biological or medicinal response that is being sought in a tissue, system, animal, individual or human by a researcher, veterinarian, medical doctor or other clinician.

In some embodiments, the dosage of one of the above compounds, or a pharmaceutically acceptable salt thereof, administered to a subject or individual is about 1 µg to about 2 g, for example, about 1 µg to about 2 g, about 1 µg to about 1000 mg, about 1 µg to about 500 mg, about 1 µg to about 100 mg, about 1 µg to about 50 mg, about 1 µg to about 1 mg, about 1 µg to about 500 µg, about 1 µg to about 100 µg, about 1 µg to about 10 µg, about 10 µg to about 2 g, for example, about 10 µg to about 2 g, about 10 µg to about 1000 mg, about 10 µg to about 500 mg, about 10 µg to about 100 mg, about 10 µg to about 50 mg, about 10 µg to about 1 mg, about 10 µg to about 500 µg, about 10 µg to about 100 µg, about 100 µg to about 2 g, for example, about 100 µg to about 2 g, about 100 µg to about 1000 mg, about 100 µg to about 500 mg, about 100 µg to about 100 mg, about 100 µg to about 50 mg, about 100 µg to about 1 mg, about 100 µg to about 500 µg, about 500 µg to about 2 g, for example, about 500 µg to about 2 g, about 500 µg to about 1000 mg, about 500 µg to about 500 mg, about 500 µg to about 100 mg, about 500 µg to about 50 mg, about 500 µg to about 1 mg, about 1 mg to about 2 g, about 1 mg to about 1000 mg, about 1 mg to about 500 mg, about 1 mg to about 100 mg, about 1 mg to 50 mg, or about 50 mg to about 500 mg.

As used herein, the term "treating" or "treatment" refers to one or more of (1) inhibiting the disease; for example, inhibiting a disease, condition or disorder in an individual who is experiencing or displaying the pathology or symptomatology of the disease, condition or disorder (i.e., arresting further development of the pathology and/or symptomatology); and (2) ameliorating the disease; for example, ameliorating a disease, condition or disorder in an individual who is experiencing or displaying the pathology or symptomatology of the disease, condition or disorder (i.e., reversing the pathology and/or symptomatology) such as decreasing the severity of disease or reducing or alleviating one or more symptoms of the disease.

Combination Therapies

When employed in methods of treating a disease, the above compounds of Formula (II), or pharmaceutically acceptable salts thereof, provided herein can be administered as a therapeutic agent in combination with one or more additional therapeutic agents. Examples of the additional therapeutic agents include, but are not limited to, anti-inflammatory agents, steroids, immunotherapy agents, chemotherapeutic agents, and therapeutic antibodies.

In some embodiments, the additional therapeutic agent induces an immune response in a cell or tissue sample or subject.

The present application further provides a method of treating a disease in a subject, comprising:
a) administering to the subject, an effective amount of one of the above compounds, or a pharmaceutically acceptable salt thereof.

In some embodiments, the subject has been identified and/or diagnosed as having the disease to be treated prior to step a). In some embodiments, the subject is identified and/or diagnosed as having the disease to be treated after step a). For example, the disease to be treated is selected from the group consisting of: an autoimmune disorder, an inflammatory disorder, a skin disorder, cancer, and a cardiovascular disorder as described herein.

In some embodiments, the subject has been treated with one or more immunotherapeutic agents prior to step a). In some embodiments, the disease has been determined to be resistant to the one or more immunotherapeutic agents administered prior to step a).

In some embodiments, the method further comprises:
b) administering one or more additional therapeutic agents after the administration of an effective amount of one of the above compounds, or a pharmaceutically acceptable salt thereof. In some embodiments, steps a)-b) are repeated multiple times.

In some embodiments, the additional therapeutic agent is administered to the subject in a therapeutically effective amount.

In some embodiments, the therapeutic agent is an antibody. Exemplary antibodies for use in a combination therapy include, but are not limited to, trastuzumab (e.g. anti-HER2), ranibizumab (e.g. anti-VEGF-A), bevacizumab (e.g. anti-VEGF), panitumumab (e.g. anti-EGFR), cetuximab (e.g. anti-EGFR), rituxan (anti-CD20), antibodies directed to c-MET, and antibody inhibitors of Granzyme B (e.g., Clone GB11, Clone GrB-7, and NCL-L-Gran-B), ipilimumab (anti-CTLA-4), nivolumab (anti-PD-1), pembrolizumab (anti-PD-1), atezolizumab (anti-PD-1), elotuzumab (anti-SLAM7), and daratumumab (anti-CD38).

In some embodiments, the additional therapeutic agent is a steroid. Exemplary steroids include corticosteroids such as cortisone, dexamethasone, hydrocortisone, methylprednisolone, prednisolone, and prednisone. In some embodiments, the additional therapeutic agent is a corticosteroid.

In some embodiments, the additional therapeutic agent is an anti-inflammatory compound. Exemplary anti-inflammatory compounds include aspirin, choline salicylates, celecoxib, diclofenac potassium, diclofenac sodium, diclofenac sodium with misoprostol, diflunisal, etodolac, fenoprofen, flurbiprofen, ibuprofen, ketoprofen, meclofenamate sodium, mefenamic acid, nabumetone, naproxen, naproxen sodium, oxaprozin, piroxican, rofecoxib, salsalate, sodium salicylate, sulindac, tolmetin sodium, and valdecoxib.

In some embodiments, the additional therapeutic agent is chemotherapeutic agent. Exemplary chemotherapeutic agents include, but are not limited to, a cytostatic agent, cisplatin, doxorubicin, taxol, etoposide, irinotecan, topotecan, paclitaxel, docetaxel, epothilones, tamoxifen, 5-fluorouracil, methotrexate, temozolomide, cyclophosphamide, SCH 66336, R115777, L778,123, BMS 214662, gefitinib, erlotinib hydrochloride, antibodies to EGFR, imatinib mesylate, intron, ara-C, gemcitabine, uracil mustard, chlormethine, ifosfamide, melphalan, chlorambucil, pipobroman, triethylenemelamine, triethylenethiophosphoramine, busulfan, carmustine, lomustine, streptozocin, dacarbazine, floxuridine, cytarabine, 6-mercaptopurine, 6-thioguanine, fludarabine phosphate, oxaliplatin, folinic acid, pentostatin, vinblastine, vincristine, vindesine, bleomycin, dactinomycin, daunorubicin, doxorubicin, epirubicin, idarubicin, mithramycin, deoxycoformycin, mitomycin-C, L-asparaginase, teniposide, 17α-ethinylestradiol, diethylstilbestrol, testosterone, prednisone, fluoxymesterone, dromostanolone propionate, testolactone, megestrol acetate, methylprednisolone, methyltestosterone, prednisolone, triamcinolone, chlorotrianisene, hydroxyprogesterone, aminoglutethimide, estramustine, medroxyprogesteroneacetate, leuprolide, flutamide, toremifene, goserelin, carboplatin, hydroxyurea, amsacrine, procarbazine, mitotane, mitoxantrone, levamisole, vinorelbine, anastrazole, letrozole, capecitabine, reloxafine, hexamethylmelamine, bevacizumab, bexxar, velcade, zevalin, trisenox, xeloda, vinorelbine, porfimer, erbitux, liposomal, thiotepa, altretamine, melphalan, trastuzumab, fulvestrant, exemestane, ifosfamide, rituximab, C225, alemtuzumab, clofarabine, cladribine, aphidicolin, sunitinib, dasatinib, tezacitabine, Sml1, triapine, didox, trimidox, amidox, 3-AP, MDL-101,731, bendamustine, ofatumumab, and GS-1101 (also known as CAL-101).

In some embodiments, the chemotherapeutic agent is selected from the group consisting of an alkylating agent (e.g., busulfan, chlorambucil, cisplatin, cyclophosphamide (cytoxan), dacarbazine, ifosfamide, mechlorethamine (mustargen), and melphalan), a nitrosourea (e.g., carmustine, lomustine, semustine, and streptozocin), a triazine (e.g., dacarbazine) an anti-metabolite (e.g., 5-fluorouracil (5-FU), cytarabine (Ara-C), fludarabine, gemcitabine, and methotrexate), a purine analog (e.g., 6-mercaptopurine, 6-thioguanine, and pentostatin (2-deoxycoformycin)), a mitotic inhibitor (e.g., docetaxel, etoposide (VP16), teniposide, paclitaxel, taxol, vinblastine, vincristine, and vinorelbine), an anti-tumor antibiotic (e.g., bleomycin, dactinomycin, daunorubicin, doxorubicin, mitomycin, plicamycin, and idarubicin), a platinum chemotherapeutic agent (e.g., cisplatin and carboplatin), an anthracenedione (e.g., mitoxantrone), a toxin (e.g., ricin A-chain (Burbage, *Leukemia research*, 21.7 (1997): 681-690), diphtheria toxin A (Massuda et al., *Proceedings of the National Academy of Sciences*, 94.26 (1997):

14701-14706; Lidor, *American journal of obstetrics and gynecology*, 177.3 (1997): 579-585), pertussis toxin A subunit, *E. coli* enterotoxin toxin A subunit, cholera toxin A subunit and *Pseudomonas* toxin c-terminal), and a gene therapy vector (e.g., a signal transducing protein (e.g., Src, Abl, and Ras), Jun, Fos, and Myc).

In some embodiments, the additional therapeutic agent is an immunotherapeutic agent. An immunotherapeutic agent generally triggers immune effector cells and molecules to target and destroy cells (e.g., cancer cells). The immune effector may be, for example, an antibody specific for a marker on the surface of a cell (e.g. a tumor cell). The antibody alone may serve as an effector of therapy or it may recruit other cells to effect cell killing. Various effector cells include, but are not limited to, cytotoxic T cells and NK cells.

Exemplary immunotherapeutic agents include, but are not limited to, azathioprine, chlorambucil, cyclophosphamide, cyclosporine, daclizumab, infliximab, methotrexate, tacrolimus, immune stimulators (e.g., IL-2, IL-4, IL-12, GM-CSF, tumor necrosis factor; interferons alpha, beta, and gamma; F42K and other cytokine analogs; a chemokine such as MIP-1, MCP-1β, RANTES, IL-8; or a growth factor such FLT3 ligand), an antigenic peptide, polypeptide or protein, or an autologous or allogenic tumor cell composition (see e.g., Ravindranath & Morton, *International reviews of immunology*, 7.4 (1991): 303-329), hormonal therapy, adrenocorticosteroids, progestins (e.g., hydroxyprogesterone caproate, medroxyprogesterone acetate, and megestrol acetate), estrogens (e.g., diethylstilbestrol and ethinyl estradiol), anti-estrogens (e.g., testosterone propionate and fluoxymesterone), anti-androgens (e.g., flutamide), and gonadotropin-releasing hormone analogs (e.g., leuprolide). Additional immunotherapeutic agents are known in the art, and can be found, for example, in Rosenberg et al, *New England Journal of Medicine*, 319.25 (1988): 1676-1680; and Rosenberg et al, *Annals of surgery*, 210.4 (1989): 474).

The therapeutic agents provided herein can be effective over a wide dosage range and are generally administered in an effective amount. It will be understood, however, that the amount of the therapeutic agent actually administered will usually be determined by a physician, according to the relevant circumstances, including the condition to be imaged, the chosen route of administration, the actual compound administered, the age, weight, and response of the individual subject, the severity of the subject's symptoms, and the like.

IV. Kits for Granzyme B Imaging and Therapy

Also encompassed by the disclosure are kits (e.g., pharmaceutical packs) for Granzyme B imaging and therapy. The kits provided may comprise a container (e.g., a vial, ampule, bottle, syringe, and/or dispenser package, or other suitable container), in which a pharmaceutical composition as disclosed herein may be placed. In some embodiments, provided kits may optionally further include a second container comprising a pharmaceutical excipient for dilution or suspension of a pharmaceutical composition. In some embodiments, the pharmaceutical composition provided in the first container and the second container are combined to form one unit dosage form. In some embodiments, the kit may comprise additional containers comprising one or more additional therapeutic agents as disclosed herein, for example, anti-inflammatory agents, steroids, immunotherapy agents, chemotherapeutic agents, and therapeutic antibodies as described in the section Combination Therapies above.

In certain embodiments, a kit described herein further includes instructions for using the compounds or composition included in the kit. A kit described herein may also include information as required by a regulatory agency such as the U.S. Food and Drug Administration (FDA). In certain embodiments, the information included in the kits is prescribing information. In certain embodiments, the kits and instructions provide for imaging Granzyme B and/or treating and/or reducing the risk of target disorders related thereto (e.g., those disclosed herein) in a subject in need thereof. A kit described herein may include one or more additional pharmaceutical agents described herein as a separate composition.

ALTERNATIVE EMBODIMENTS

The following are descriptions of alternative embodiments of the present disclosure. The following examples are non-limiting and meant to describe exemplary embodiments to illustrate the utility of the present disclosure.

Embodiment 1: A compound, a stereoisomer thereof, or a pharmaceutically acceptable salt thereof, wherein the compound is 7-Al

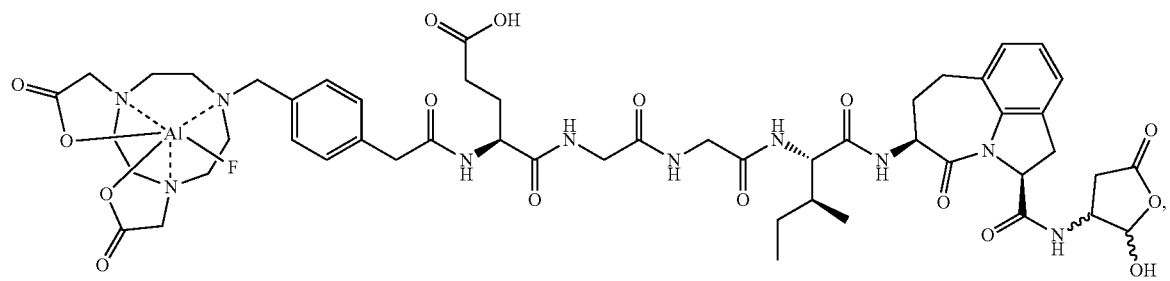

wherein the fluorine (F) is optionally a radioisotope and the hemiacetal unit is optionally in an open chain aldehyde form.

Embodiment 2: The compound of embodiment 1, a stereoisomer thereof, or a pharmaceutically acceptable salt thereof, wherein compound I has the following structures:

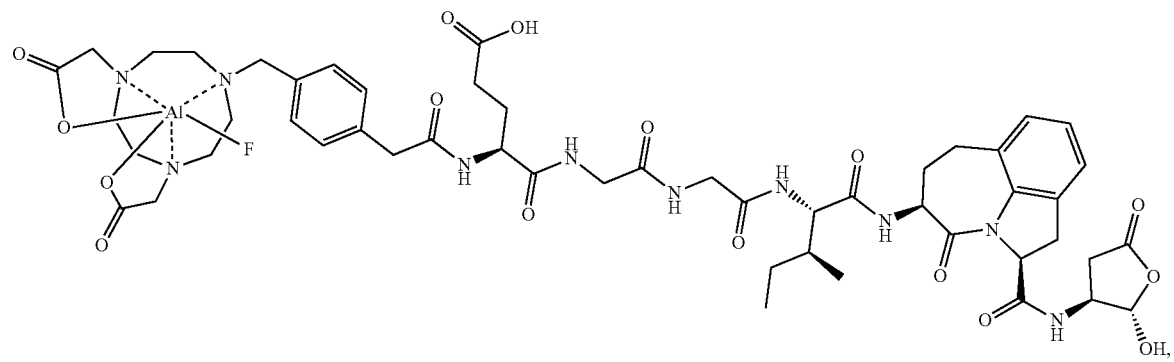
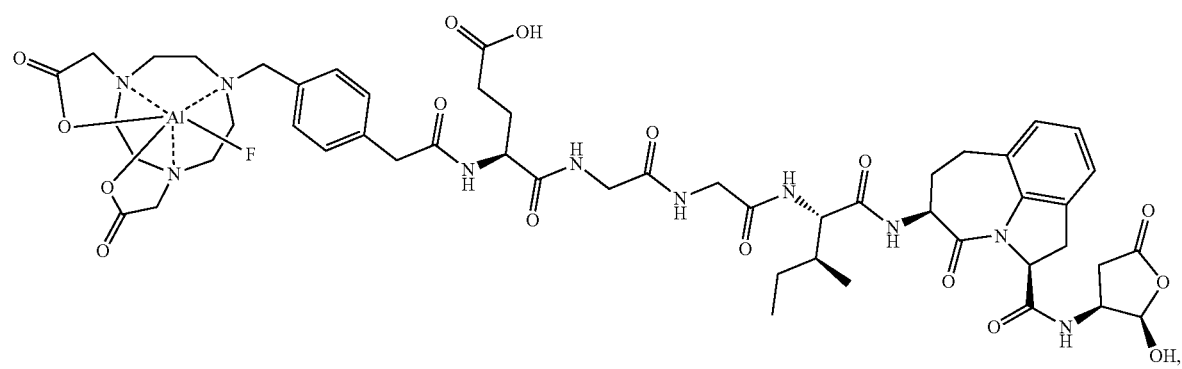
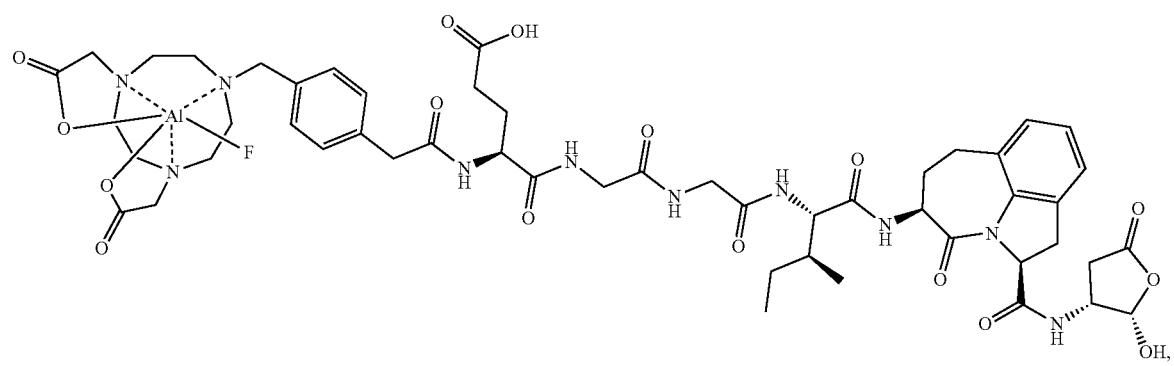
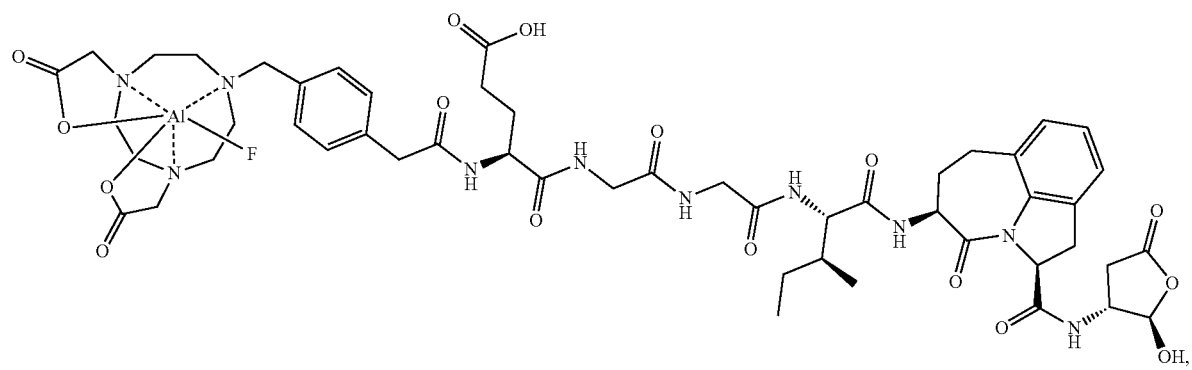

-continued

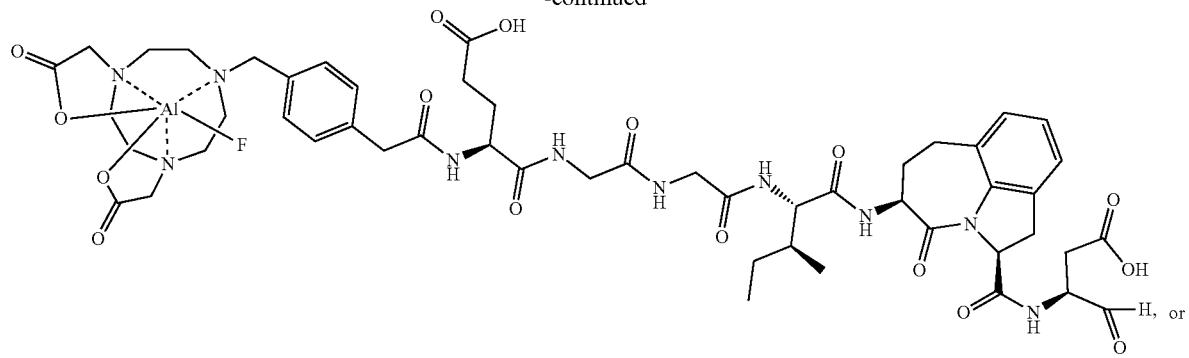

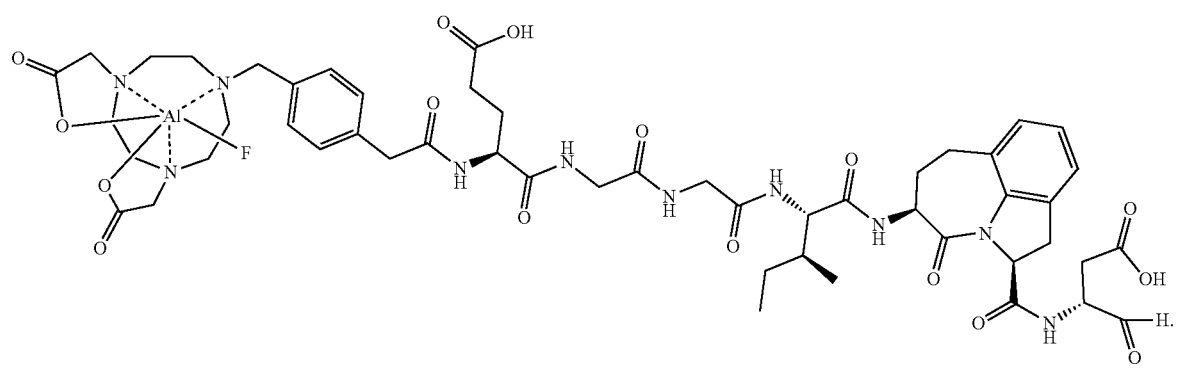

Embodiment 3: The compound of embodiment 1, a stereoisomer thereof, or a pharmaceutically acceptable salt thereof, wherein the compound, containing radioisotope $^{18}$F, has the following structure:

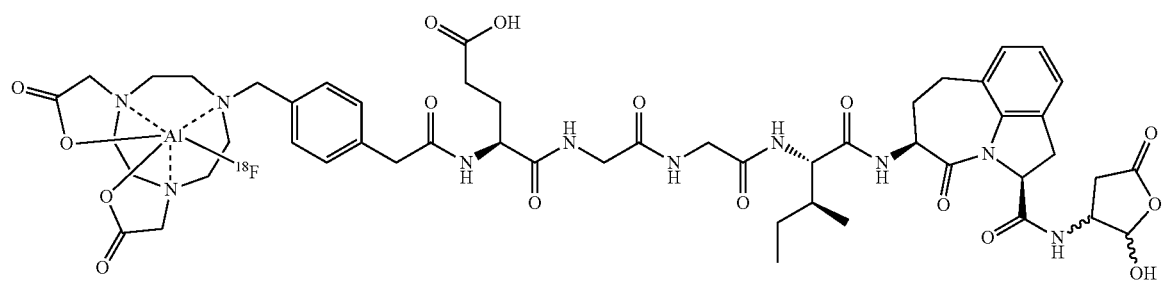

wherein the hemiacetal unit is optionally in an open chain aldehyde form.

Embodiment 4: The compound of embodiment 1, a stereoisomer thereof, or a pharmaceutically acceptable salt thereof, wherein the compound, containing radioisotope $^{18}$F, has the following structure:

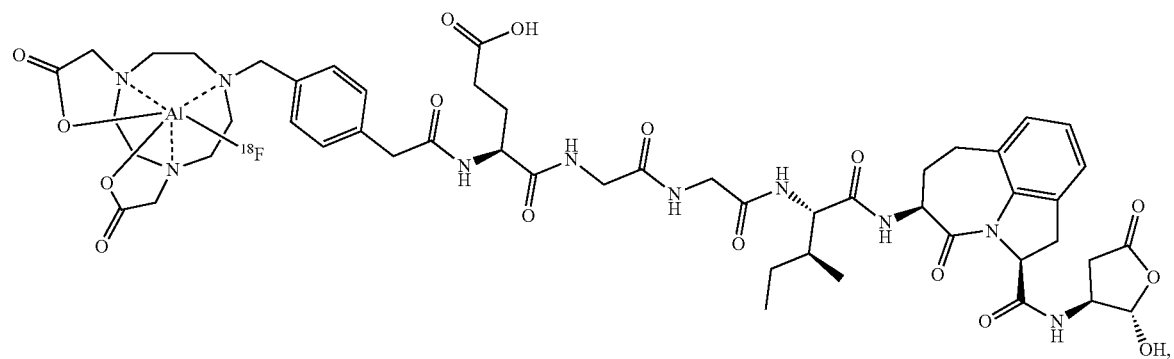
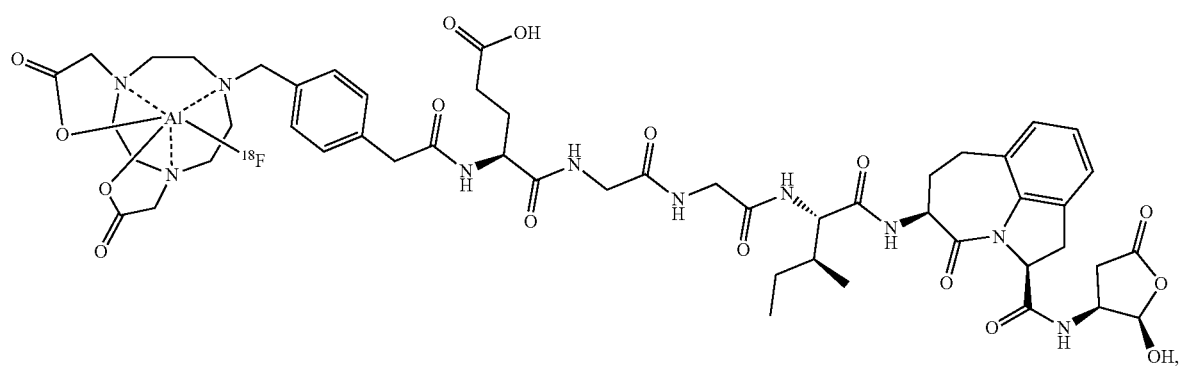
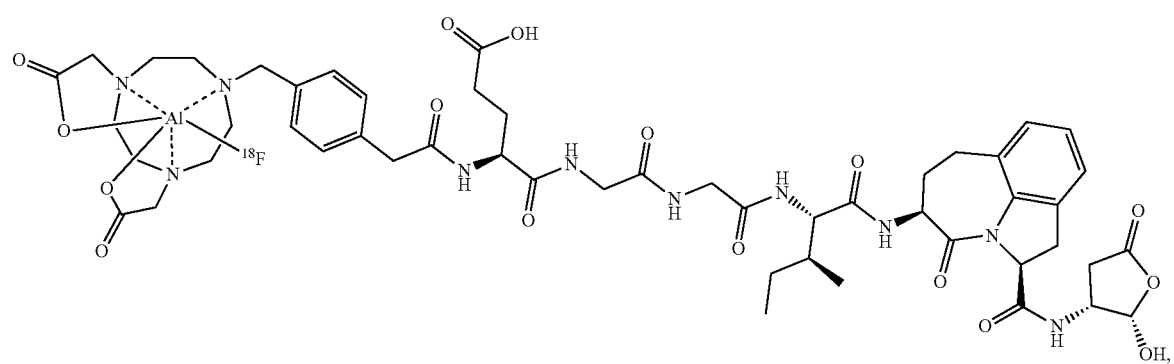
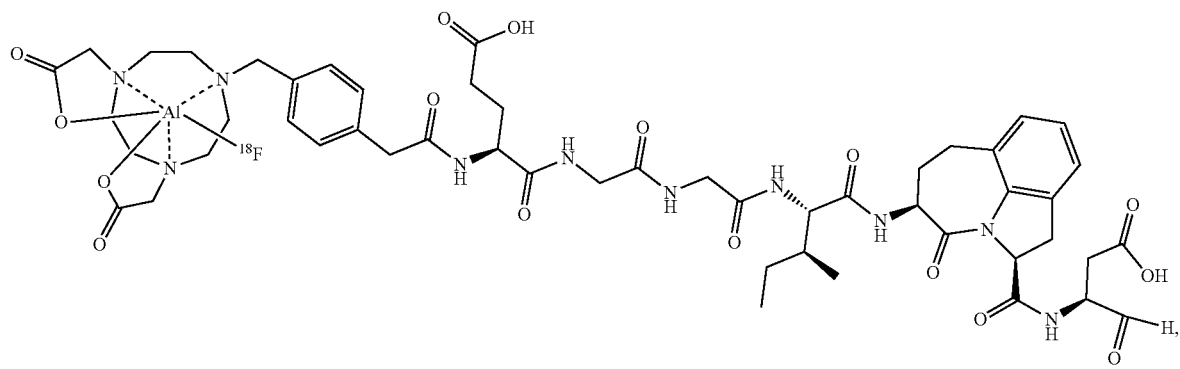

-continued

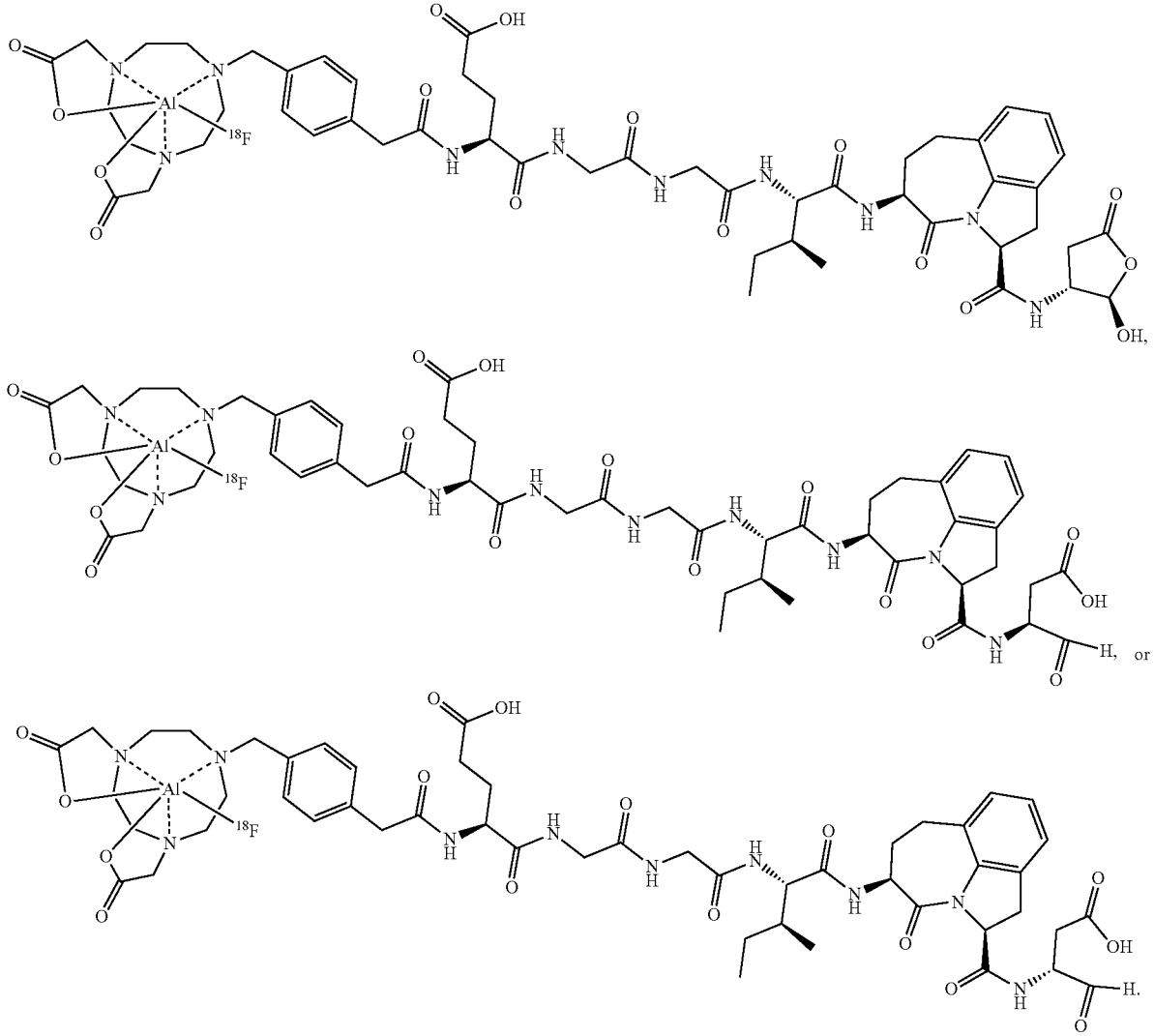

Embodiment 5: A compound, a stereoisomer thereof, or a pharmaceutically acceptable salt thereof, wherein the compound is

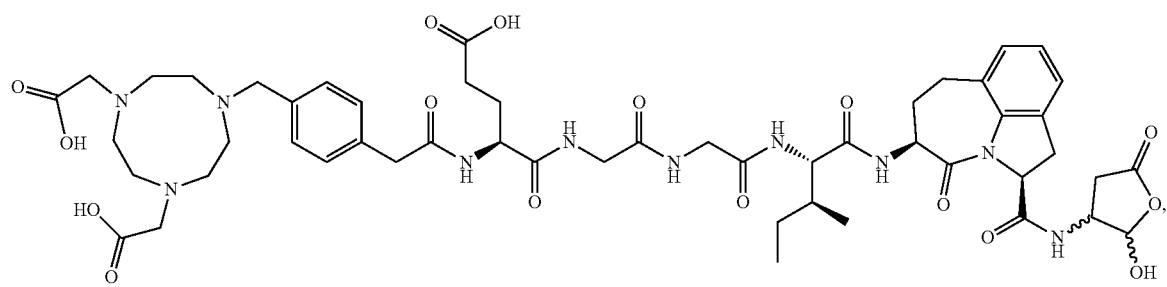

wherein the hemiacetal unit is optionally in an open chain aldehyde form.

Embodiment 6: The compound of embodiment 5, a stereoisomer thereof, or a pharmaceutically acceptable salt thereof, wherein compound II has the following structure:

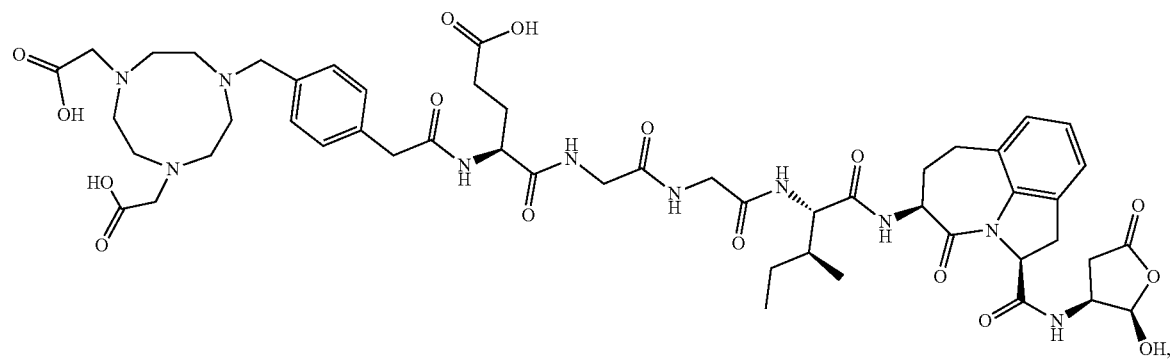
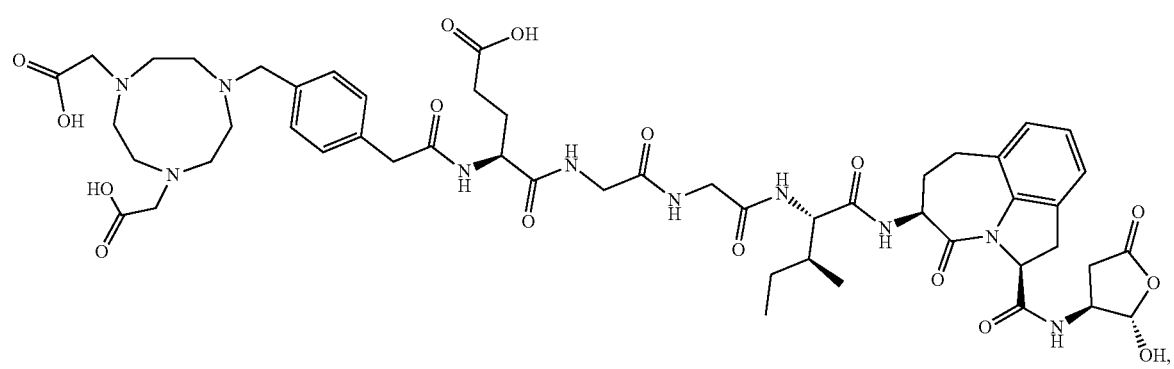
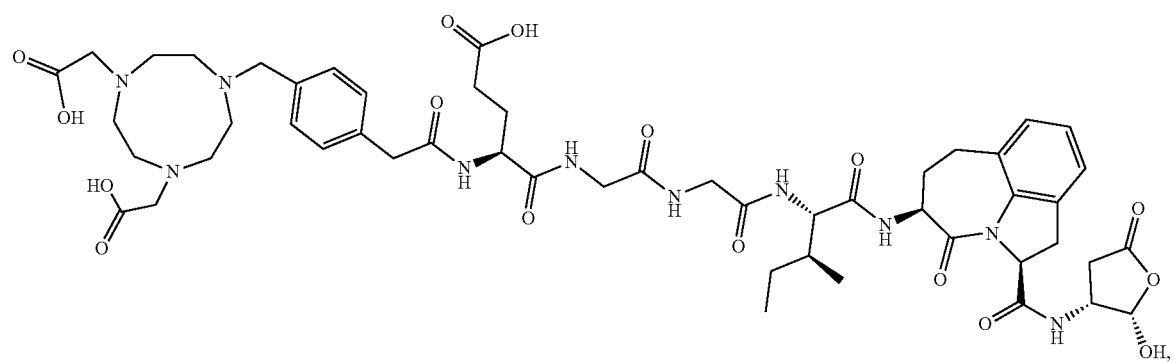
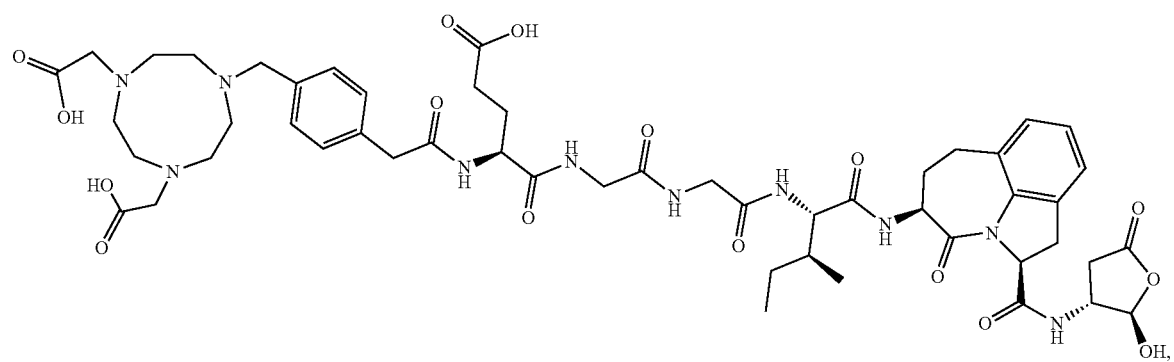

-continued

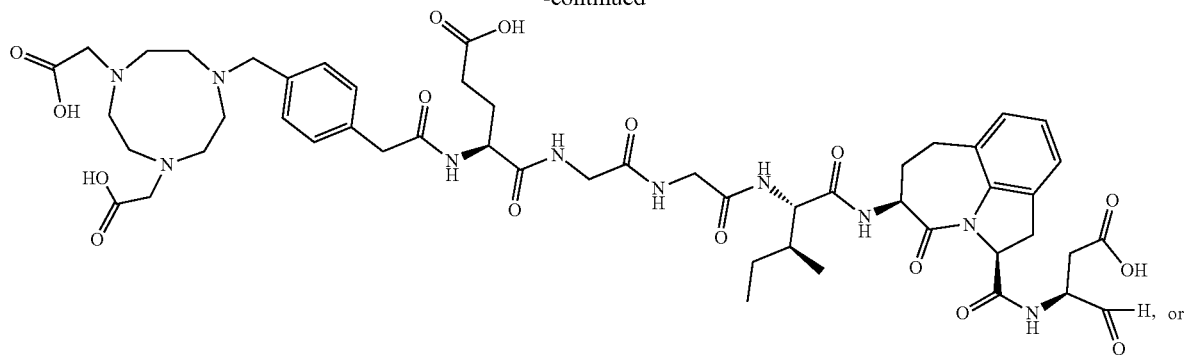

, or

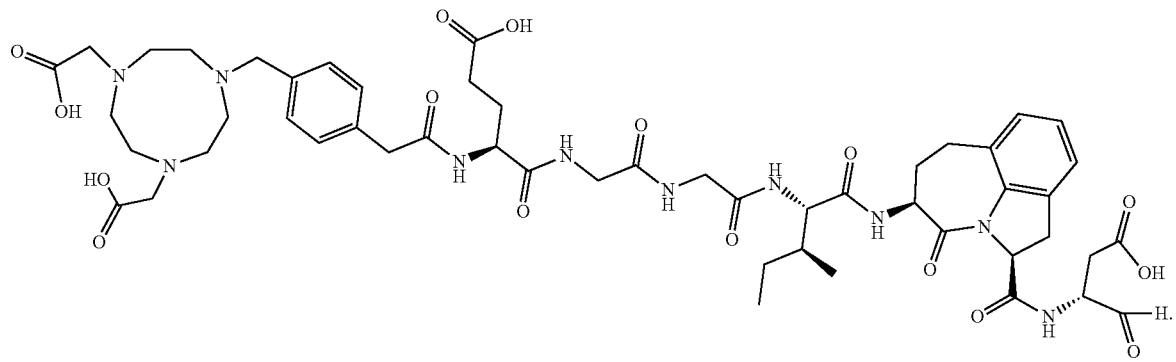

.

Embodiment 7: A pharmaceutical composition comprising a compound of embodiment 5, a stereoisomer thereof, or a pharmaceutically acceptable salt thereof, and a pharmaceutically acceptable carrier.

Embodiment 8: A combination therapy comprising a compound of embodiment 5, a stereoisomer thereof, or a pharmaceutically acceptable salt thereof, as a therapeutic agent and one or more additional therapeutic agents.

Embodiment 9: The combination therapy of embodiment 8, wherein the one or more additional therapeutic agents are selected from the group consisting of anti-inflammatory agents, steroids, immunotherapy agents, chemotherapeutic agents, and therapeutic antibodies.

Embodiment 10: A method of imaging granzyme B in a cell or tissue, a sample, a cell or tissue sample, the method comprising contacting the cell or tissue, the sample, the cell or tissue sample with a compound of any one of embodiments 1-6, a stereoisomer thereof, or a pharmaceutically acceptable salt thereof, and imaging the cell or tissue, the sample, the cell or tissue sample with a suitable imaging technique, thereby imaging granzyme B in the cell or tissue, the sample, the cell or tissue sample wherein the compound contains radioisotope $^{18}$F.

Embodiment 11: A method of treating an immunoregulatory abnormality in a subject in need thereof, the method comprising administering to said subject a compound of embodiment 4, a stereoisomer thereof, or a pharmaceutically acceptable salt thereof, in an amount effective for treating said immunoregulatory abnormality.

Embodiment 12: The method of embodiment 11, wherein the immunoregulatory abnormality is selected from the group consisting of an autoimmune disorder, an inflammatory disorder, a skin disorder, cancer, and a cardiovascular disorder.

Embodiment 13: The method of embodiment 12, wherein the immunoregulatory abnormality is cancer.

Embodiment 14: A method of treating an immunoregulatory abnormality in a subject in need thereof, the method comprising administering to said subject a combination therapy of claim 7 in an amount effective for treating said immunoregulatory abnormality.

Embodiment 15: The method of embodiment 14, wherein the immunoregulatory abnormality is selected from the group consisting of an autoimmune disorder, an inflammatory disorder, a skin disorder, cancer, and a cardiovascular disorder.

Embodiment 16: The method of embodiment 15, wherein the immunoregulatory abnormality is cancer.

Embodiment 17: A method of monitoring an immune response in the treatment of a disease in a subject, the method comprising administering to the subject an effective amount of the compound of embodiment 1, a stereoisomer thereof, or a pharmaceutically acceptable salt thereof, and imaging the subject with a suitable imaging technique.

Without further elaboration, it is believed that one skilled in the art can, based on the above description, utilize the present invention to its fullest extent. The following specific embodiments are, therefore, to be construed as merely illustrative, and not limitative of the remainder of the disclosure in any way whatsoever. All publications cited herein are incorporated by reference for the purposes or subject matter referenced herein.

Example 1: Synthesis and Characterization of Compound 7-Al

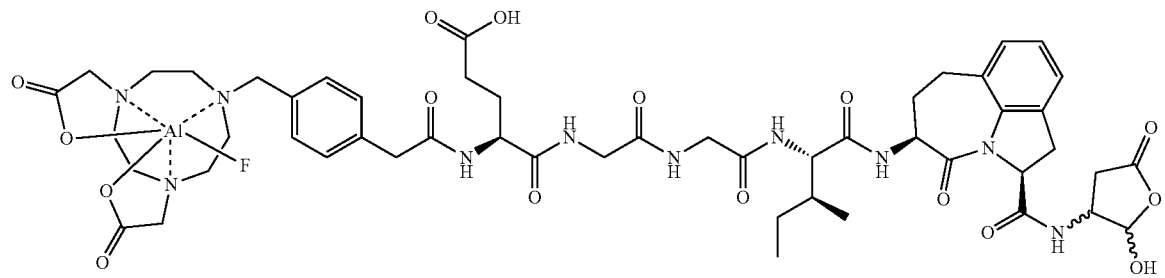

7-Al

Step A: Synthesis of Compound 7.

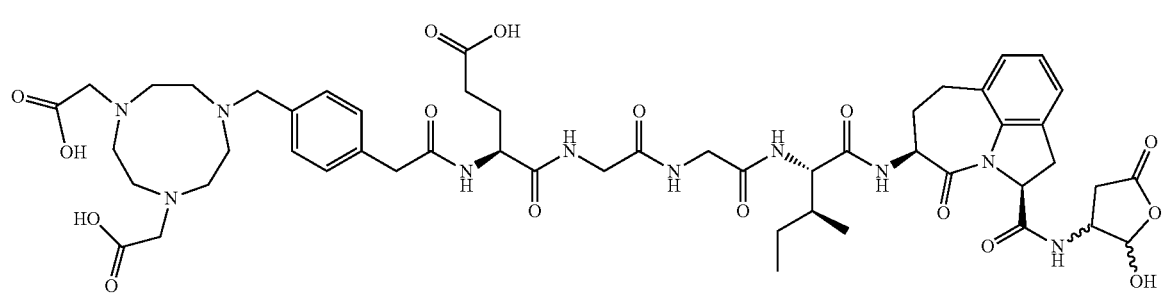

7

Tricyclic amino acid coupling and Fmoc deprotection:

A solution of Fmoc-(2S,5S)-5-amino-1,2,4,5,6,7-hexahydroazepino[3,2,1-Hi]indole-4-one-2-carboxylic acid (2.5 equiv., 1.23 g, 2.63 mmol) in DMF (43 mL) was added to H-Asp(OtBu)-H NovaSyn TG Resin (1.05 mmol, Resin Bound, 5 g, 0.21 mmol/g) in a fritted reaction vessel. N,N'-Diisopropylcarbodiimide (2.5 equiv., 2.62 mmol, 1.8 M) in DMF and Ethyl cyanoglyoxalate-2-oxime (2.5 equiv., 2.63 mmol, 0.9 M) in DMF were then added and the mixture was placed on an orbital shaker at ambient temperature overnight. After 24 hours, the mixture was removed from the shaker and the solvent was drained. The resin was washed with DMF (3×50 ml), followed by washing with dichloromethane (3×50 ml). A ninhydrin test was negative. The resin was treated with 20% piperidine in DMF (30 ml) and the mixture was agitated on a shaker table for 30 minutes. The solvent was then drained, and the resin was washed with DMF (3×30 ml). The resin was again treated with 20% piperidine in DMF (30 ml) and the mixture was agitated on a shaker table for 30 minutes. The solvent was then drained, and the resin was washed with DMF (3×50 ml) followed by dichloromethane (3×50 ml).

L-Isoleucine Coupling and Fmoc Deprotection:

A solution of (((9H-fluoren-9-yl)methoxy)carbonyl)-L-isoleucine (2.5 equiv., 0.93 g, 2.63 mmol) in DMF (43 mL) was added to the Resin from the previous step in a fritted reaction vessel. N,N'-Diisopropylcarbodiimide (2.5 equiv., 2.62 mmol, 1.8 M) in DMF and Ethyl cyanoglyoxalate-2-oxime (2.5 equiv., 2.63 mmol, 0.9 M) in DMF were then added and the mixture was placed on an orbital shaker at ambient temperature overnight. The mixture was removed from the shaker, and the solvent was drained. The resin was washed with DMF (3×50 ml) followed by washing with dichloromethane (3×50 ml). A ninhydrin test was negative. The resin was treated with 20% piperidine in DMF (30 ml) and the mixture was agitated on a shaker table for 30 minutes. The solvent was then drained, and the resin was washed with DMF (3×30 ml). The resin was again treated with 20% piperidine in DMF (30 ml) and the mixture was agitated on a shaker table for 30 minutes. The solvent was then drained, and the resin was washed with DMF (3×50 ml) followed by dichloromethane (3×50 ml).

Gly-Gly Coupling and Fmoc Deprotection:

A solution of (((9H-fluoren-9-yl)methoxy)carbonyl)glycylglycine (2.5 equiv., 0.93 g, 2.63 mmol) in DMF (43 mL) was added to the Resin from previous step in a fritted reaction vessel. N,N' Diisopropylcarbodiimide (2.5 equiv., 2.62 mmol, 1.8 M) in DMF and Ethyl cyanoglyoxalate-2-oxime (2.5 equiv., 2.63 mmol, 0.9 M) in DMF were then added and the mixture was placed on an orbital shaker at ambient temperature overnight. The mixture was removed from the shaker, and the solvent was drained. The resin was washed with DMF (3×50 ml) followed by washing with dichloromethane (3×50 ml). A ninhydrin test was negative. The resin was treated with 20% piperidine in DMF (30 ml) and the mixture was agitated on a shaker table for 30 minutes. The solvent was then drained, and the resin was washed with DMF (3×30 ml). The resin was again treated with 20% piperidine in DMF (30 ml) and the mixture was agitated on a shaker table for 30 minutes. The solvent was then drained, and the resin was washed with DMF (3×50 ml) followed by dichloromethane (3×50 ml).

L-Glu Coupling and Fmoc Deprotection:

A solution of (2S)-5-tert-butoxy-2-(9H-fluoren-9-ylmethoxycarbonylamino)-5-oxo-pentanoic acid (2.5 equiv., 2.63 mmol) dissolved in DMF (43 mL) was added to the Resin from the previous step in a fritted reaction vessel. N,N' Diisopropylcarbodiimide (2.5 equiv., 2.62 mmol, 1.8 M) in DMF and Ethyl cyanoglyoxalate-2-oxime (2.5 equiv., 2.63 mmol, 0.9 M) in DMF were then added and the mixture was placed on an orbital shaker at ambient temperature overnight. The mixture was removed from the shaker and the solvent was drained. The resin was washed with DMF (3×50 ml) followed by washing with dichloromethane (3×50 ml). A ninhydrin test was negative. The resin was treated with 20% piperidine in DMF (30 ml) and the mixture was agitated on a shaker table for 30 minutes. The solvent was then drained, and the resin was washed with DMF (3×30 ml). The resin was again treated with 20% piperidine in DMF (30 ml) and the mixture was agitated on a shaker table for 30 minutes. The solvent was then drained, and the resin was washed with DMF (3×50 ml) followed by dichloromethane (3×50 ml).

Purification of the Crude Peptide:

A solution of 50 mg crude peptide in 0.1% formic acid in $H_2O$ (1.0 mL) and acetonitrile (0.4 mL) was filtered through a cotton plug, rinsed with 0.1% formic acid in $H_2O$ (0.2 mL). It was then subjected to HPLC purification (Phenomenex Gemni C18 RP-HPLC prep column, 10 to 40% 0.1% Formic acid in $H_2O$/Acetonitrile as mobile phases). The fractions were collected and lyophilized to afford Compound 7 (12 mg) as a white, fluffy solid. ES/MS m/z 1077.5 (M+H).

Step B: Synthesis of Compound 7-Al

A solution of Compound 7 (crude peptide, 50 mg, ~0.046 mmol) in 20 mM $AlCl_3$ in 0.1 M NaOAc (5.5 mL, 0.11 mmol) and 100 mM NaF in $H_2O$ (1.1 mL, 2.0 equiv., 0.11 mmol) was first sonicated, before the mixture was heated to 105° C. for 30 min. The solution was then filtered and subjected to direct HPLC purification (Phenomenex Gemni C18 RP-HPLC prep column, 0.1% Formic acid in $H_2O$/Acetonitrile as mobile phases). The fractions were collected and lyophilized to afford Compound 7-Al (1:1) (13 mg) as an off-white, fluffy solid. ES/MS m/z 1121.5 (M+H).

Radiosynthesis of Compound $^{18}F$-7-Al on Neptis Perform

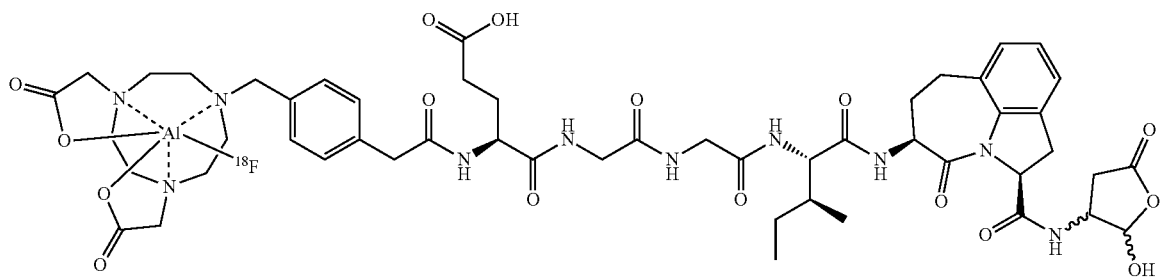

NODA Chelate Coupling:

A solution of 2-[4-[[4,7-bis(2-tert-butoxy-2-oxo-ethyl)-1,4,7-triazonan-1-yl]methyl]phenyl]acetic acid (2 equiv., 1.06 g, 2.10 mmol) in DMF (30 mL) was added to the Resin from the previous step (~1.05 mmol) in a fritted reaction vessel. N,N'-Diisopropylcarbodiimide (2 equiv., 2.10 mmol, 1.8 M) in DMF and Ethyl cyanoglyoxalate-2-oxime (2 equiv., 2.10 mmol, 0.9 M) in DMF were then added and the mixture was placed on an orbital shaker at ambient temperature for 46 hrs. The mixture was removed from the shaker and the solvent was drained. The resin was washed with DMF (3×20 ml) followed by washing with dichloromethane (3×20 ml). A ninhydrin test was negative. The material was stored in a vacuum oven at ambient temperature over the weekend.

Final Cleavage from Resin:

The Resin from the previous step (~1.05 mmol) was treated with a mixture of trifluoroacetic acid (10 mL) and dichloromethane (30 mL) and the suspension was agitated on a shaker table overnight. The suspension was removed from the shaker table and the solvent was drained. The resin was washed with dichloromethane (3×25 ml) and then blown dry with nitrogen. The resin was then placed in a vacuum oven at ambient temperature overnight. The resin was transferred to a round bottom flask and treated with a mixture of trifluoroacetic acid (0.6 mL, 8 mmol), Water (24 mL), and Acetonitrile (36 mL). The suspension was gently stirred and heated at 60° C. for 1 hour. The hot suspension was filtered by vacuum filtration and the resin was washed 1× with a mixture of Water (24 mL), and Acetonitrile (36 mL). The filtrate was then frozen at −78° C. and placed on a lyophilize to give 651.8 mg of a yellow solid as the crude peptide.

Typical $^{18}F$-7-Al ranges from 18-22% (for pk2 only) and ~59% (for pk1 and pk2 combined) can be synthesized on a Neptis perform in 65±5 min. The products radiochemical purity >95% and specific activity ranges from 497-2196 GBq/umol (12-53 mCi/µg). Preloaded reaction vessel with precursor 7 [0.2 mL, 2 mg/mL in Acetic acid-Sodium acetate buffer (1.0 mol/L, pH=3.5)], aluminum chloride solution (133 µL, 2.4 mM in Water for Injection) and acetonitrile (677 µL). [$^{18}F$]Fluoride (0.5-2.0 Ci) activity was retained on a Waters Sep-Pak Accell Plus QMA Carbonate Plus Light Cartridge (46 mg Sorbent per Cartridge, 40 µm Particle Size, Waters Part No. 186004540, pre conditioned with 5 mL saline (USP) followed by 5 mL Water for injection) and then eluted to the reaction vessel with saline (0.8 mL, USP). The resulting mixture was kept at 105° C. for 15 minutes and then cooled down to 60° C. 4.6 mL of water (HPLC grade) was added to reaction vessel and the diluted reaction mixture was then loaded onto semipreparative HPLC column (Agilent XDB-C18, 9.4×250 mm, Part No. 990967-202) for purification. Purification conditions are listed below:

1) For preparing Peak 2 only:
   Column—Agilent ZORBAX Eclipse XDB-C18 (Part No. 990967-202), 5 µm, 9.4 mm×250 mm
   Isocratic method—Purification mobile phase: 11% Acetonitrile, 89% Ammonium acetate/water solution (20 mM), flowrate=4 mL/min, UV @254 nm. Typical peak collection range is from ~28-30 min. (FIG. 1).

Figure 3:
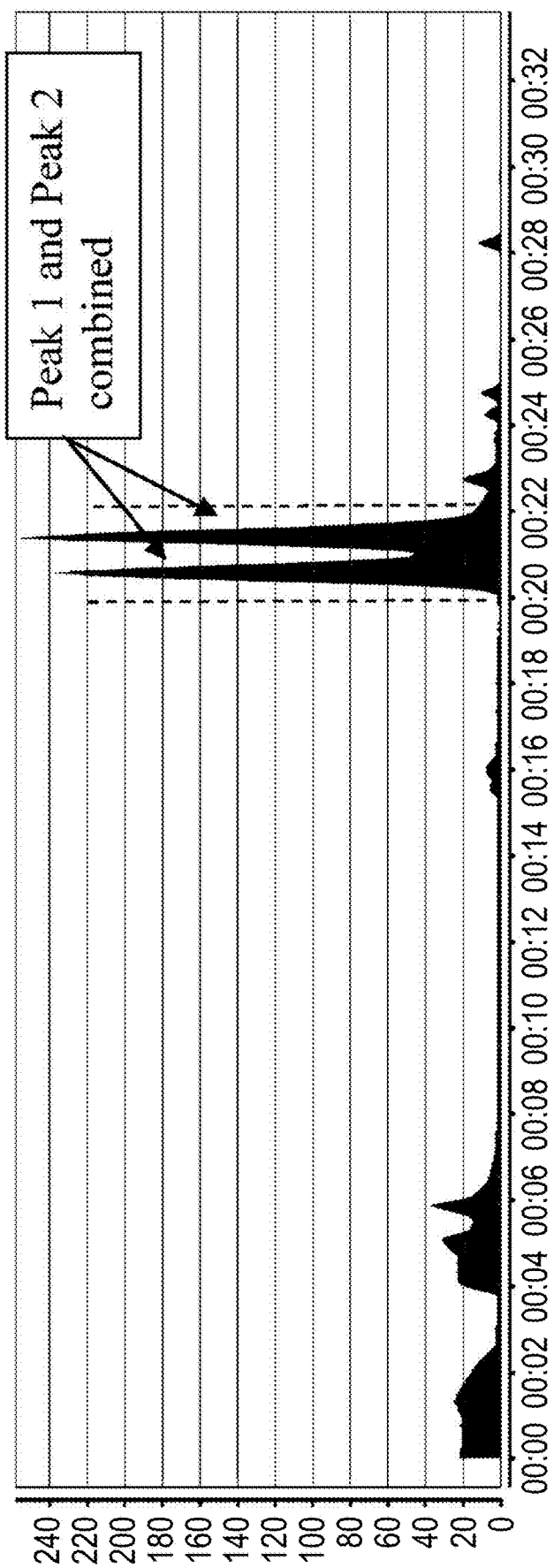
FIG. 3 depicts semi-preparative HPLC purification chromatogram of Compound $^{18}$F-7-Al Peak 1 and Peak 2 combined via radiosynthesis with ORA Neptis Radiosynthesizer.

2) For preparing Peak 1 and Peak 2 combined:
   Column—Agilent ZORBAX Eclipse XDB-C18 (Part No. 990967-202), 5 µm, 9.4 mm×250 mm
   Gradient method—Purification mobile phase: 8% acetonitrile in 20 mM Ammonium acetate/water solution to 20% acetonitrile in 20 mM Ammonium acetate/water solution in 24 min, flowrate=4 mL/min, UV@254 nm. Typical peak collection range is from ~20-22 min. (FIG. 3)

The collected fraction was then diluted with 0.5% (w/v) Sodium ascorbate in water solution (~30 mL) and passed through a Waters Sep-Pak C18 Plus Light cartridge (130 mg sorbent per cartridge, 55-105 um, Part No: 023501, preconditioned with 5.0 mL Ethanol followed by 5 mL of Water), product retained on the cartridge was then washed with 0.5% (w/v) Sodium ascorbate in water solution (~15 mL) and then eluted with 1.5 mL EtOH (USP) into final product vial containing 10.0 mL of 0.9% Sodium Chloride Injection (USP) and Sodium ascorbate (USP, 0.5% w/v). The C18 cartridge is then rinsed with additional 3.5 mL of 0.9% Sodium Chloride Injection (USP) and Sodium ascorbate (USP, 0.5% w/v) to afford 15.0 mL formulated product as 10% v/v EtOH and 90% v/v 0.9% Saline containing 0.5% w/v Sodium Ascorbate.

Figure 2:
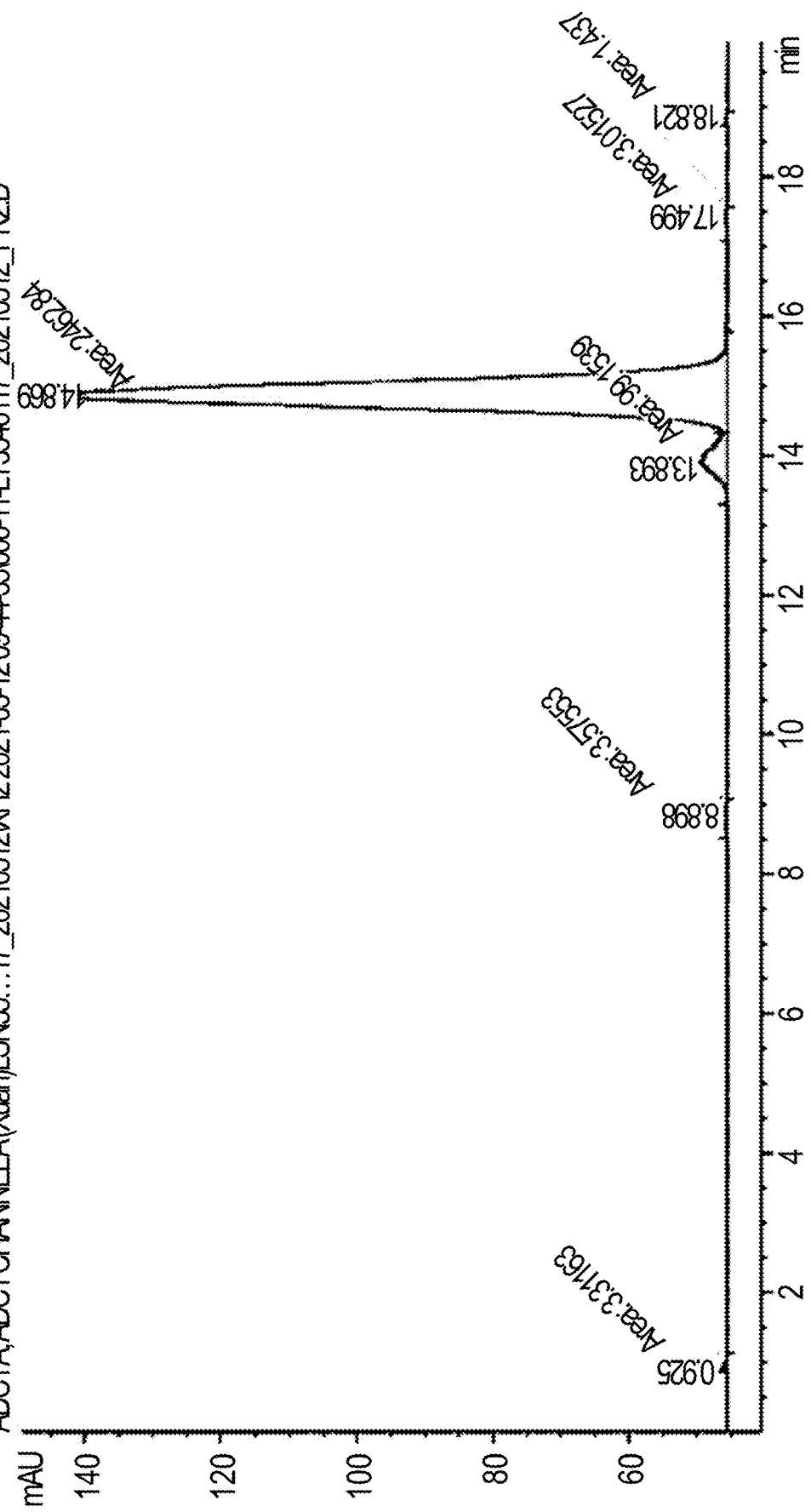
FIG. 2 depicts analytical HPLC chromatogram of Compound $^{18}$F-7-Al Peak 2.
Figure 4:
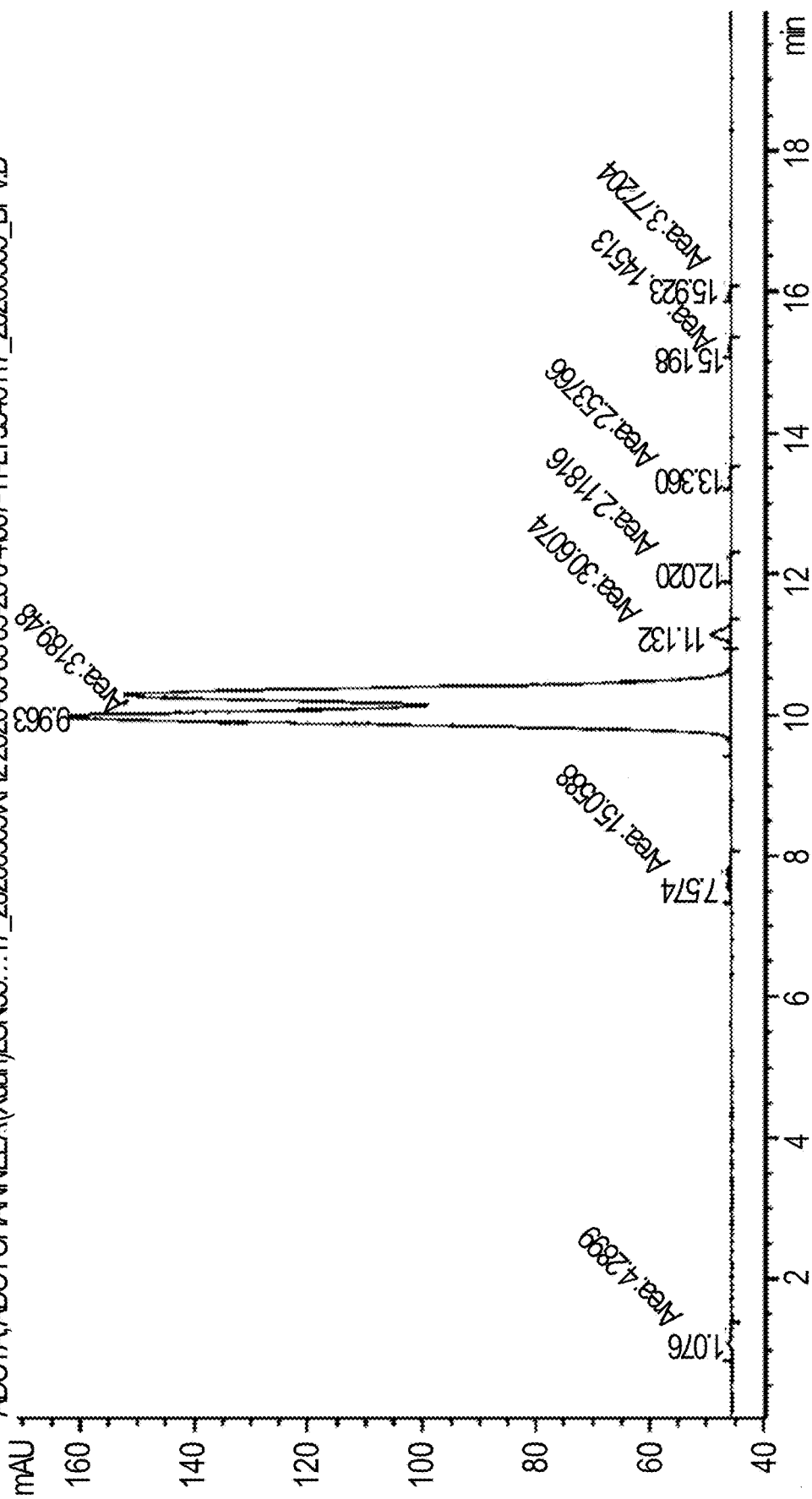
FIG. 4 depicts analytical HPLC chromatogram of Compound $^{18}$F-7-Al Peak land Peak 2 combined.

To prepare sterile product, the resulting product ($^{18}$F-7-Al in 10% v/v ethanol and 90% v/v 0.9% saline containing 0.5% w/v Sodium Ascorbate) is sterile filtered through a 0.22 μm filter (e.g. Millex® GV sterilizing filter, Millipore Part #SLGV033RS) into a bulk product vial. A sample from the bulk product vial is taken out for HPLC analysis. (FIGS. 2 and 4)

Analytical HPLC Condition: (FIG. 2)

Analytical Column: Waters Xbridge BEH C-18 3.5 μm, 4.6×100 mm; flow rate=1.2 mL/min, UV @254 nm. Retention time 14-16 min.

Mobile Phase Composition: A: 20 mM Ammonium acetate in water, B: Acetonitrile (HPLC grade)

Gradient:

| Time (min) | % Mobile Phase A | % Mobile Phase B |
|---|---|---|
| 0.0 | 92 | 8 |
| 1.0 | 92 | 8 |
| 15.0 | 87 | 13 |
| 20.0 | 87 | 13 |
| 20.1 | 92 | 8 |
| 25 | 92 | 8 |

Analytical HPLC Condition: (FIG. 4)

Analytical Column: Agilent ZORBAX Eclipse XDB-C18 4.6×150 mm, Part No. 993967-902; flow rate=1.5 mL/min, UV @254 nm Gradient method—Mobile Phase: A: 20 mM Ammonium acetate in water, B: Acetonitrile (HPLC grade)

| Time (min) | % Mobile Phase A | % Mobile Phase B |
|---|---|---|
| 0.0 | 95 | 5 |
| 20.0 | 80 | 20 |

Example 2: Characterization of Granzyme B Binding Activity

The compounds described above were tested using the human Granzyme B biochemical assay provided below.

TABLE 3

| Assay parameters | |
|---|---|
| Enzyme: Granzyme B (human lymphocytes) | 5 nM |
| Substrate: Ac-IETD-AFC | 200 μM |
| Cpd incubation with enzyme | 30 mins |
| Assay temperature | 22° C. |
| Read time | 60 mins |
| Std inhibitor | C006 |
| Reader | EnVision multimode plate reader 2104 |

Materials

1. Granzyme B (human lymphocytes) Enzyme: Enzo Lifesciences, Cat #ALX-200-602-C010
2. Substrate (Ac-IETD-AFC): Enzo Lifesciences, Cat #ALX-260-110-M010
3. Standard inhibitor (Compound 20-Isomer3): Synthesized internally in TCG
4. Dimethyl sulfoxide (DMSO): Sigma-Aldrich, Cat #41639
5. HEPES: Gibco, Cat #15630-080
6. Calcium chloride: Sigma-Aldrich, Cat #C-5080
7. Distilled water: Gibco, Cat #15230-162
8. Bovine serum albumin (BSA): Sigma-Aldrich, Cat #A3059
9. Black, clear bottom PDL plate (384 wells): Greiner bio-one, Cat #781946
10. Polypropylene plate (384 wells): Corning, Cat #3657

TABLE 4

| Assay Buffer composition | |
|---|---|
| Components | Concentration |
| HEPES | 50 mM |
| CaCl$_2$ | 10 mM |
| In distilled water | |
| pH adjusted to 7.5 with 5(N) NaOH | |

Compound Preparation:

1. DMSO is added to the respective compound vial to make 10 mM Compound stock solution, which is stored at −20° C.
2. 10 mM Compound stock solution is thawed and 1 mM DMSO stock solution is prepared by adding 45 μl of DMSO to 5 μl of 10 mM compound stock solution.
3. 1 mM DMSO stock solution is serially diluted (3.16 fold) by adding 10 μl of 1 mM DMSO stock to 21.6 μl of DMSO and mixed well. 10 μl of the resulting solution is then added to 21.6 μl of DMSO and mixed well. This process is continued to create 11 dilution points for the assay standard inhibitor and 8 dilution points for test compounds in 384 well polypropylene plate.
4. 20 μl of each dilution are dispensed in assay ready plate.

5. Each well is then diluted 25 fold by adding 48 μl of assay buffer to 2 μl of compound in assay ready plate to make Compound working stock.

Enzyme Preparation:
1. Supplied Granzyme B (human lymphocytes) enzyme is reconstituted to 1 mg/ml (about 31.25 μM) and 1 μl aliquots are kept in −80° C.
2. 1 μl aliquot is diluted to 625 nM by adding 49 μl of assay buffer containing 0.1% BSA and gently mixed.
3. 10 nM enzyme working stock is prepared by adding assay buffer containing 0.1% BSA.

Substrate Preparation:
1. Supplied substrate (Ac-IETD-AFC) is reconstituted by adding DMSO to make 10 mM stock, aliquoted and stored in −80° C.
2. 4 mM substrate mid stock is prepared by adding DMSO.
3. Substrate working stock i.e. 800 μM is prepared by adding assay buffer.

Assay Protocol:
1. 10 μl of serially diluted Compound working stock (start dose 40 μM) is added from assay ready plate to assay plate according to the plate map.
2. Positive control (40 μM of standard inhibitor) and negative control (4% DMSO buffer) are added to the respective wells.
3. 20 μl of Enzyme working stock is added to assay plate and gently mixed.
4. The plate is incubated at 22° C. for 30 mins and spun at 130 g for 1 minute.
5. After incubation, 10 μl of Substrate working stock is added to respective wells and mixed (Assay plate is maintained in dark after substrate addition).
6. The plate is incubated at 22° C. for 60 mins and spun at 130 g for 1 minute.
7. Fluorescence read (RFU) (Ex: 400 nm/Em: 505 nm) is taken after 60 mins in EnVision Multimode plate reader.

TABLE 5

| Final assay concentration | | |
|---|---|---|
| Reagent | Final concentration | Volume added |
| Compound/Std/Controls | Starting from 10 μM, 3.16 fold serial dilution | 10 μl |
| Enzyme | 5 nM | 20 μl |
| Substrate | 200 μM | 10 μl |

Data Analysis:
1. The RFU read is analyzed to calculate percent inhibition by normalizing with positive and negative controls taken as 100% and 0% effect respectively in Microsoft excel.
2. Graph is generated by putting the analyzed data in GraphPad prism 5.0 software to get $IC_{50}$ value for each compound.

Shown in Table 6 below are the structures and activities of exemplary compounds. These compounds exhibited high potency in inhibiting Granzyme B as indicated by their $IC_{50}$ values included in the following table.

TABLE 6

| $IC_{50}$ Value of Exemplar Compound | | |
|---|---|---|
| | Structure | $IC_{50}$ (nM) |
| 7-Al | 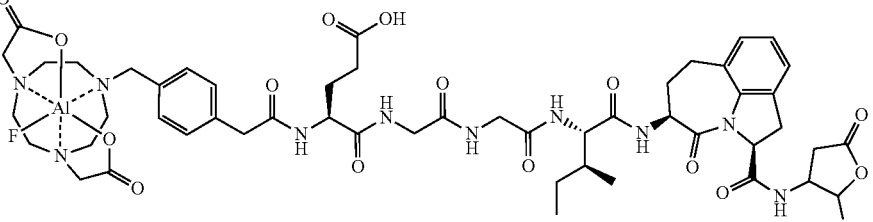 | 6.4 |

Example 3: Synthesis of Exemplary Granzyme B Targeting Compounds

The synthetic methods described above were used with the following general peptide synthesis procedure in the synthesis of the following compounds and the exact mass for each was recorded:

General peptide synthesis procedure: Peptides were synthesized following standard Fmoc solid-phase peptide synthesis procedures using H-Asp(OtBu)-H resin. Final peptides were deprotected and cleaved from the resin following a two-step procedure: 1) treatment with either trifluoroacetic acid (TFA) at room temperature for 2 h or TFA/dichloromethane (DCM) at room temperature overnight, then concentrated; 2) treatment with 0.1% TFA in acetonitrile/water (60:40) at 60° C. for 1 h. Crude peptides were either concentrated or lyophilized, then subjected to preparative HPLC purification (0.1% formic acid or 0.1% TFA in water/acetonitrile mobile phase). Product-containing fractions were collected and lyophilized to afford peptides as white, fluffy solids.

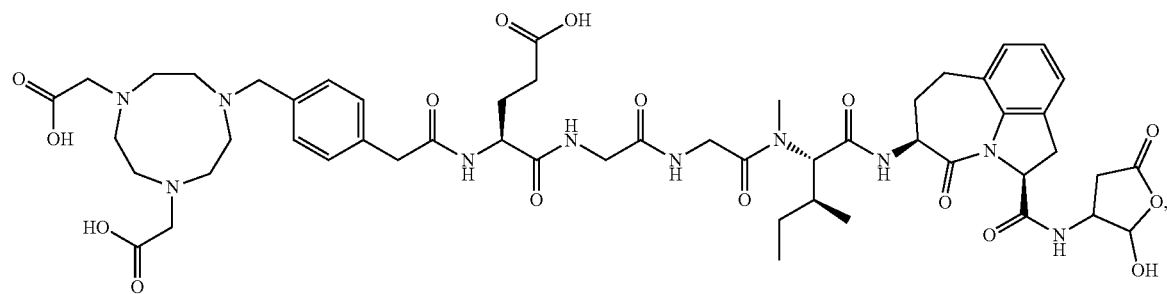 [SMILES: CC[C@H](C)[C@@H](C(=O)N[C@H]1CCc2cccc3c2N(C1=O)[C@H](C(=O)NC1CC(=O)OC1O)C3)N(C)C(=O)CNC(=O)CNC(=O)[C@H](CCC(=O)O)NC(=O)Cc1ccc(CN2CCN(CC(=O)O)CCN(CC(=O)O)CC2)cc1]
ES/MS m/z 1091.5 (M+H)⁺.
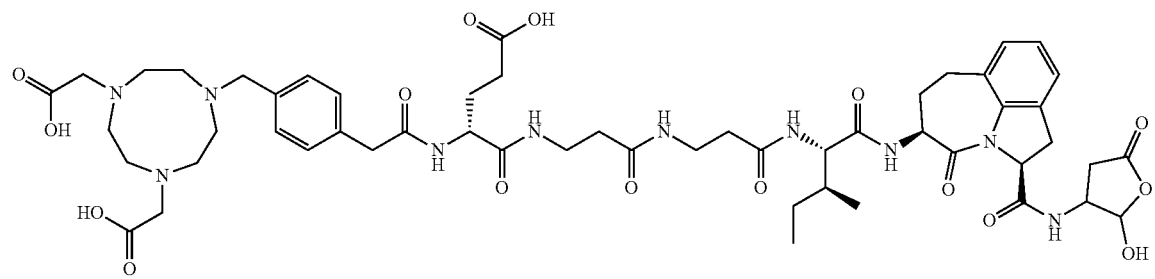 [SMILES: CC[C@H](C)[C@H](NC(=O)CCNC(=O)CCNC(=O)[C@@H](CCC(=O)O)NC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 1105.5 (M+H)⁺.
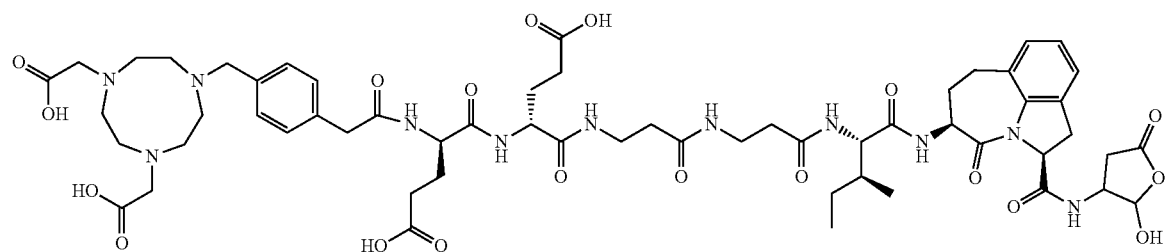 [SMILES: CC[C@H](C)[C@H](NC(=O)CCNC(=O)CCNC(=O)[C@@H](CCC(=O)O)NC(=O)[C@@H](CCC(=O)O)NC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 1234.7 (M+H)⁺.
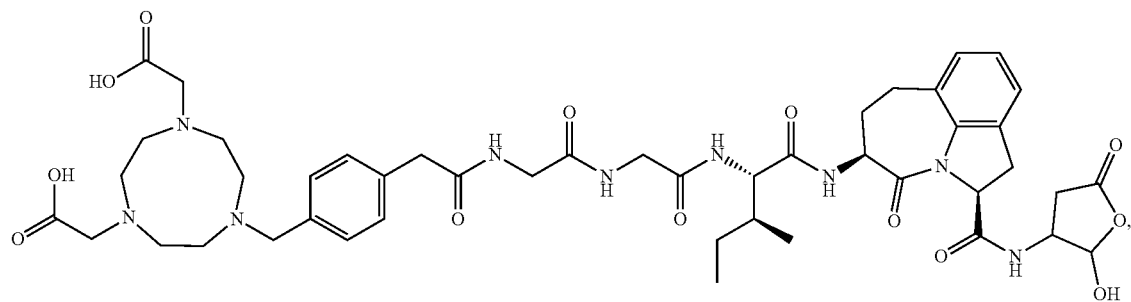 [SMILES: CC[C@H](C)[C@H](NC(=O)CNC(=O)CNC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 948.4 (M+H)⁺.

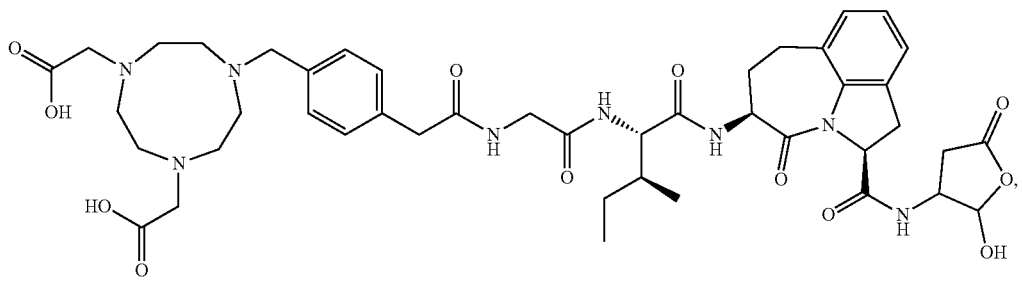 [SMILES: CC[C@H](C)[C@H](NC(=O)CNC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 891.5 (M+H)+.
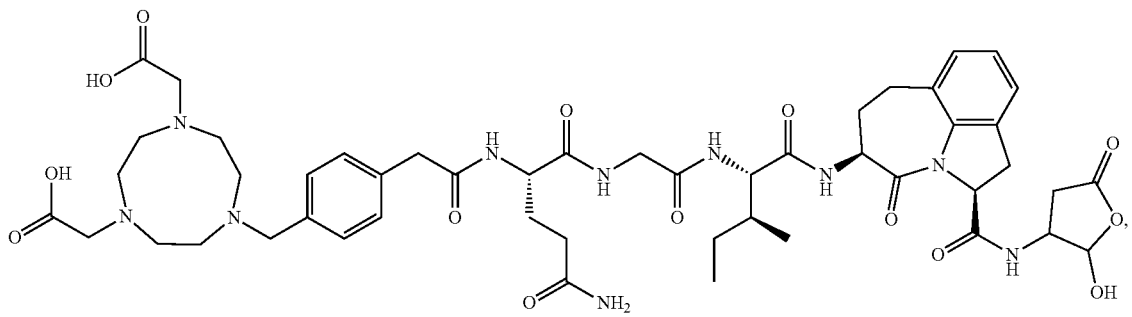 [SMILES: CC[C@H](C)[C@H](NC(=O)CNC(=O)[C@H](CCC(N)=O)NC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 1019.5 (M+H)+.
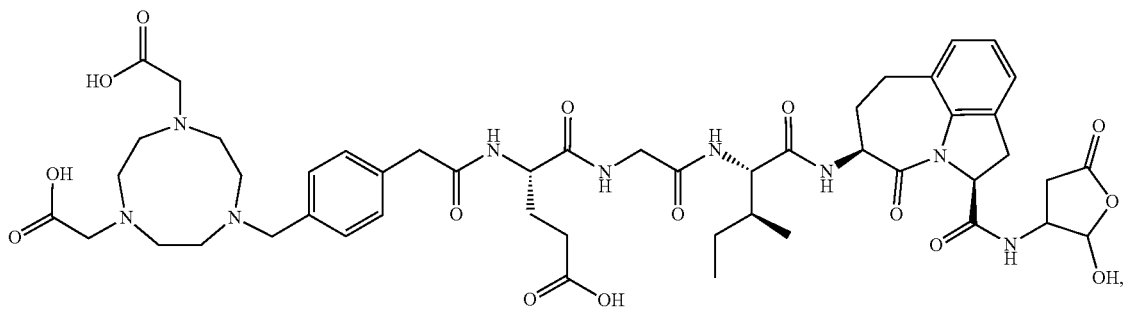 [SMILES: CC[C@H](C)[C@H](NC(=O)CNC(=O)[C@H](CCC(=O)O)NC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 1020.5 (M+H)+.
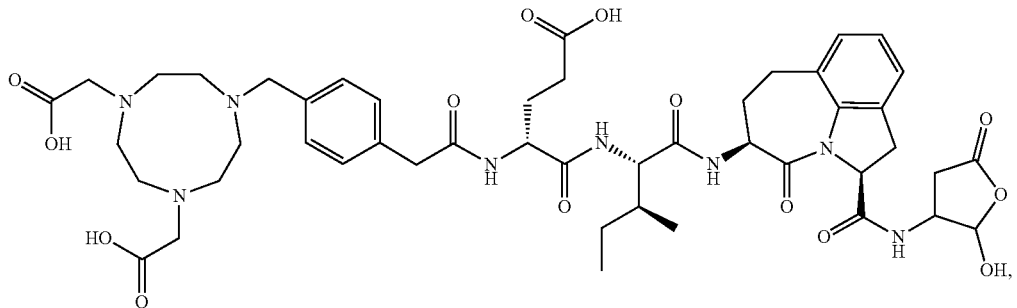 [SMILES: CC[C@H](C)[C@H](NC(=O)[C@@H](CCC(=O)O)NC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 963.5 (M+H)+.

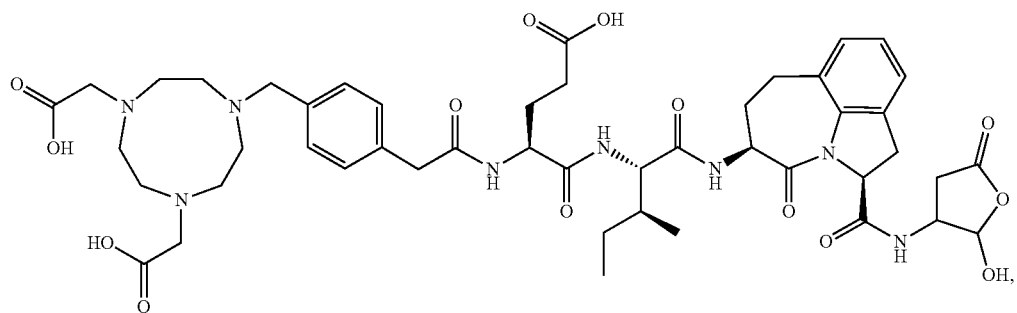 [SMILES: CC[C@H](C)[C@H](NC(=O)[C@H](CCC(=O)O)NC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 963.5 (M+H)⁺.
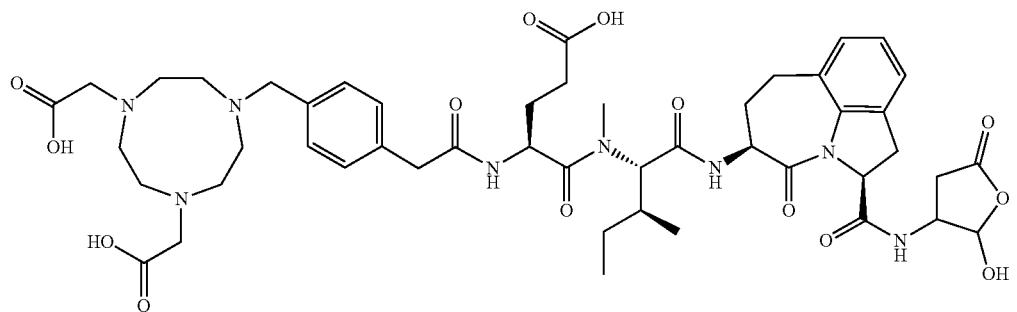 [SMILES: CC[C@H](C)[C@@H](C(=O)N[C@H]1CCc2cccc3c2N(C1=O)[C@H](C(=O)NC1CC(=O)OC1O)C3)N(C)C(=O)[C@H](CCC(=O)O)NC(=O)Cc1ccc(CN2CCN(CC(=O)O)CCN(CC(=O)O)CC2)cc1]
ES/MS m/z 977.5 (M+H)⁺
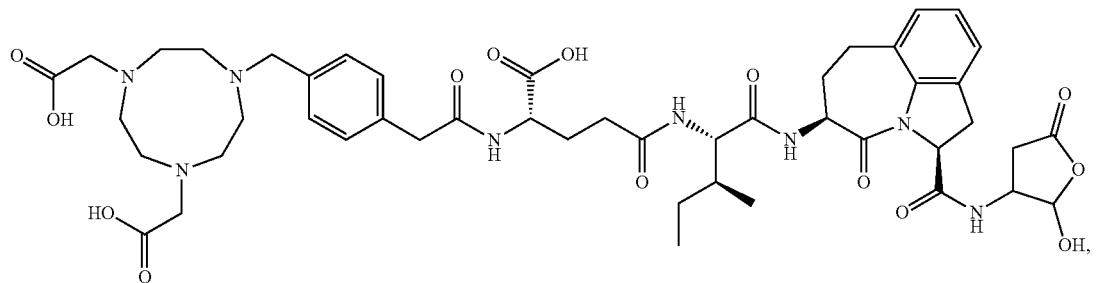 [SMILES: CC[C@H](C)[C@H](NC(=O)CC[C@H](NC(=O)Cc1ccc(CN2CCN(CC(=O)O)CCN(CC(=O)O)CC2)cc1)C(=O)O)C(=O)N[C@H]1CCc2cccc3c2N(C1=O)[C@H](C(=O)NC1CC(=O)OC1O)C3]
ES/MS m/z 963.5 (M+H)⁺
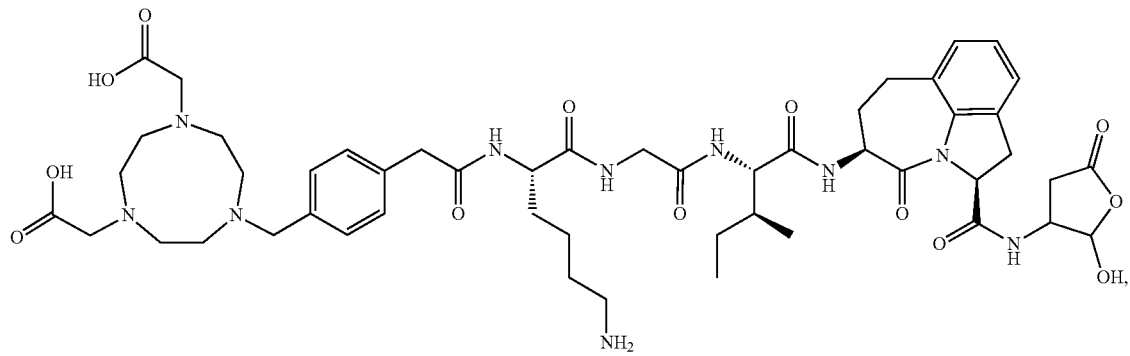 [SMILES: CC[C@H](C)[C@H](NC(=O)CNC(=O)[C@H](CCCCN)NC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]
ES/MS m/z 1019.6 (M+H)⁺

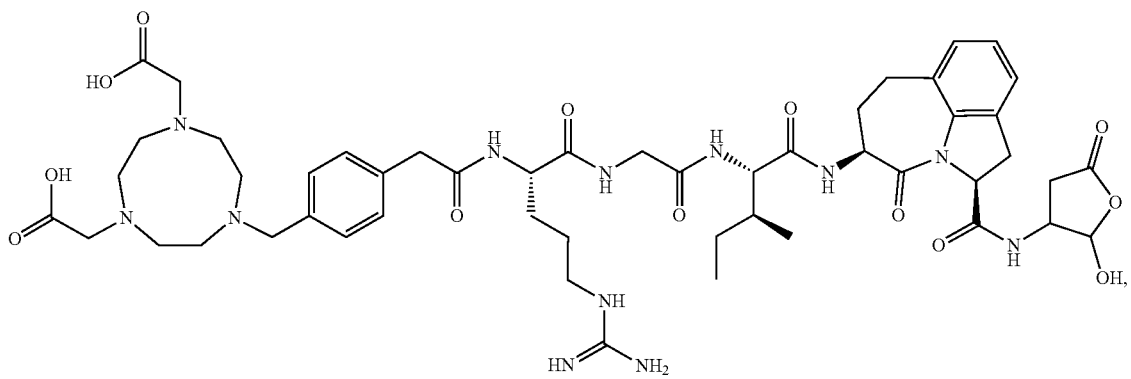 [SMILES: CC[C@H](C)[C@H](NC(=O)CNC(=O)[C@H](CCCNC(=N)N)NC(=O)Cc1ccc(CN2CCN(CC(=O)O)CCN(CC(=O)O)CC2)cc1)C(=O)N[C@H]1CCc2cccc3c2N(C1=O)[C@H](C(=O)NC1CC(=O)OC1O)C3]

ES/MS m/z 1047.6 (M+H)$^+$

The following general procedure was used to form the compounds below: To a reaction vial containing peptide precursor and a stir bar, was added equal equivalent (1.5-3.0 equiv relative to peptide) of 20 mM AlCl$_3$ in 0.1M NaOAc (pH ~4.5) and 100 mM NaF in H$_2$O. Then acetonitrile (0-34% of the total reaction volume) was added. The mixture was heated to 100° C. for 15-30 mins. Acetonitrile was removed under reduced pressure, and the aqueous solution was purified by either C18 ISCO column or C18 HPLC preparatory column (using 0.1% formic acid in water and acetonitrile as eluents). The proper fractions were collected and lyophilized to afford the peptide AlF complexes as white, fluffy solids.

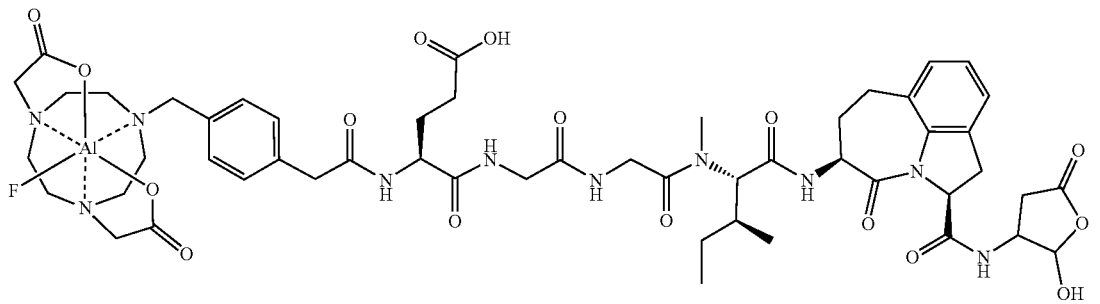

Following the general procedure, 1 (60 mg) was converted to 1-Al (1:1) (22 mg) as a white, fluffy solid. ES/MS m/z 1135.4 (M+H)$^+$

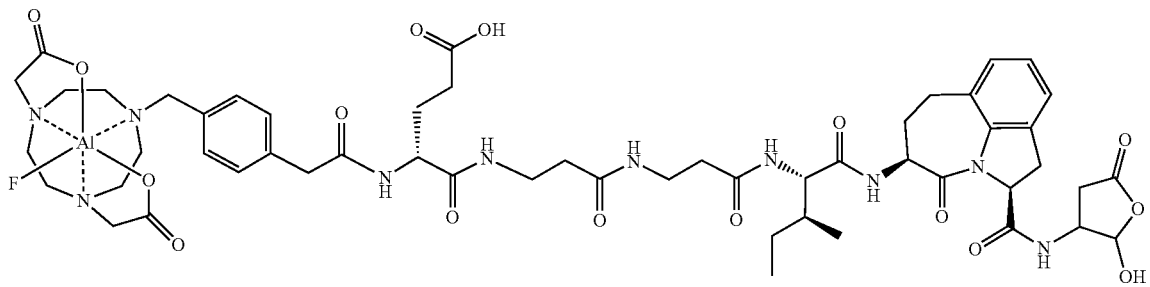

Following the general procedure, 2 (16 mg) was converted to 2-Al (1:1) (8.6 mg) as a white, fluffy solid. ES/MS m/z 1149.5 (M+H)$^+$

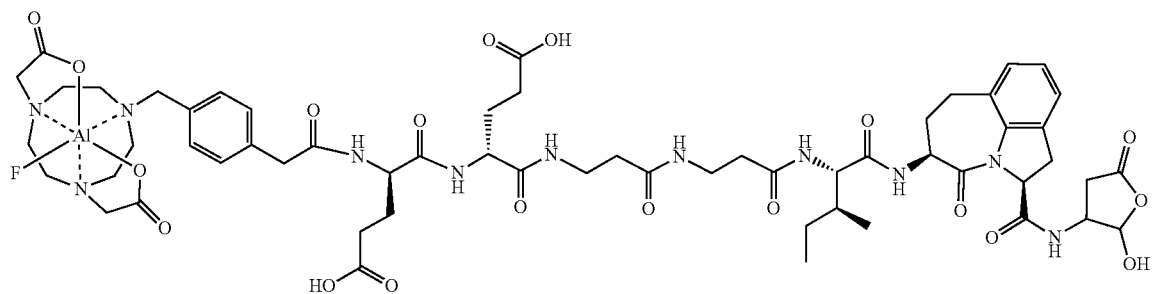
Following the general procedure, 18 (15 mg) was converted to 18-Al (1:1) (7.2 mg) as a white, fluffy solid. ES/MS m/z 1278.5 (M+H)$^+$
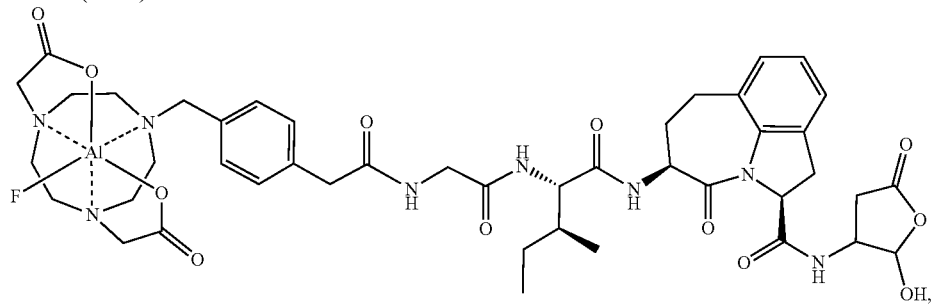
Following the general procedure, 4 (30 mg) was converted to 4-Al (1:1) (22 mg) as a white, fluffy solid. ES/MS m/z 935.4 (M+H)$^+$
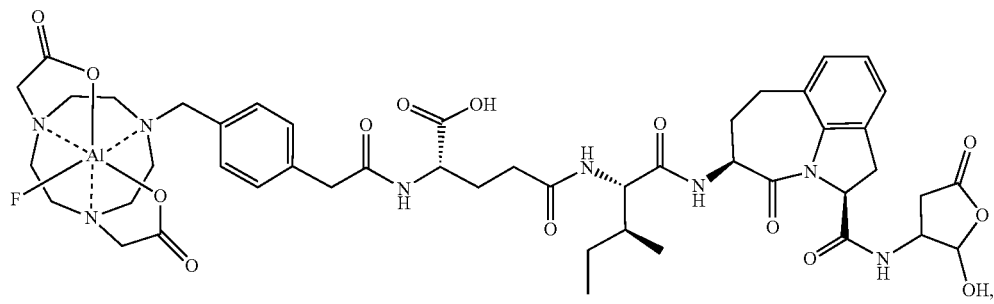
Following the general procedure, 11 (30 mg) was converted to 11-Al (1:1) (15 mg) as a white, fluffy solid. ES/MS m/z 1007.4 (M+H)$^+$
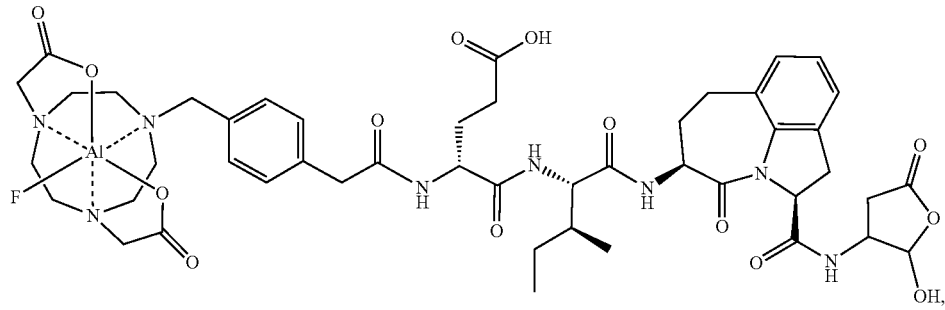

Following the general procedure, 9 (30 mg) was converted to 9-Al (1:1) (24 mg) as a white, fluffy solid. ES/MS m/z 1007.4 (M+H)$^+$

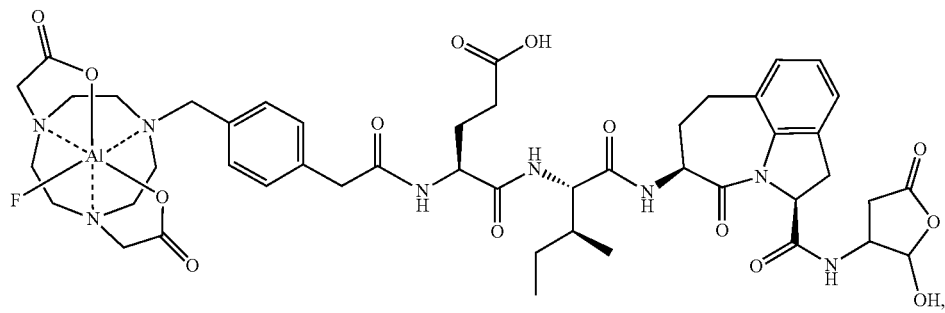

Following the general procedure, 10 (30 mg) was converted to 10-Al (1:1) (24 mg) as a white, fluffy solid. ES/MS m/z 1007.5 (M+H)$^+$

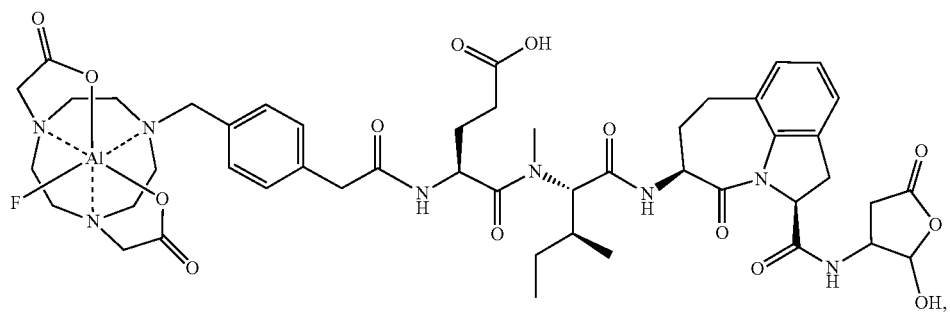

Following the general procedure, 17 (30 mg) was converted to 17-Al (1:1) (23 mg) as a white, fluffy solid. ES/MS m/z 1021.5 (M+H)$^+$

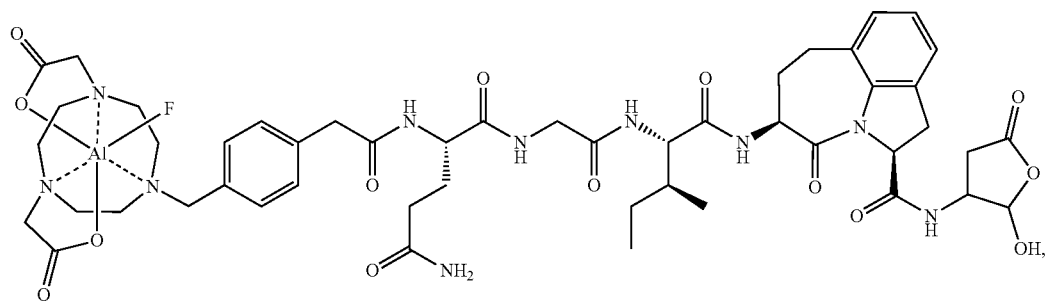

Following the general procedure, 5 (34 mg) was converted to 5-Al (1:1) (25 mg) as an off-white, fluffy solid. ES/MS m/z 1063.5 (M+H)$^+$

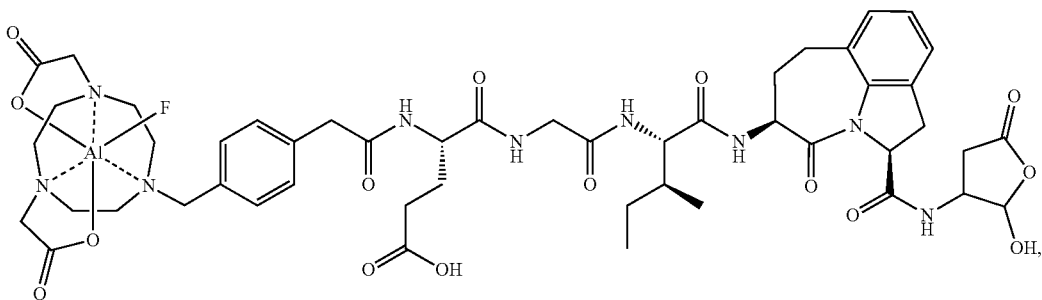
Following the general procedure, 6 (30 mg) was converted to 6-Al (1:1) (25 mg) as a white, fluffy solid. ES/MS m/z 1064.5 (M+H)⁺
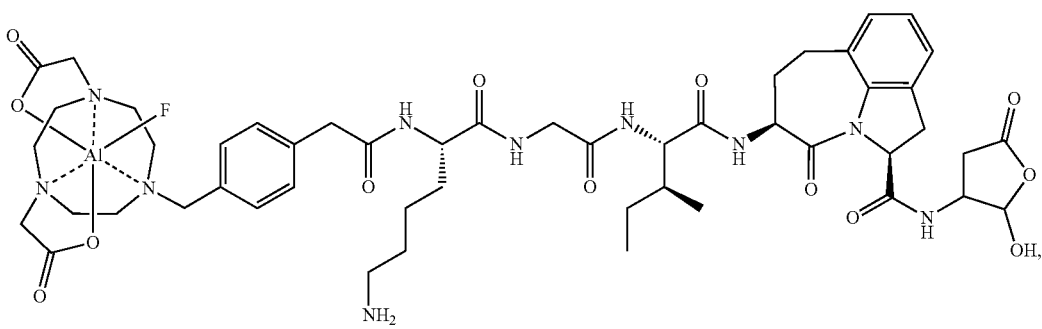
Following the general procedure, 12 (30 mg) was converted to 12-Al (1:1) (16 mg) as an off-white, fluffy solid. ES/MS m/z 1063.6 (M+H)⁺
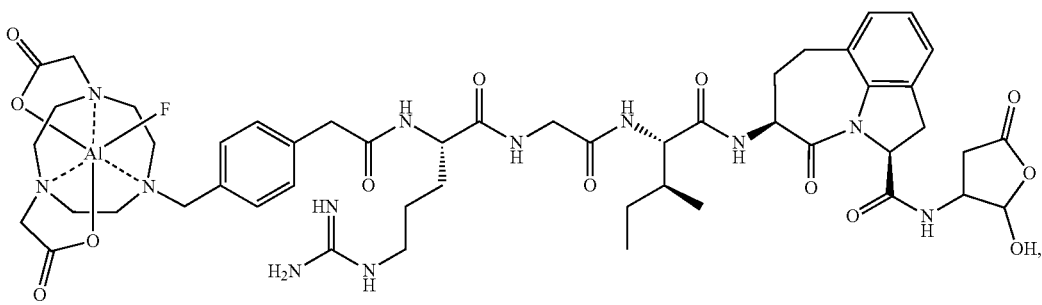
Following the general procedure, 13 (31 mg) was converted to 13-Al (1:1) (23 mg) as an off-white, fluffy solid. ES/MS m/z 1091.5 (M+H)⁺

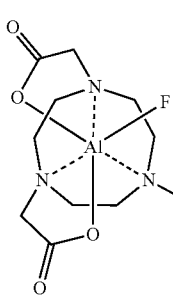

Following the general procedure, 3 (19 mg) was converted to 13-Al (1:1) (9 mg) as an off-white, fluffy solid. ES/MS m/z 992.5 (M+H)+

Example 4: Radiosynthesis Procedures

General Radiosynthesis of Target Compounds

Typical [18F]-GZB compound RCY ranges from 5.6-63% using 0.5-2.0 Ci starting activity with synthesis time of 75±10 minutes. Precursor (e.g. 0.2-0.6 mg) in Acetic acid/Sodium acetate aqueous buffer (e.g. 200-400 μL, 1 mol/L, pH 3.0-5.0), $AlCl_3 \cdot 6H_2O$ (e.g. 34-82 μg, 100-240 nmol) and acetonitrile (e.g. 25-50% of total reaction mixture volume) are added into a reaction vial. The [18F]Fluoride activity is retained on a conditioned [with 5 mL of 0.9% saline followed by 5 mL of WFI (Water for Injection)] anion exchange resin (e.g. Sep-Pak Accell Plus QMA Carbonate Plus Light Cartridge, 46 mg Sorbent per Cartridge, 40 μm Particle Size, Waters Part No. 186004540). The retained [18F] Fluoride is eluted from the cartridge into the reaction vial by 0.9% saline (e.g., 0.5-0.8 mL). The resulting mixture is heated (e.g., 105° C.) for a certain time (e.g., 15 minutes) and then cooled (e.g., 60° C.) prior to dilution with Water (e.g., 1.0-5.0 mL, HPLC grade). The resulting crude is loaded onto a semi-preparative reverse phase HPLC column (e.g. Agilent ZORBAX Eclipse XDB-C18, 5 μm, 9.4 mm×250 mm, Part No. 990967-202) for purification (e.g., mobile phase comprising aqueous acetonitrile (8-20%) solution, pH 1-8). The HPLC fraction containing the purified [18F]-GZB compound is diluted with 0.5% w/v Sodium Ascorbate aqueous solution (e.g. 30-50 mL) and is then passed through a conditioned [with 5 mL of ethanol (USP grade) followed by 5 mL of water (HPLC grade)] reverse phase cartridge (e.g., Sep-Pak® Light C18 Cartridge, 130 mg Sorbent per Cartridge, 55-105 μm Particle Size, Waters Part No. WAT0523501). The retained [18F]-GZB is washed with 0.5% w/v Sodium Ascorbate aqueous solution (e.g., 5-15 mL) and eluted off the cartridge using ethanol (e.g., 1.0-1.5 mL) into the formulation vial containing 0.5% w/v Sodium Ascorbate in 0.9% Saline (e.g., 6.0-10.0 mL). The C18 cartridge is then rinsed with additional 0.5% w/v Sodium Ascorbate in 0.9% Saline (e.g., 3.0-3.5 mL) and the rinsate is collected into the formulation vial. Certain amount of Diluent (10% v/v ethanol and 90% v/v 0.9% saline containing 0.5% w/v Sodium Ascorbate) can be added to adjust product strength.

To prepare sterile product, the resulting product ([18F]-GZB in 10% v/v ethanol and 90% v/v 0.9% saline containing 0.5% w/v Sodium Ascorbate) is sterile filtered through a 0.22 μm filter (e.g., Millex® GV sterilizing filter, Millipore Part #SLGV033RS; Millex GV 25 mm sterilizing filter, Millipore Part #SLGVV255F; and Millex LG 25 mm sterilizing Filter, Millipore Part #SLLG025SS) into a bulk product vial.

Example 5: Competitive Binding Assay

Purpose: To perform competitive binding assays with human granzyme B using [18F]-20-Al to determine $IC_{50}$ values of potential granzyme B ligands Materials

| | |
|---|---|
| 11. Granzyme B (human lymphocytes) Enzyme: | Enzo Lifesciences, Cat # ALX-200-602-C010 |
| 12. Millipore MultiScreen$_{HTS}$ FB plates | Millipore, Cat # MSFBN6B |
| 13. Millipore MultiScreen$_{HTS}$ vacuum manifold | Millipore, Cat # MSVMHTS00 |
| 14. Millipore MultiScreen ®punch tips | Millipore, Cat # MADP19650 |
| 15. MultiScreen ® multiple punch system | Millipore, Cat # MAMP09608 |
| 16. 96 well 0.5 mL assay plates | Thermo Fisher, Cat # 12-565-502 |
| 17. Reaction buffer (10 mM HEPES, 150 mM NaCl, 1 mM EDTA, 0.01% BSA, pH 7.4 | |

Methods

Initial Plate Preparation (Including Total Binding and Non-Specific Binding):

1. 78 μL of reaction buffer, as described above, is added to each well in a 96 well plate
2. For wells used to examine total binding (defined as the binding of the radioligand in the absence of competitors), 2 μL of DMSO is added to give 1% final DMSO concentration for all wells
3. For wells used to examine non-specific binding (defined as the binding of the radioligand in the presence of 10 μM 20-Al), 2 μL of 1 mM 20-Al is added to give a final concentration of 10 μM Enzyme Preparation:

1. Granzyme B (GZB, human lymphocyte) is diluted to 0.5 μg/mL using reaction buffer as described above 2. 100 μL of 0.5 μg/mL diluted human GzB is added to each well, giving 50 ng per well and a final concentration of 0.25 μg/mL Compound Preparation:
1. DMSO or water is added to the respective compound vial to make 1 mM compound stock solution
2. 1 mM compound stock solution is serially diluted by ½ log (3.16 fold) by adding 18.5 μL of compound stock to 40 μL of DMSO, mixing by pipetting up and down, and transferring 18.5 μL of the mixture to 40 μL of DMSO. This process is repeated to create 10 dilution points for test compounds.
3. For wells used to examine ligand binding competition, 2 μL of each dilution is dispensed into the 96 well plates prepared as described above, giving a further dilution of 1/100.

Radioligand Preparation:
1. 200 nM of [$^{18}$F]-20-Al (10× radioligand stock) is prepared in reaction buffer, aiming for approximately 2 million CPM per 20 μL of solution (input).
2. 20 μL of radioligand stock is dispensed into each well to give a final concentration per well of 20 nM.

Incubation Conditions, Post-Incubation Sample Processing and Data Analysis:
1. All 96 wells should have a final volume of 200 μL, and the assay plates are incubated at 37° C. for 90 minutes.
2. All samples from the assay plates are transferred to MultiScreen$_{HTS}$ FB plates that have been presoaked in PBS buffer, pH 7.4, and filtered using a vacuum manifold. An additional 150 μL of PBS buffer is added to each well in the assay plates and combined to ensure transfer of any remaining samples
3. MultiScreen$_{HTS}$ FB plates are washed 3× with 150 μL of PBS buffer.
4. All filters are separated and transferred to individual tubes using Multiscreen punch tips and the Millipore multiple punch apparatus
5. The sample set is analyzed using the Wizard 2480 automatic gamma-counter [Perkin Elmer] through a [$^{18}$F]-specific profile. Values are reported as decay-corrected counts per minute (CPM).
6. Resulting CPM values are normalized and converted to % inhibition by the following equation:

$$\% \text{ inhibition} = \frac{1 - (\text{sample } CPM - NSB\ CPM)}{TB\ CPM - NSB\ CPM}$$

*the total bound fraction is typically less than 10% of the added radioligand under such assay conditions.

Resulting % inhibition values were plotted using the software GraphPad Prism 8.4.3 using the One site—Fit log IC$_{50}$ equation to determine the IC$_{50}$ value for each ligand.

$$Y = A + (B-A)/(1+10^{(x-Log\ IC50)})$$

Y=% Inhibition
X=Log concentration of the cold competing ligand (M)
A=minimum Y (0%)
B=maximum Y (100%)
Log IC$_{50}$=Log concentration of cold competing ligand (M) at half-way between minimum and maximum Y Results Table 7 below lists the IC$_{50}$ values measured in a competitive binding assay with 20-Al.

TABLE 7

IC$_{50}$ Values of Competitor Ligands Tested in GZB IC$_{50}$ Binding Assays.

| Competitor Ligand | IC$_{50}$ Value (nM) |
|---|---|
| 1-Al | 6.2 |
| 2-Al | 12 |
| 3-Al | 2.1 |
| 4-Al | 7.4 |
| 5-Al | 1.5 |
| 6-Al | 1.1 |
| 7-Al* | 4.5 ± 0.82 |
| 9-Al | 5.8 |
| 10-Al | 1.2 |
| 11-Al | 5.7 |
| 12-Al | 2.9 |
| 13-Al | 3.0 |
| 17-Al | 4.5 |
| 18-Al | 4.2 |

*For control ligand 7-Al the reported IC$_{50}$ value is taken from the average of 4 studies (error reported as standard error).

Example 6: Synthesis of 20-Al

The following synthetic procedures are used in the preparation of compounds 20, and 20-Al.

Tert-butyl 2-[4-(2-tert-butoxy-2-oxo-ethyl)-1,4,7-triazonan-1-yl]acetate (20-a)

1,4,7-triazonane (21.61 g, 167.3 mmol, 1.0 eq.) was dissolved in chloroform (360 ml) and the solution was chilled to −10° C. in an ethanol/ice bath. Tert-butyl 2-bromoacetate (54.33 ml, 368.0 mmol, 2.2 eq.) dissolved in chloroform (360 ml) was then added dropwise over 4 hours. The mixture was then slowly warmed to ambient temperature. After stirring at ambient temperature overnight, the mixture was poured through filter paper and the filtrate was reduced under vacuum to give a brown oil. The oil was purified on silica gel using 3% to 12% 7N ammonia in methanol/methylene chloride over 30 minutes as solvent to give the product as a brown oil (16.53 g, 46.24 mmol, 28%). HRMS: Calc for $C_{18}H_{35}N_3O_4$ (M+H)$^+$ 357.2628, found 357.2619.

Methyl 2-[4-[[4,7-bis(2-tert-butoxy-2-oxo-ethyl)-1,4,7-triazonan-1-yl]methyl]phenyl]acetate (20-b)

Tert-butyl 2-[4-(2-tert-butoxy-2-oxo-ethyl)-1,4,7-triazonan-1-yl]acetate (16.53 g, 46.24 mmol, 1.0 eq.) and methyl 2-[4-(bromomethyl)phenyl]acetate (12.36 g, 50.86 mmol, 1.1 eq.) were combined in acetonitrile (300 mL), N,N-diisopropylethylamine (24.2 ml, 138.7 mmol, 3.0 eq.) was added, and the mixture was heated at 50° C. overnight. LCMS indicated the reaction was complete and the mixture was cooled to ambient temperature and stirred overnight. The solvent was then removed under vacuum to give a brown oil. The oil was partitioned between dichloromethane (150 ml) and water (75 ml). The aqueous was removed and the organic was washed with water (75 ml), washed with brine (75 ml), dried over sodium sulfate, filtered, and concentrated under vacuum to give a tan foam. The foam was purified by SFC chromatography (Method: Chiralcel OD-H—5×15 cm, 20% methanol (0.5% N,N-Dimethylethylamine)/carbon dioxide, 5 ml/min, 225 nm). The fractions containing the product were pooled and concentrated under vacuum to give an amber colored oil (15.04 g, 28.94 mmol, 63%). HRMS: Calc for $C_{28}H_{45}N_3O_6(M+H)^+$ 519.3308, found 519.3324.

2-[4-[[4,7-bis(2-tert-butoxy-2-oxo-ethyl)-1,4,7-triazonan-1-yl]methyl]phenyl]acetic Acid (20-c)

Methyl 2-[4-[[4,7-bis(2-tert-butoxy-2-oxo-ethyl)-1,4,7-triazonan-1-yl]methyl]phenyl]acetate (15.04 g, 28.94 mmol, 1.0 eq.) was dissolved in tetrahydrofuran (120 ml), aqueous lithium hydroxide (28.94 ml, 57.88 mmol, 2.0 eq., 2 M) solution was added, and the mixture was stirred at ambient temperature for 22.5 hours. The solvent was then removed under vacuum to give a foam. The foam was dissolved in water (40 ml) and the pH was carefully adjusted to about 7 using 2M HCl. The aqueous was extracted 6 times with dichloromethane (100 ml) and the organic was combined and reduced to residue. The residue was taken up in 3:1 chloroform/isopropanol (350 ml) and the cloudy solution was poured through filter paper. The filtrate was reduced under vacuum and placed in a vacuum oven overnight at ambient temperature to give a yellow solid (10.77 g, 21.30 mmol, 74%). HRMS: Calc for $C_{27}H_{43}N_3O_6$ $(M+H)^+$ 505.3152, found 505.3167.

(9H-fluoren-9-yl)methyl ((3S,6S)-6-(((1H-1,2,3-triazol-4-yl)methyl)carbamoyl)-4-oxo-1,2,3,4,6,7-hexahydroazepino[3,2,1-hi]indol-3-yl)carbamate (20-d)

(3S,6S)-3-((((9H-fluoren-9-yl)methoxy)carbonyl) amino)-4-oxo-1,2,3,4,6,7-hexahydroazepino[3,2,1-hi]indole-6-carboxylic acid (8.0 g, 17.08 mmol, 1.0 eq.), 1H-triazol-4-ylmethanamine:hydrochloride (2.53 g, 18.78 mmol, 1.1 eq.), and HATU (7.79 g, 20.49 mmol, 1.2 eq.) were combined in N,N-dimethylformamide (80 mL) and N,N-diisopropyl ethylamine (10.4 ml, 59.77 mmol, 3.5 eq.) was then added. The mixture was stirred overnight at ambient temperature and then partitioned between ethyl acetate (200 ml) and brine (150 ml). The aqueous was removed and the organic was washed twice with brine (150 ml), dried over sodium sulfate, filtered, and concentrated under vacuum to give a brown oil. The oil was purified on silica gel using a gradient of 3% to 5% methanol/methylene chloride over 5.5 minutes followed by a 3 minute hold at 5% methanol/methylene chloride to give the product as a tan solid (7.61 g, 13.90 mmol, 81%). HRMS: Calc for $C_{31}H_{28}N_6O_4$ $(M+H)^+$ 548.2172, found 548.2157.

(3S,6S)—N-((1H-1,2,3-triazol-4-yl)methyl)-3-amino-4-oxo-1,2,3,4,6,7-hexahydroazepino[3,2,1-hi]indole-6-carboxamide (20-e)

(9H-fluoren-9-yl)methyl ((3S,6S)-6-(((1H-1,2,3-triazol-4-yl)methyl)carbamoyl)-4-oxo-1,2,3,4,6,7-hexahydroazepino[3,2,1-hi]indol-3-yl)carbamate (7.61 g, 13.9 mmol, 1.0 eq.) was dissolved in tetrahydrofuran (120 mL), dimethylamine (2 mol/L) in tetrahydrofuran (35.0 ml, 70.0 mmol, 5.05 equiv.) was added, and the mixture was stirred overnight at ambient temperature. The following morning the solvent was removed under vacuum and the residue was sonicated in acetonitrile. The resulting suspension was stirred at ambient temperature for 2 hours and the solids were then collected by vacuum filtration. The cake was washed with acetonitrile, pulled dry for 2 hours, and then placed in a vacuum oven at ambient temperature over 64 hours to give the product as an off-white solid (3.69 g, 11.3 mmol, 82%). HRMS: Calc for $C_{16}H_{18}N_6O_2$ $(M+H)^+$ 326.1491, found 326.1482.

Tert-butyl ((2S,3S)-1-(((3S,6S)-6-(((1H-1,2,3-triazol-4-yl)methyl)carbamoyl)-4-oxo-1,2,3,4,6,7-hexahydroazepino[3,2,1-hi]indol-3-yl)amino)-3-methyl-1-oxopentan-2-yl)carbamate (20-f)

(3S,6S)—N-((1H-1,2,3-triazol-4-yl)methyl)-3-amino-4-oxo-1,2,3,4,6,7-hexahydroazepino[3,2,1-hi]indole-6-carboxamide (3.69 g, 11.3 mmol, 1.0 eq.), (2S,3S)-2-(tert-butoxycarbonylamino)-3-methyl-pentanoic acid (3.14 g, 13.6 mmol, 1.2 eq.) and, HATU (5.16 g, 13.6 mmol, 1.2 eq.) were combined in N,N-dimethylformamide (50 mL) and N,N-diisopropylethylamine (5.92 ml, 33.9 mmol, 3.0 eq.) was then added. Stirring at ambient temperature was continued overnight. The mixture was then partitioned between ethyl acetate (200 ml) and brine (100 ml) and the aqueous was removed. The organic was then washed twice with brine (100 ml) and reduced under vacuum to give a tan gel. The gel was dissolved in chloroform and stripped down on silica gel (40 g) for purification. The material was purified on a 330 g silica gel column using 5% methanol/dichloromethane as solvent to give 6.0 g of a yellow foam. NMR indicated the material still contained residual DMF. The material was dissolved in xylenes (100 ml) and the solvent was removed under vacuum. The residue was azeotroped two more times in xylenes (100 ml) to give an off-white solid (5.55 g, 10.3 mmol, 91%). HRMS: Calc for $C_{27}H_{37}N_7O_5$ $(M+H)^+$ 539.2856, found 539.2851.

(3S,6S)—N-((1H-1,2,3-triazol-4-yl)methyl)-3-((2S,3S)-2-amino-3-methylpentanamido)-4-oxo-1,2,3,4,6,7-hexahydroazepino[3,2,1-hi]indole-6-carboxamide (20-g)

Tert-butyl ((2S,3S)-1-(((3S,6S)-6-(((1H-1,2,3-triazol-4-yl)methyl)carbamoyl)-4-oxo-1,2,3,4,6,7-hexahydroazepino [3,2,1-hi]indol-3-yl)amino)-3-methyl-1-oxopentan-2-yl) carbamate (5.55 g, 10.3 mmol, 1.0 eq.) was dissolved in methylene chloride (50 mL) and trifluoroacetic acid (15.6 ml, 206 mmol, 20.1 eq.) was then added. LCMS after 2.5 hours at ambient temperature indicated the reaction was complete. The solvent was removed under vacuum. The residue was partitioned between 3:1 chloroform/isopropanol (180 ml) and saturated sodium bicarbonate (100 ml). The organic was removed and the aqueous was extracted twice with 3:1 chloroform/isopropanol (100 ml). The organic was then combined, washed with brine, dried over sodium sulfate, filtered, and concentrated under vacuum to a tan solid (3.06 g, 6.96 mmol, 68%). HRMS: Calc for $C_{22}H_{29}N_7O_3$ $(M+H)^+$ 439.2332, found 439.2328.

Tert-butyl (2-((2-(((2S,3S)-1-(((3S,6S)-6-(((1H-1,2,3-triazol-4-yl)methyl)carbamoyl)-4-oxo-1,2,3,4,6,7-hexahydroazepino[3,2,1-hi]indol-3-yl)amino)-3-methyl-1-oxopentan-2-yl)amino)-2-oxoethyl) amino)-2-oxoethyl)carbamate (20-h)

(3S,6S)—N-((1H-1,2,3-triazol-4-yl)methyl)-3-((2S,3S)-2-amino-3-methylpentanamido)-4-oxo-1,2,3,4,6,7-hexahydroazepino[3,2,1-hi]indole-6-carboxamide (3.06 g, 6.96 mmol, 1.0 eq.), 2-[[2-(tert-butoxycarbonylamino)acetyl] amino]acetic acid (1.78 g, 7.66 mmol, 1.1 eq.), and HATU (2.91 g, 7.65 mmol, 1.1 eq.) were combined in N,N-dimethylformamide (50 mL) and N,N-diisopropylethylamine (3.64 ml, 20.9 mmol, 3.0 eq.) was then added. The mixture was stirred overnight at ambient temperature and then partitioned between ethyl acetate (200 ml) and brine (100 ml). The aqueous was removed and the organic was then washed twice with brine (100 ml). The aqueous washes were combined and back extracted three times with 3:1 chloroform/isopropanol (100 ml). All of the organic layers were combined and reduced under vacuum to give an off-white gel. The gel was taken up in xylenes (100 ml) and the solvent was removed under vacuum. This process was repeated two more times to get rid of persistent DMF. The resulting residue was dissolved in chloroform and stripped down on silica gel (40 g) for purification. The material was purified on a 330 g silica gel column using 5% to 10% methanol/dichloromethane as solvent over 35 minutes. The fractions containing the product were pooled, concentrated under vacuum, and then placed in a vacuum oven overnight at ambient temperature to give an off-white solid (3.50 g, 5.35 mmol, 77%). HRMS: Calc for $C_{31}H_{43}N_9O_7$ (M+H)$^+$ 653.3285, found 653.3270.

(3S,6S)—N-((1H-1,2,3-triazol-4-yl)methyl)-3-((2S, 3S)-2-(2-(2-aminoacetamido) acetamido)-3-methyl-pentanamido)-4-oxo-1,2,3,4,6,7-hexahydroazepino [3,2,1-hi]indole-6-carboxamide Trifluoroacetic Acid Salt (20-i)

Tert-butyl (2-((2-(((2S,3S)-1-(((3S,6S)-6-(((1H-1,2,3-triazol-4-yl)methyl) carbamoyl)-4-oxo-1,2,3,4,6,7-hexahydroazepino[3,2,1-hi]indol-3-yl)amino)-3-methyl-1-oxopentan-2-yl)amino)-2-oxoethyl)amino)-2-oxoethyl)carbamate (3.50 g, 5.35 mmol, 1.0 eq.) was suspended in methylene chloride (75 mL) and trifluoroacetic acid (8.10 ml 107 mmol, 20.0 eq.) was then added. LCMS at 2.5 hours indicated the reaction was complete. The solvent was removed under vacuum and the resulting oil was sonicated in toluene. The toluene was then removed under vacuum. Azeotroping with toluene was repeated twice more and the material was then placed in a vacuum oven at ambient temperature over 64 hours to give a quantitative yield of the product as an off-white solid (3.57 g, 5.35 mmol, 100%). HRMS: Calc for $C_{26}H_{35}N_9O_5$ (M+H)$^+$ 553.2761, found 553.2775.

Di-tert-butyl 2,2'-(7-(4-(2-((2-(2-(((2S,3S)-1-(((3S, 6S)-6-(((1H-1,2,3-triazol-4-yl)methyl) carbamoyl)-4-oxo-1,2,3,4,6,7-hexahydroazepino[3,2,1-hi]indol-3-yl)amino)-3-methyl-1-oxopentan-2-yl)amino)-2-oxoethyl)amino)-2-oxoethyl)amino)-2-oxoethyl) benzyl)-1,4,7-triazonane-1,4-diyl)diacetate (20-j)

(3S,6S)—N-((1H-1,2,3-triazol-4-yl)methyl)-3-((2S,3S)-2-(2-(2-aminoacetamido) acetamido)-3-methylpentanamido)-4-oxo-1,2,3,4,6,7-hexahydroazepino[3,2,1-hi]indole-6-carboxamide trifluoroacetic acid salt (3.47 g, 5.20 mmol, 1.0 eq.) and N,N-diisopropyl ethylamine (3.63 ml, 20.8 mmol, 4.0 eq.) were combined in N,N-dimethylformamide (50 mL) and 2-[4-[[4,7-bis(2-tert-butoxy-2-oxo-ethyl)-1,4,7-triazonan-1-yl]methyl] phenyl]acetic acid (3.15 g, 6.23 mmol, 1.2 eq.) was then added followed by HATU (2.37 g, 6.23 mmol, 1.2 eq.). The mixture was stirred at ambient temperature overnight and then diluted with toluene (150 ml). The solvent was removed under vacuum. Azeotroping with toluene was repeated twice more to get rid of dimethylformamide. The resulting oil was dissolved in dichloromethane (200 ml) and stripped down on silica gel. The material was purified on a 330 g silica gel column using 10% (hold for 25 minutes) to 20% (over 5 minutes) 7N ammonia in methanol/dichloromethane. The appropriate fractions were pooled, concentrated under vacuum, and placed in a vacuum oven at ambient temperature for 64 hours to give the product as a yellow foam (4.27 g, 4.10 mmol, 79%). HRMS: Calc for $C_{53}H_{76}N_{12}O_{10}$ (M+H)$^+$ 1040.5807, found 1040.5825.

(2,2'-(7-(4-(2-((2-((2-(((2S,3S)-1-(((3S,6S)-6-(((1H-1,2,3-triazol-4-yl)methyl)carbamoyl)-4-oxo-1,2,3,4,6,7-hexahydroazepino[3,2,1-hi]indol-3-yl)amino)-3-methyl-1-oxopentan-2-yl)amino)-2-oxoethyl)amino)-2-oxoethyl)amino)-2-oxoethyl)benzyl)-1,4,7-triazonane-1,4-diyl)diacetic Acid (20)

Di-tert-butyl 2,2'-(7-(4-(2-((2-((2-(((2S,3S)-1-(((3S,6S)-6-(((1H-1,2,3-triazol-4-yl)methyl)carbamoyl)-4-oxo-1,2,3,4,6,7-hexahydroazepino[3,2,1-hi]indol-3-yl)amino)-3-methyl-1-oxopentan-2-yl)amino)-2-oxoethyl)amino)-2-oxoethyl)amino)-2-oxoethyl) benzyl)-1,4,7-triazonane-1,4-diyl)diacetate (4.05 g, 3.89 mmol, 1.0 eq) was suspended in 1,4-dioxane (300 ml) and hydrochloric acid (4 mol/L) in 1,4-dioxane (24.3 ml, 97.2 mmol, 25.0 eq.) was then added. LCMS after 3 hours at ambient temperature indicated approximately 10% of the mono tert-butyl product. The mixture was then heated to 50° C. and LCMS at 5 hours indicated approximately 56% of the desired product, approximately 31% of the mono tert-butyl product, and approximately 13% of the starting material remaining. The mixture was cooled to ambient temperature and stirred overnight to prevent any formation of side products. The following morning the mixture was again heated to 50° C. and monitored periodically throughout the day. LCMS after 8 hours indicated approximately 90% of the desired product and approximately 10% of the mono tert-butyl product. Heating at 50° C. was continued overnight. The following morning LCMS indicated approximately 5.5% of the mono tert-butyl product remained. More hydrochloric acid (4 mol/L) in 1,4-dioxane (9.72 ml, 38.9 mmol, 10.0 eq.) was added and LCMS after 3 hours indicated approximately 5.1% of the mono tert-butyl product remained. The temperature was then increased to 60° C. and heating was continued for 3 hours. The mixture was then removed from the oil bath and cooled in an ice bath. Upon cooling, diethyl ether was added (450 ml) and the mixture was stirred for 20 minutes. The solids were then removed by vacuum filtration through a sintered glass funnel. The cake was washed five times with diethyl ether (150 ml) and then placed in a vacuum oven at 50° C. for 64 hours. The material was purified by reverse phase flash chromatography (C18, 275 g, RediSep Gold) using a gradient of 10.1% acetonitrile/water (w/ 0.1% formic acid) to 26.2% acetonitrile/water (w/ 0.1% formic acid) over 8.6 minutes followed by a hold at 26.2% acetonitrile/water (w/ 0.1% formic acid) for 4.8 minutes. The appropriate fractions were pooled, frozen at −78° C., and lyophilized to give the product as an off-white, fluffy solid (2.29 g, 2.47 mmol, 63%). HRMS: Calc for $C_{45}H_{60}N_{12}O_{10}$ (M+H)$^+$ 928.4555, found 928.4580.

20-Al

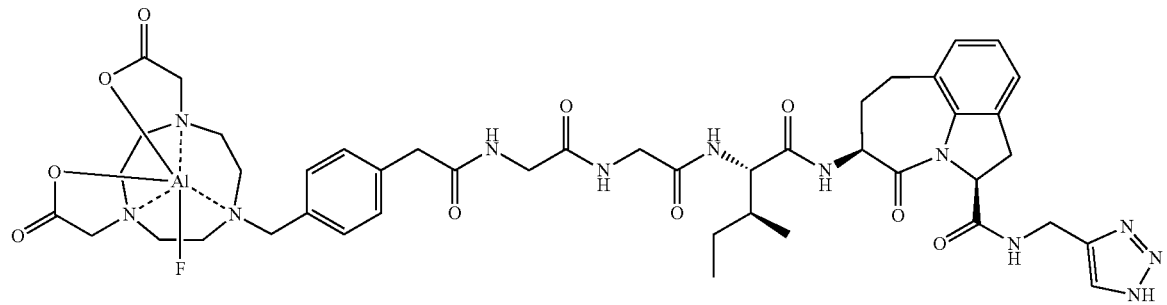

20-Al was prepared as follows.
Preparation of Reaction Solutions:
Solutions were prepared in vials or bottles with the reagents indicated below.
1.0M AcOH in H$_2$O:
1.8 g AcOH (30 mmol) in 30 mL H$_2$O
Resulting solution: S-092-1
1.0M NaOAc in H$_2$O:
2.46 g NaOAc in 30 mL H$_2$O
Resulting solution: S-092-2
0.20M AlCl$_3$ in H$_2$O:
1.45 g AlCl$_3$-6H$_2$O in 30 mL H$_2$O
Resulting solution: S-092-5
0.1M NaOAc in H$_2$O:
20 mL 1.0M NaOAc solution S-092-2
180 mL H$_2$O:
Resulting solution: S-092-6
0.1M AcOH in H$_2$O:
20 mL 1.0M AcOH solution S-092-1
180 mL H$_2$O
Resulting solution: S-092-7
20 mM AlCl$_3$ in 0.1 M NaOAc buffer:
40 mL 0.1M AcOH (S-092-7)
160 mL 0.1M NaOAc (S-092-6)
Resulting solution pH 5.2 0.1 M NaOAc buffer+22 mL 0.2M AlCl$_3$ (S-092-5)
pH=4.47
Resulting solution: S-092-8
0.1M NaF in H$_2$O:
150 mL×0.1M=15 mmol
FW 42 g/mol
0.63 g NaF in 150 mL H$_2$O
Resulting solution: S-092-9
Aluminum Fluoride Complexation:
The 2,2'-(7-(4-(2-((2-((2-(((2S,3S)-1-(((3S,6S)-6-(((1H-1,2,3-triazol-4-yl)methyl)carbamoyl)-4-oxo-1,2,3,4,6,7-hexahydroazepino[3,2,1-hi]indol-3-yl)amino)-3-methyl-1-oxopentan-2-yl)amino)-2-oxoethyl)amino)-2-oxoethyl)amino)-2-oxoethyl)benzyl)-1,4,7-triazonane-1,4-diyl)diacetate (Compound 20) was pre-weighed into 9 clean vials. The reactions were carried out on the scales indicated in Table 8 below:

TABLE 8

Preparation of reaction solutions

| Vial # | Amount of Compound 11 | Batch Code | Final Batch |
|---|---|---|---|
| 1 | 100 mg | S-096 | S-099 |
| 2 | 150 mg | S-097 | |
| 3 | 150 mg | S-097 | |
| 4 | 150 mg | S-097 | |
| 5 | 150 mg | S-097 | |
| 6 | 150 mg | S-098 | |
| 7 | 150 mg | S-098 | |
| 8 | 150 mg | S-098 | |
| 9 | 150 mg | S-098 | |

Representative Procedure for the Aluminum Fluoride Complexation Step:

To a 40 mL pre-washed vial charged with Compound 20 (150 mg, 0.1615 mmol) was added 20 mM AlCl$_3$ in 0.1M NaOAc (11.50 mL, 0.23 mmol) and 100 mM NaF in H$_2$O (1.5 equiv., 0.24 mmol). The suspension was then sonicated to obtain a solution. The mixture was heated to 105° C. for 30 min. The sample was then directly purified by C-18 reverse phase chromatography (C18, 150 g Gold) using 0.1% HCOOH in H$_2$O and CH$_3$CN. All clean fractions were combined, frozen and lyophilized in a clean bottle.

Combination and Analysis of the Final Batch (Compound 20-Al; Batch S-099):

All samples (S-096, S-097, and S-098) were combined to form a single, final batch. After lyophilization, Compound 20-Al (Batch S-099) was obtained as a 1.23 g white, fluffy solid. The overall yield was calculated to be 87.7%. $^{19}$F NMR (376.45 MHz, DMSO-d$_6$) δ ppm: 169.68. HRMS (m/z): Observed (M+H)$^+$: 973.4287; Experimental Monoisotopic Mass: 972.4215, Theoretical Monoisotopic Mass: 972.4198 (calc for C$_{45}$H$_{59}$AlFN$_{12}$O$_{10}$).

Radiosynthesis of Compound [18]F-20-Al

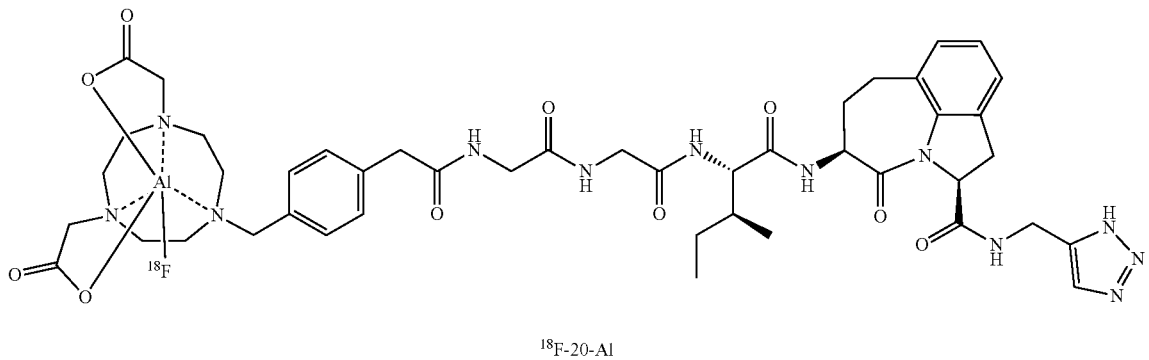

[18]F-20-Al

Precursor (Compound 20 or its formic acid salt), aluminum chloride (AlCl3), acid [acetic acid (AcOH) or hydrochloric acid (HCl)], sodium acetate (NaOAc), ethanol (EtOH) and [$^{18}$F]fluoride activity were added to the reaction vial and kept at 105° C. for 15 minutes. The crude reaction was then diluted with water [water for injection (WFI) or water for ion chromatography (WIC)] before being loaded onto a semi-preparative HPLC column for purification. The HPLC fraction containing the purified Compound [18]F-20-Al was either directly collected or reconstituted using a Sep-Pak® Light C18 cartridge into a formulation of 10% (v/v) EtOH in 0.9% saline containing about 3 mM phosphate and/or 0.5% (w/v) sodium ascorbate (NaAsc). A typical radio-chemical yield (RCY) of synthesizing Compound [18]F-20-Al varied from 22-56% (using 0.3-2.5 Ci starting activity) with synthesis time of 55-80 mins.

Radiosynthesis of Compound [18]F-20-Al with ORA Neptis Radiosynthesizer

Figure 5A:
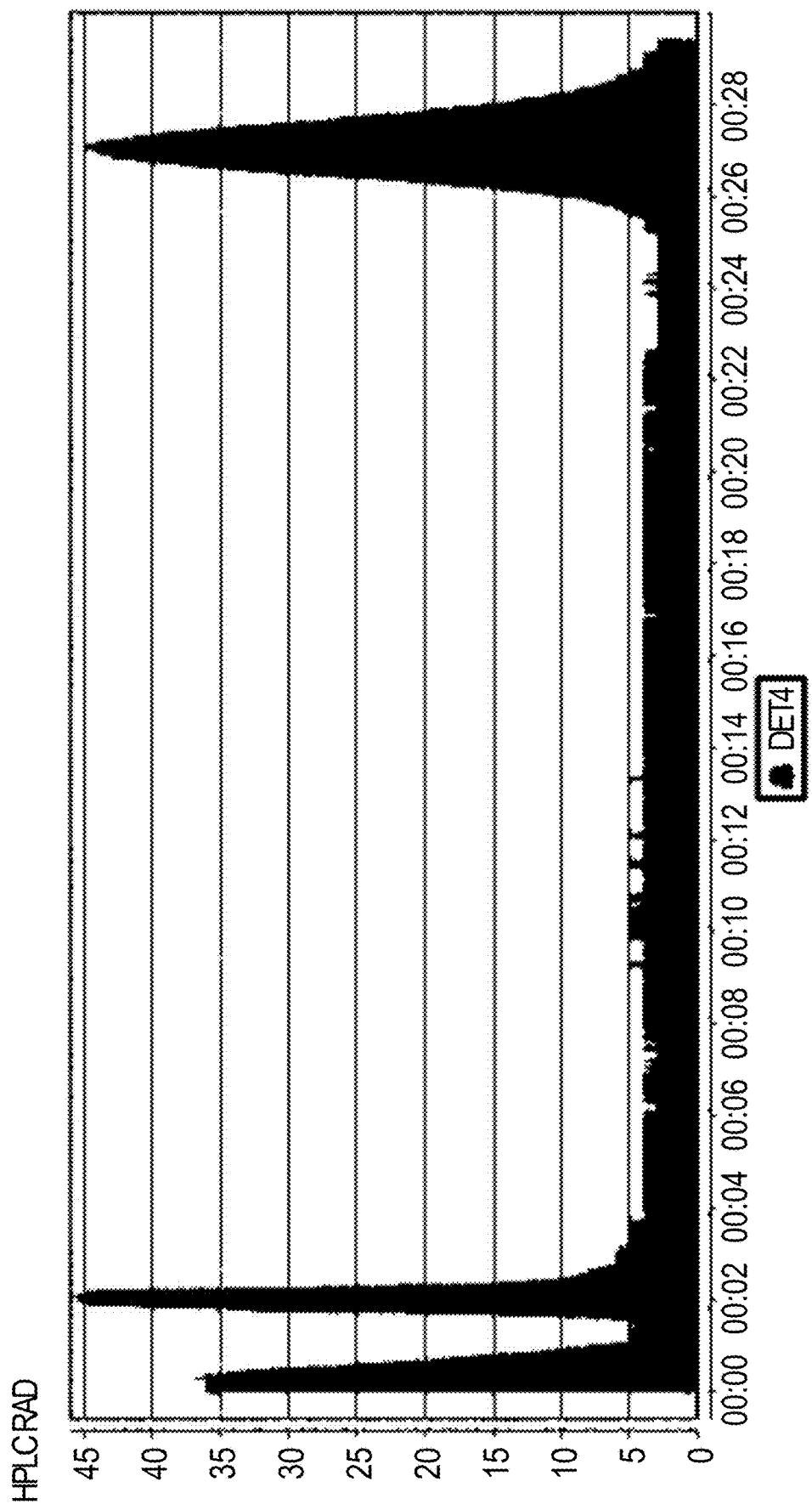
Figure 6A:
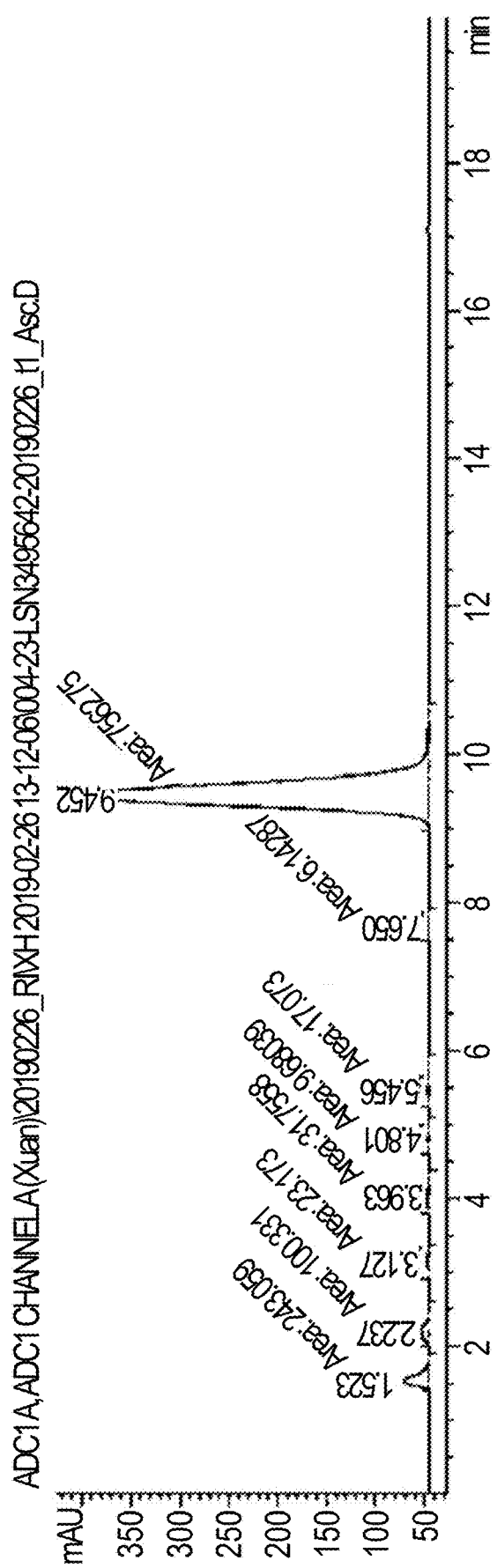
FIGS. 6A and 6B depict analytical HPLC chromatograms of Compound $^{18}$F-20-Al Peak 1 and Peak 2 combined.
Figure 6B:
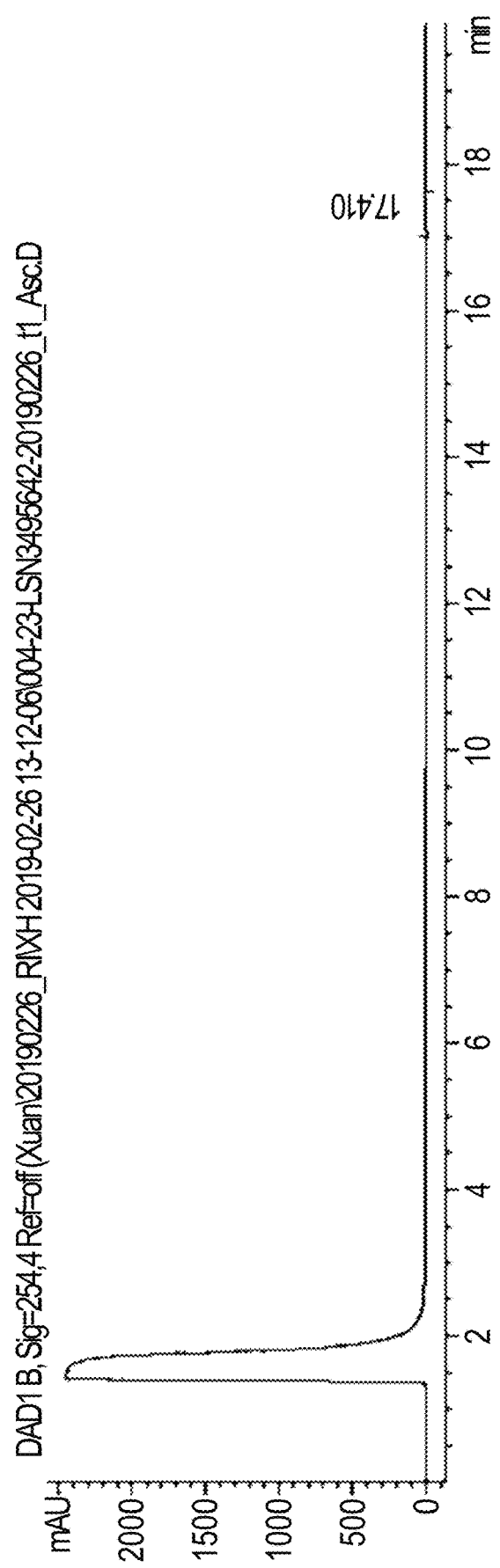

To a reaction vial were added Compound 20 (0.35 mg, 376 nmol) dissolved in 1.4 mL of 71.5% (v/v) EtOH in WFI solution and an aqueous AlCl3 solution [43 µg (178 nmol) of AlCl3·6 H2O dissolved in 0.5 mL of 16 mM HCl solution]. The [$^{18}$F]fluoride activity retained on a Sep-Pak Accell Plus QMA Carbonate Plus Light Cartridge [(46 mg, 40 µm, Waters Part No. 186004540, pre-conditioned with 5 mL of 0.32 M NaOAc solution followed by 5 mL of WFI)] was eluted using 0.5 mL of 0.32 M NaOAc solution into the reaction vial containing the precursor and AlCl3. The resulting mixture was heated at 105° C. for 15 minutes, subsequently cooled to 60° C. then diluted and quenched with 4.8 mL of WFI. The resulting crude reaction mixture was loaded onto a semi-preparative HPLC column for purification (FIGS. 5A and 5B). The HPLC fraction (20 mL) containing the purified Compound [18]F-20-Al was collected into a vial containing 6 mL of phosphate buffered saline and 117 mg of NaAsc resulting in a solution of 10% (v/v) EtOH in 0.9% saline containing about 3 mmol phosphate and 0.6 mmol NaAsc (total volume 26 mL). A sample from the product vial was taken out for HPLC analysis (FIGS. 6A and 6B). Typical RCY of Compound [18]F-20-Al radiosynthesis varied from 40-56% (n=11, using 0.5-2.7 Ci starting activity) with synthesis time of 60±5 minutes.

Semiprep HPLC Conditions: (FIGS. 5A and 5B)

| Column: | Waters Xbridge Peptide BEH C18 OBD prep Column, PN186003630, 300 Å, 5 µm, 19 mm × 50 mm |
| --- | --- |
| Condition: | Flow rate = 10 mL/min; 254 nm; retention time: about 22-25 mins |
| Mobile Phase: | 13% (v/v) ethanol and 87% (v/v) 3.44 mM HCl in 0.9% saline |

Analytical HPLC Conditions: (FIGS. 6A and 6B)

| Column: | Agilent ZORBAX Eclipse XDB-C18 (Part No. 993967-902), 4.6 mm × 150 mm | |
| --- | --- | --- |
| Condition: | flow rate = 1.0 mL/min, UV 254 nm, retention time: about 10 min | |
| Mobile Phase: | Solvent A: 0.1% Trifluoroacetic acid in Water Solvent B: 100% Acetonitrile | |
| Minutes | A | B |
| 0 | 80% | 20% |
| 15 | 80% | 20% |
| 16 | 0% | 100% |
| 18 | 0% | 100% |
| 19 | 80% | 20% |
| 22 | 80% | 20% |

Radiosynthesis of Compound [18]F-20-Al with a GE TRACERlab FX$_{F-N}$

The [$^{18}$F]fluoride activity was retained on a Sep-Pak Accell Plus QMA Carbonate Plus Light Cartridge [(46 mg, 40 µm, Waters Part No. 186004540), pre-conditioned with either 2 mL of 0.9% saline followed by 5 mL of WIC or 5 mL of 0.32 M NaOAc solution followed by 5 mL of WFI]. The retained [$^{18}$F]fluoride was eluted from the cartridge into the reaction vial using either 0.8 mL of 0.32 M NaOAc solution or 0.9% saline (pre-treated with chelex). Either precursor solution A {0.25 mg (196 nmol) of Compound 20-Al (TFA salt) in 100 µL of 1M AcOH/NaOAc aqueous buffer (pH 4.1) and AlCl3 solution [28.9 µg (120 nmol) of AlCl3·6H2O in 60 µL of 0.1M AcOH/NaOAc pH 4 buffer and 1 mL of EtOH]} or solution B {0.38 mg (298 nmol) of Compound 20-Al (TFA salt) in 150 µL of WFI, AlCl3 solution 43.4 µg (180 nmol) of AlCl3·6H2O in 90 µL of WFI, 80 µL of 1N HCl, 110 µL of 1M NaOAc, and 1 mL of EtOH} was then added to the reaction vial and the resulting mixture was heated at 105° C. for 15 minutes and subsequently cooled to 60° C. prior to dilution with 3.5 mL of WFI or WIC. The resulting crude reaction mix was loaded onto a semi-preparative HPLC column for purification. The HPLC fraction containing the purified Compound [18]F-20-Al was collected into a vial containing 40 mL of aqueous 0.5% (w/v) NaAsc solution and loaded onto a Sep-Pak® C18 Plus Light Cartridge (130 mg, 55-105 μm, Waters Part No. WAT023501; pre-conditioned with 5 mL of EtOH then 5 mL of WFI). The retained Compound $^{18}$F-20-Al was washed with 5 mL of aqueous 0.5% (w/v) NaAsc solution and eluted using 1 mL of EtOH into a vial containing 7 mL of 0.5% (w/v) NaAsc in 0.9% saline. The C18 cartridge was rinsed with an additional 2 mL of 0.5% (w/v) NaAsc in 0.9% saline resulting in a 10 mL final solution of 10% (v/v) EtOH, 0.45% (w/v) NaAsc in 0.9% saline. Typical RCY of Compound $^{18}$F-20-Al radiosynthesis varied from 22-44% (n=19, using 0.3-1.4 Ci starting activity) with synthesis time of 60±5 minutes.

Manual Radiosynthesis of Compound $^{18}$F-20-Al

To a 8 mL reaction vial were added 125 μg (100 nmol) of Compound 20 (TFA salt) in 50 μL of 1M AcOH/NaOAc aqueous buffer (pH 4.1), 14.5 μg (60 nmol) of AlCl$_3$·6H$_2$O in 30 μL of WFI, and 580 μL of EtOH or acetonitrile. The [$^{18}$F]fluoride activity was retained on a Sep-Pak Accell Plus QMA Carbonate Plus Light Cartridge [(46 mg, 40 μm, Waters Part No. 186004540), pre-conditioned with 2 mL of 0.9% saline followed by 5 mL of WIC]. The retained [$^{18}$F]fluoride was rinsed using 4 mL of WIC and then eluted from the cartridge into the reaction vial using 0.5 mL of 0.18% saline (prepared by mixing 0.4 mL of WIC with 0.1 mL of 0.9% saline). The resulting mixture was heated at 105° C. for 15 minutes and then allowed to partially cool down (about 2 minutes) prior to addition of 4.8 mL of WIC. The resulting crude was loaded onto a semi-preparative HPLC column on ORA Neptis radiosynthesizer for purification. The HPLC fraction containing the purified Compound $^{18}$F-20-Al was diluted with about 30 mL of WFI and loaded onto a Sep-Pak® C18 Plus Light Cartridge (130 mg, 55-105 μm, Waters Part No. WAT023501; pre-conditioned with 5 mL of EtOH then 5 mL of WFI). The retained Compound $^{18}$F-20-Al was washed with 10 mL of aqueous 0.5% (w/v) NaAsc solution and eluted using 1.8 mL of EtOH into a vial containing 10 mL of 0.5% (w/v) NaAsc in 0.9% saline. The C18 cartridge was rinsed with an additional 3.5 mL of 0.5% (w/v) NaAsc in 0.9% saline resulting in a 15 mL final solution of 10% (v/v) EtOH, 0.45% (w/v) NaAsc in 0.9% saline. Typical RCY of Compound $^{18}$F-20-Al radiosynthesis varied from 37-44% (n=3, using 0.3-0.6 Ci starting activity) with synthesis time of 75±5 minutes.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present disclosure, and without departing from the spirit and scope thereof, can make various changes and modifications of the disclosure to adapt it to various usages and conditions. Thus, other embodiments are also within the claims.

What is claimed is:

1. A compound, or a pharmaceutically acceptable salt thereof, wherein the compound is of formula (I):

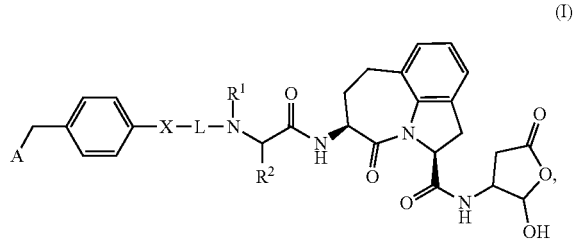

(I)

wherein
- A is a chelating moiety;
- X is selected from the group consisting of —CH$_2$C(NH)—, —CH$_2$C(O)—, —CH$_2$C(S)—, —NHC(NH)—, —NHC(O)—, —NHC(S)—, —OC(NH)—, —OC(O)—, and —OC(S)—, optionally wherein X is —CH$_2$C(O)— or —NHC(S)—;
- L is a peptide linker having 1-6 amino acid residues, inclusive;
- R$^1$ is H or C$_{1-6}$ alkyl, optionally wherein R$^1$ is H or methyl; and
- R$^2$ is C$_{1-6}$ alkyl or C$_{3-6}$ cycloalkyl.

2. The compound, or a pharmaceutically acceptable salt thereof of claim 1, wherein the compound is of formula (Ia):

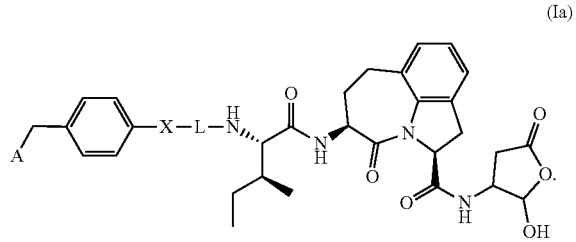

(Ia)

3. The compound, or a pharmaceutically acceptable salt thereof of claim 1, wherein L has 1-3 amino acid residues, inclusive.

4. The compound, or a pharmaceutically acceptable salt thereof of claim 1, wherein L has 3 amino acid residues.

5. The compound, or a pharmaceutically acceptable salt thereof of claim 1, wherein the compound is of formula (Ia-A):

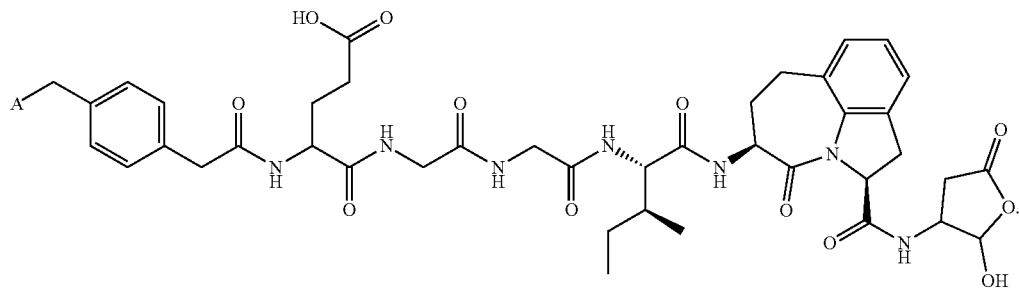

(Ia-A)

6. The compound, or a pharmaceutically acceptable salt thereof of claim 1, wherein the compound is of formula (Ia-B):

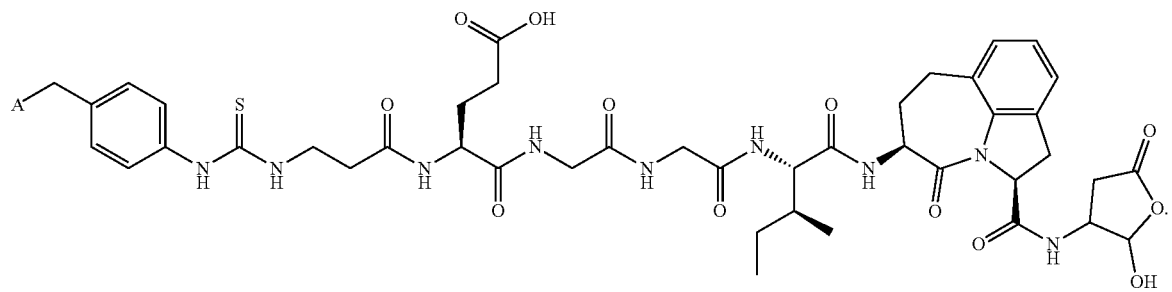

(Ia-B)

7. The compound, or a pharmaceutically acceptable salt thereof of claim 1, wherein the chelating moiety A is 1,4,7-triazacyclononane-N,N',N''-triacetic acid (NOTA) or 1,4,7-triazacyclononane-4,7-diyl diacetic acid (NODA).

8. The compound, or a pharmaceutically acceptable salt thereof of claim 1, wherein the compound is:

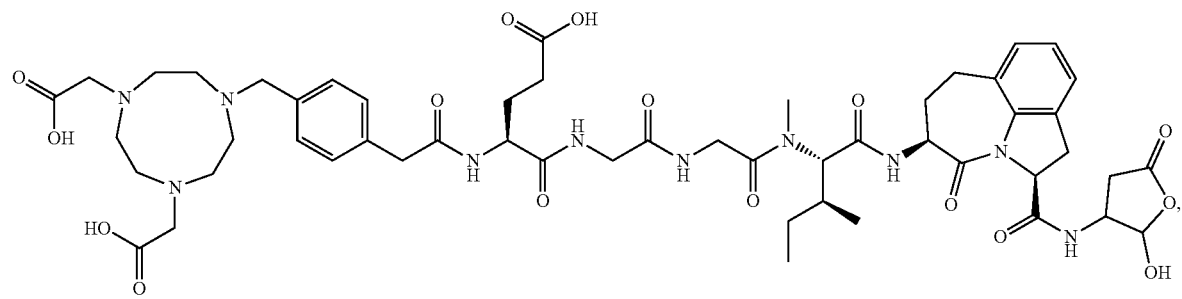

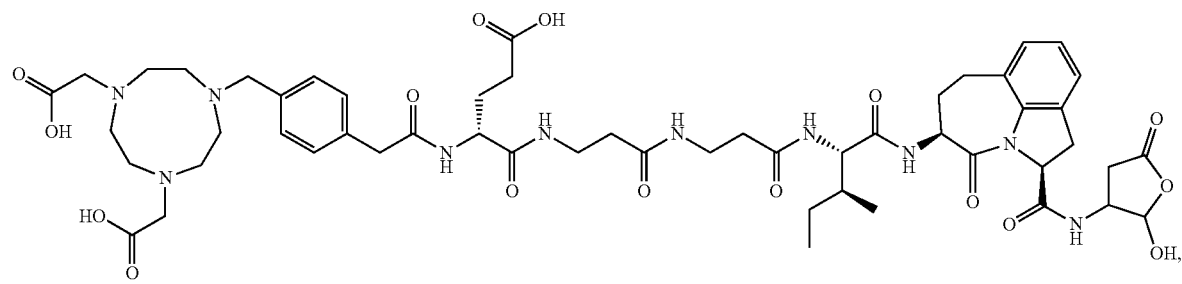

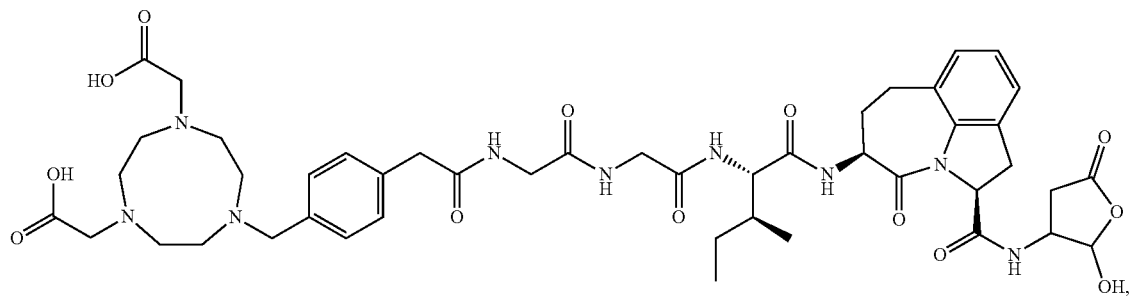
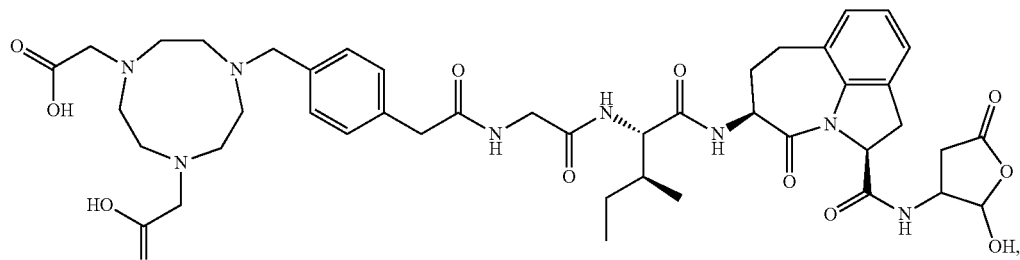
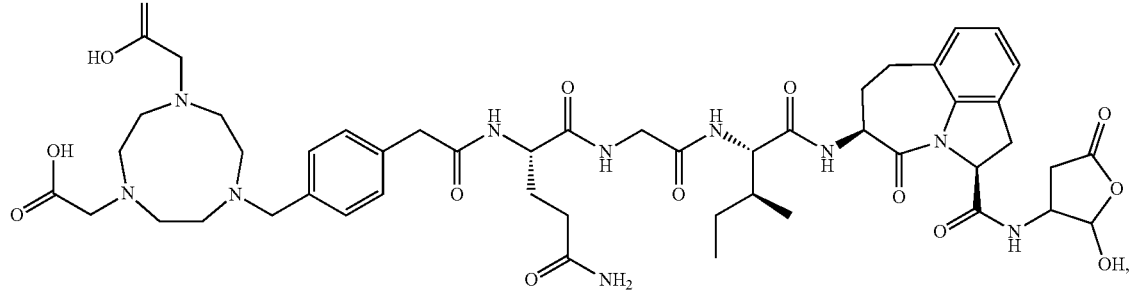
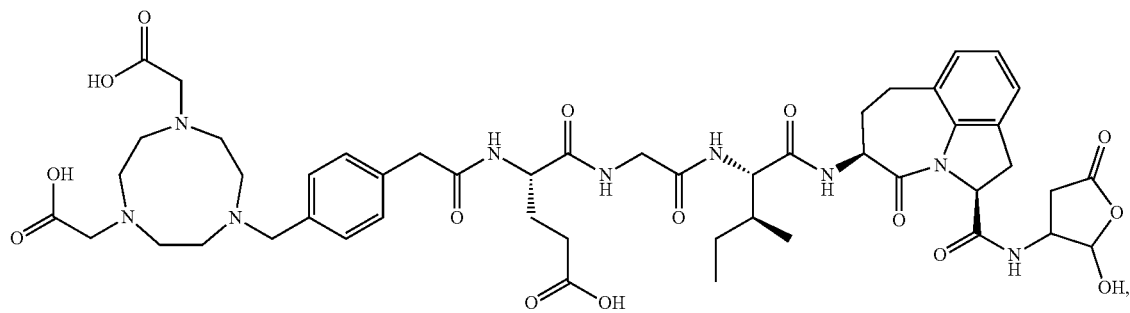
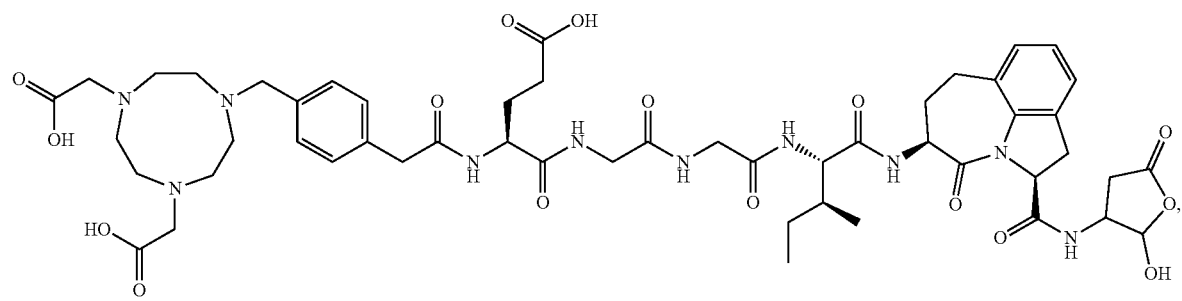

-continued
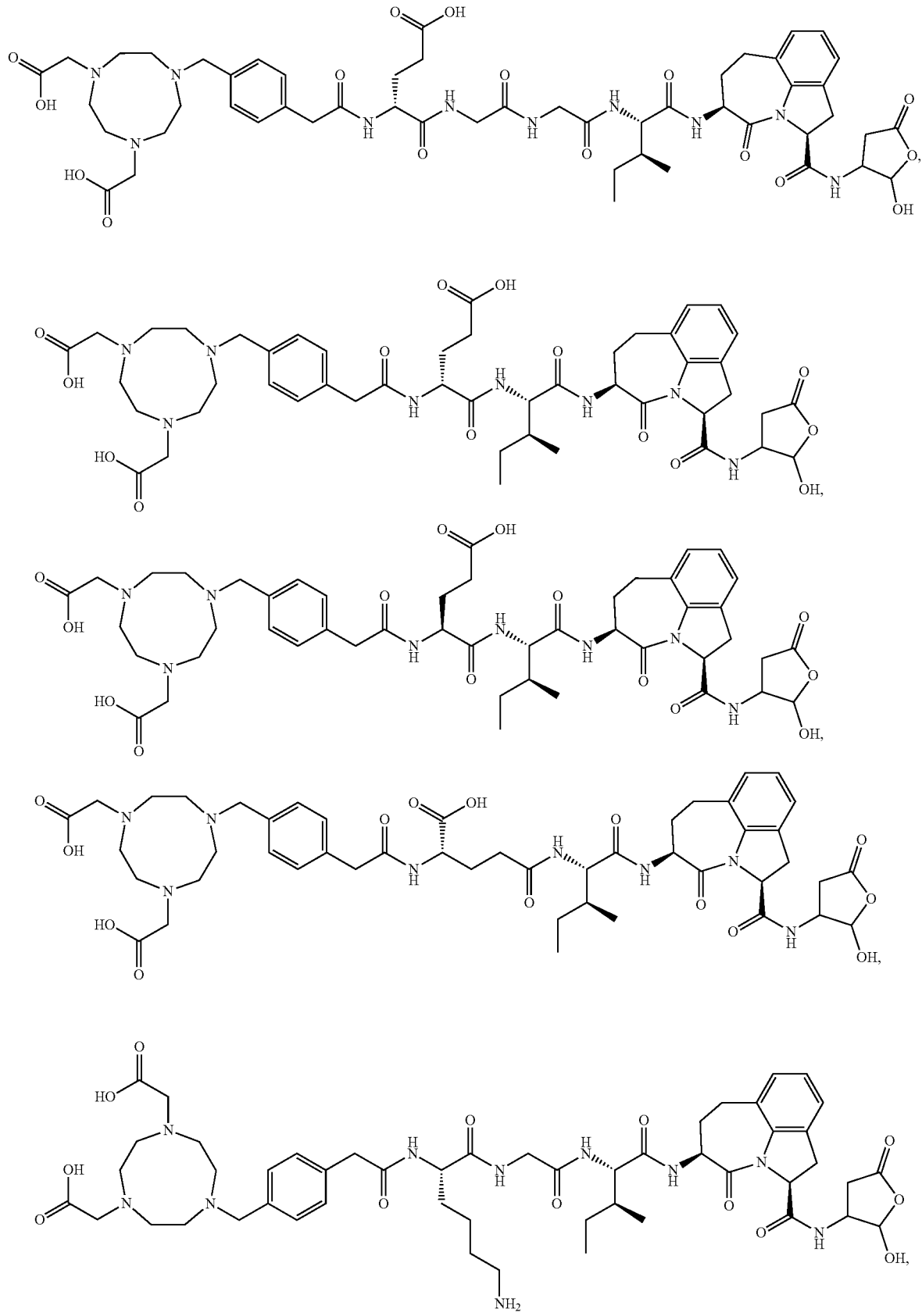

-continued
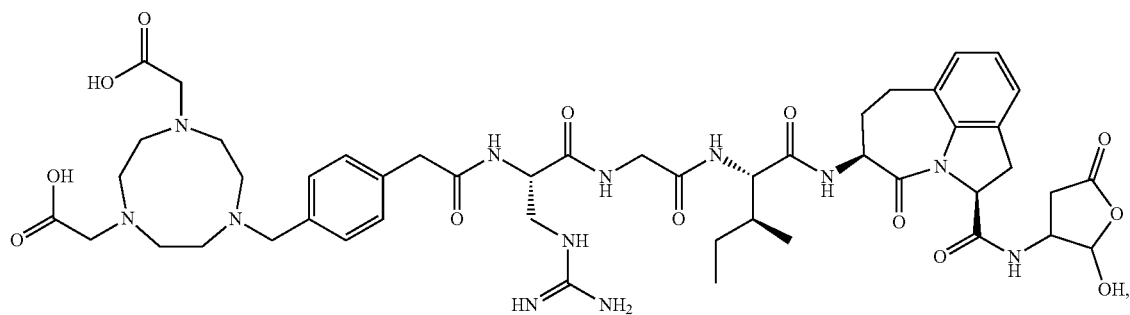
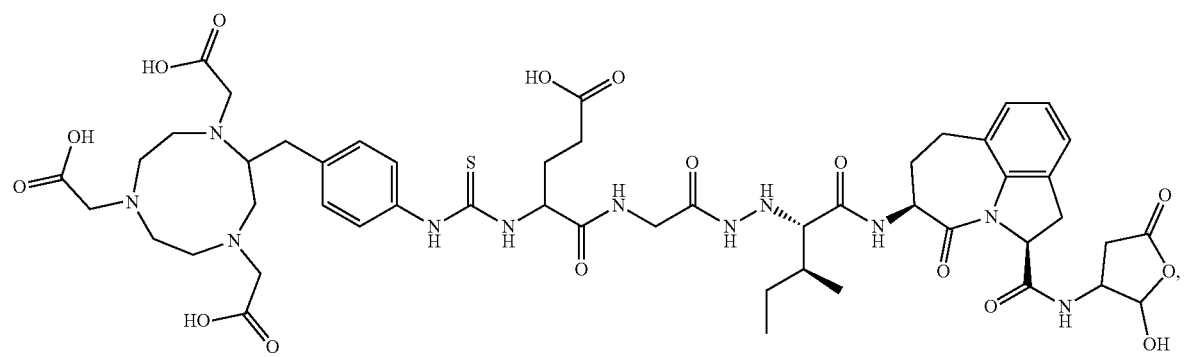
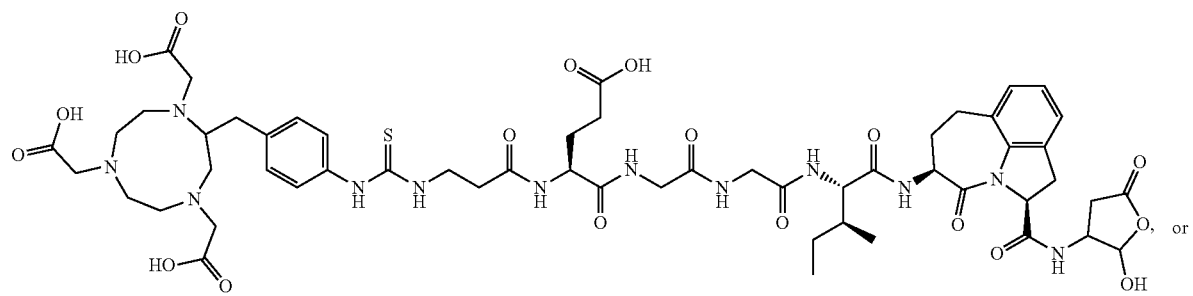
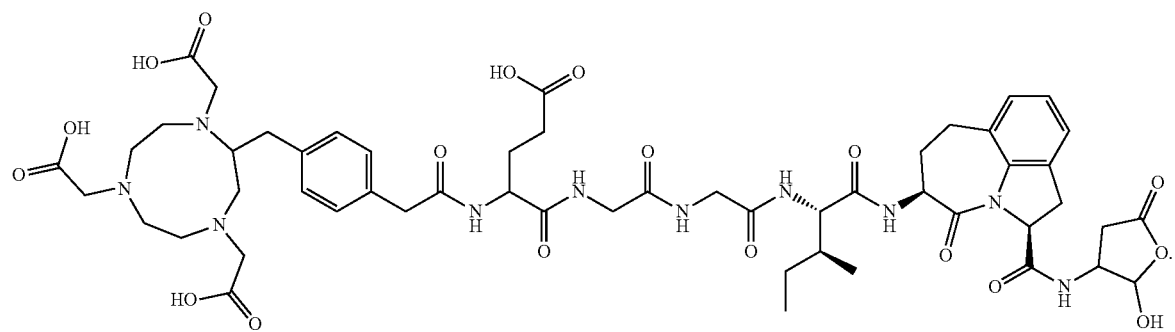 [SMILES: CC[C@H](C)[C@H](NC(=O)CNC(=O)CNC(=O)C(CCC(=O)O)NC(=O)Cc1ccc(CC2CN(CC(=O)O)CCN(CC(=O)O)CCN2CC(=O)O)cc1)C(=O)N[C@H]1CCc2cccc3c2N(C1=O)[C@H](C(=O)NC1CC(=O)OC1O)C3]

9. The compound, or a pharmaceutically acceptable salt thereof, of claim 8, wherein the compound is:
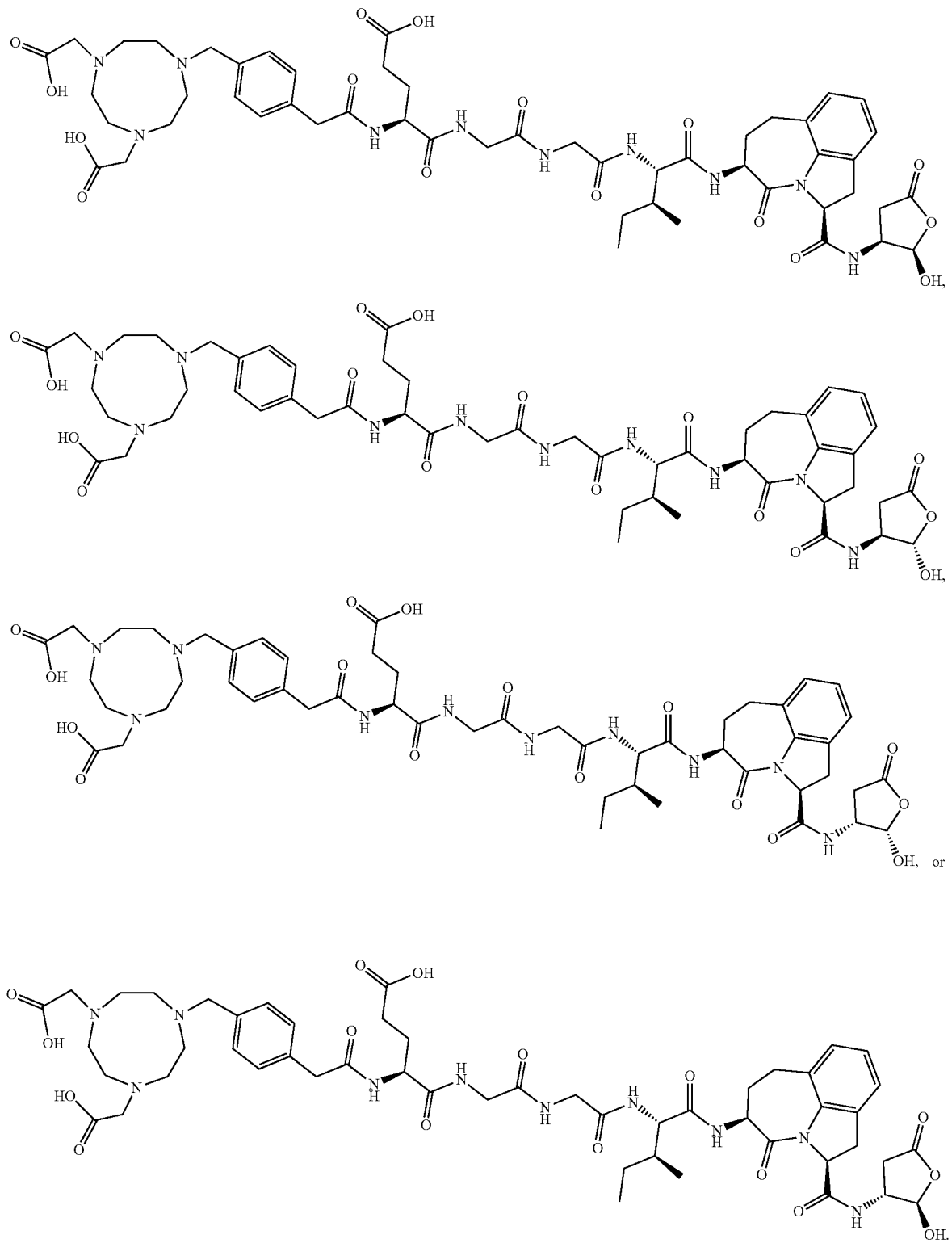

10. A compound, or a pharmaceutically acceptable salt thereof, wherein the compound is of formula (II):

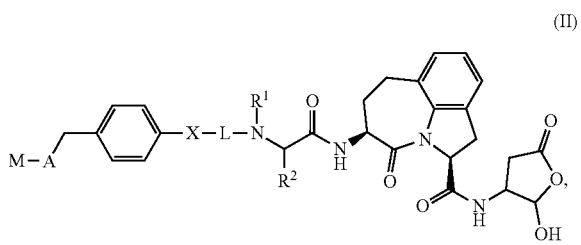
(II)

wherein
M is a metal or a metal linked to a radioisotope;
A is a chelating moiety chelating the metal;
X is selected from the group consisting of —CH$_2$C(NH)—, —CH$_2$C(O)—, —CH$_2$C(S)—, —NHC(NH)—, —NHC(O)—, —NHC(S)—, —OC(NH)—, —OC(O)—, and —OC(S)—, optionally wherein X is —CH$_2$C(NH)— or —NHC(S)—;
L is a peptide linker having 1-6 amino acid residues, inclusive;
R$^1$ is H or C$_{1-6}$ alkyl, optionally wherein R$^1$ is H or methyl; and
R$^2$ is C$_{1-6}$ alkyl or C$_{3-6}$ cycloalkyl.

11. The compound, or a pharmaceutically acceptable salt thereof of claim 10, wherein the compound is of formula (IIa):

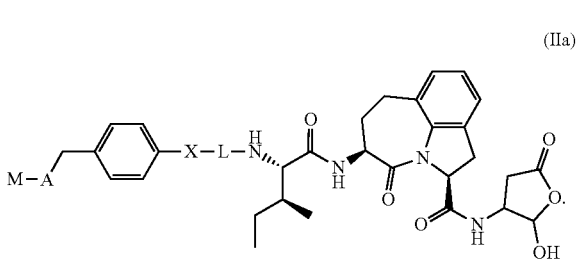
(IIa)

12. The compound, or a pharmaceutically acceptable salt thereof of claim 10, wherein L has 1-3 amino acid residues, inclusive.

13. The compound, or a pharmaceutically acceptable salt thereof of claim 10, wherein L has 3 amino acid residues.

14. The compound, or a pharmaceutically acceptable salt thereof of claim 10, wherein the compound is of formula (IIa-A):

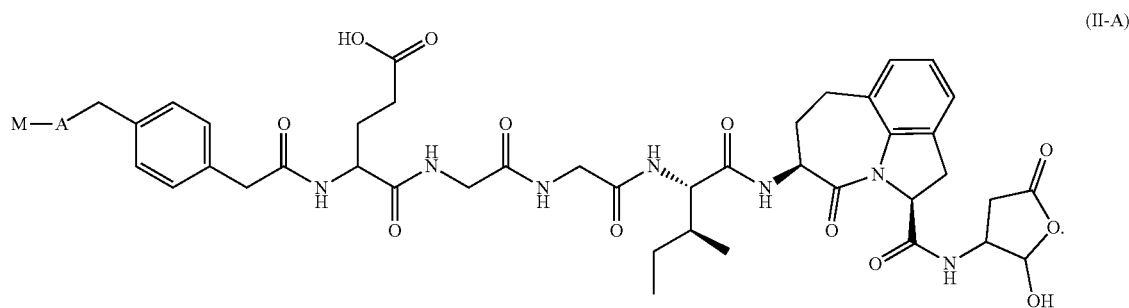
(II-A)

15. The compound, or a pharmaceutically acceptable salt thereof of claim 10, wherein the compound is of formula (IIa-B):

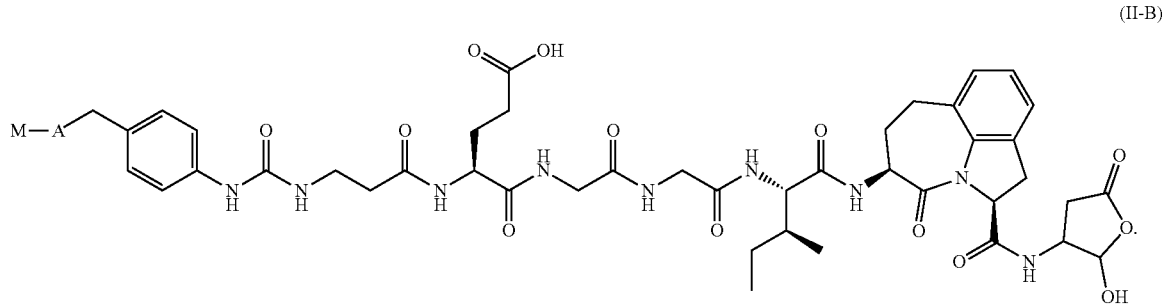
(II-B)

16. The compound, or a pharmaceutically acceptable salt thereof of claim 10, wherein the chelating moiety A is 1,4,7-triazacyclononane-N,N',N''-triacetic acid (NOTA) or 1,4,7-triazacyclononane-4,7-diyl diacetic acid (NODA).

17. The compound, or a pharmaceutically acceptable salt thereof of claim 10, wherein the metal is a radioisotope of Gallium (Ga) or wherein the metal is Aluminum (Al), which is linked to the radioisotope.

18. The compound, or a pharmaceutically acceptable salt thereof of claim 17, wherein the radioisotope of Ga is $^{68}$Ga or wherein the radioisotope linked to Al is $^{18}$F.

19. The compound, or a pharmaceutically acceptable salt thereof of claim 10, wherein the compound is:

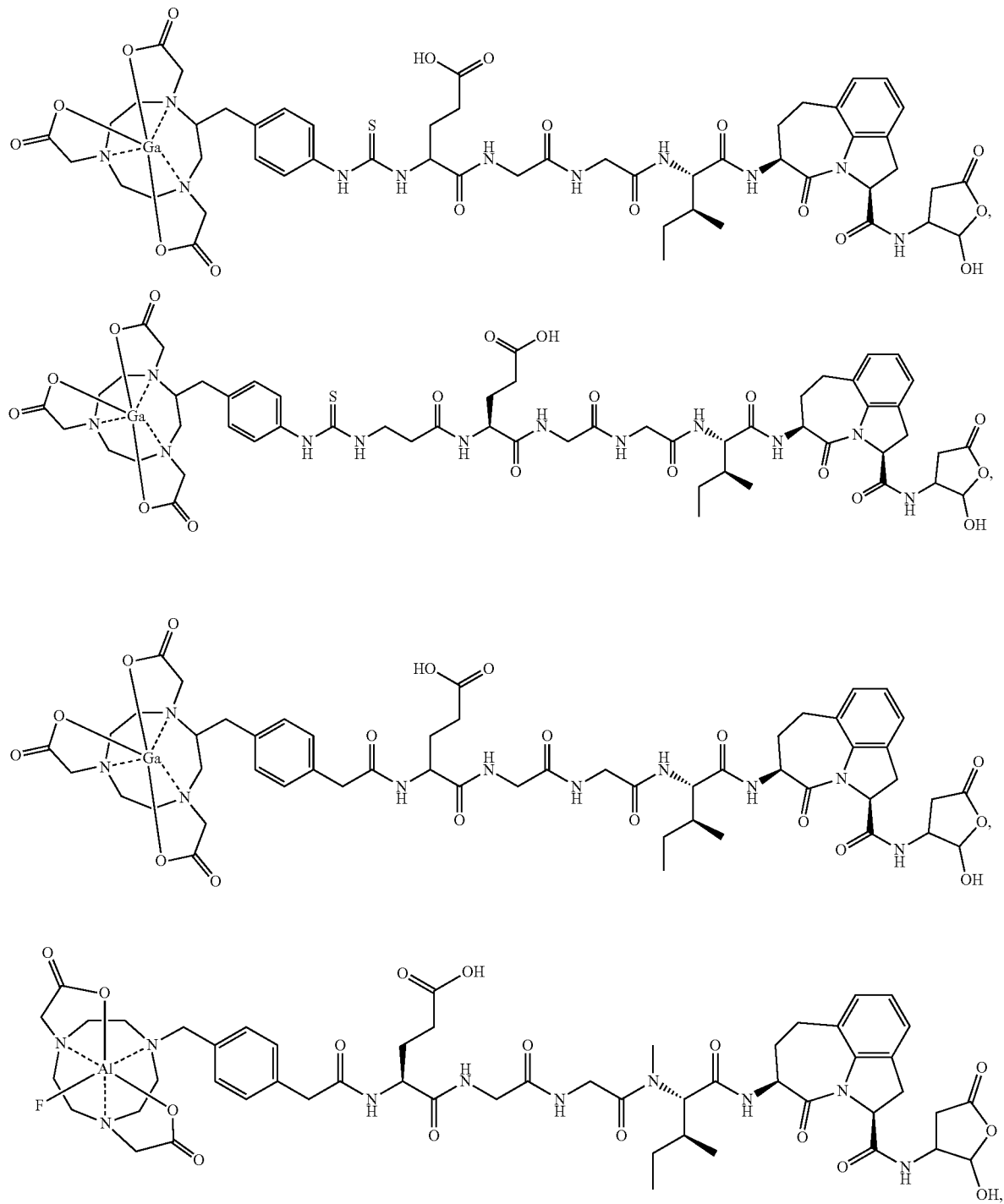

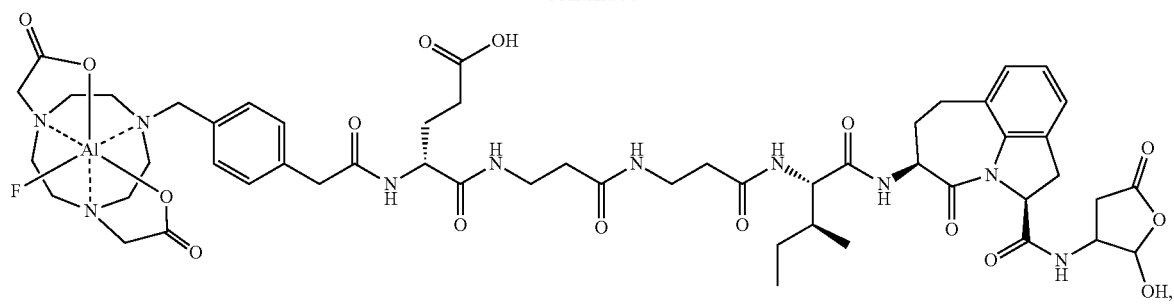
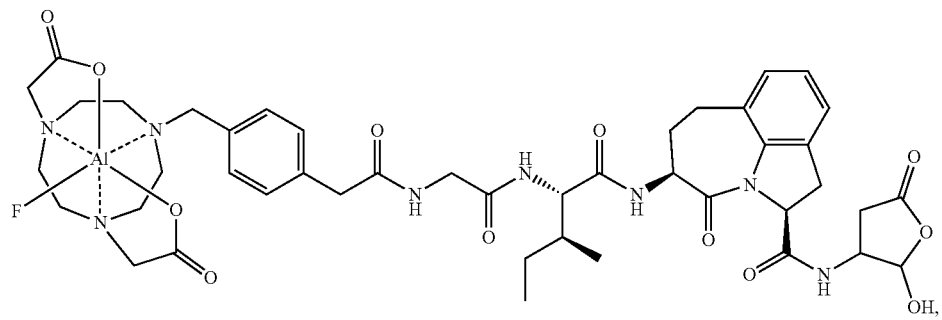
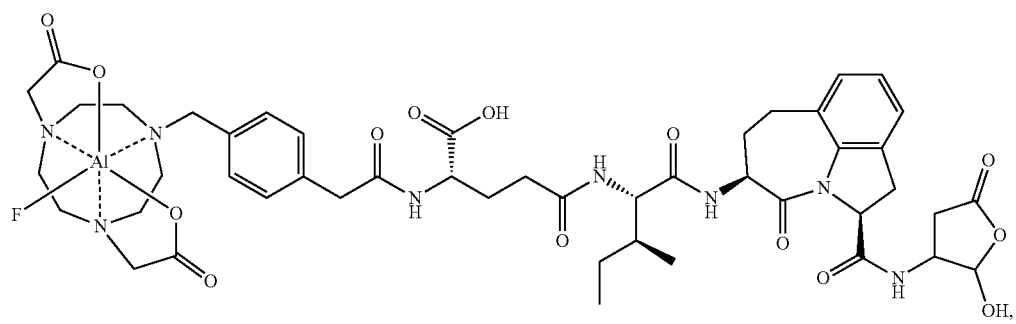
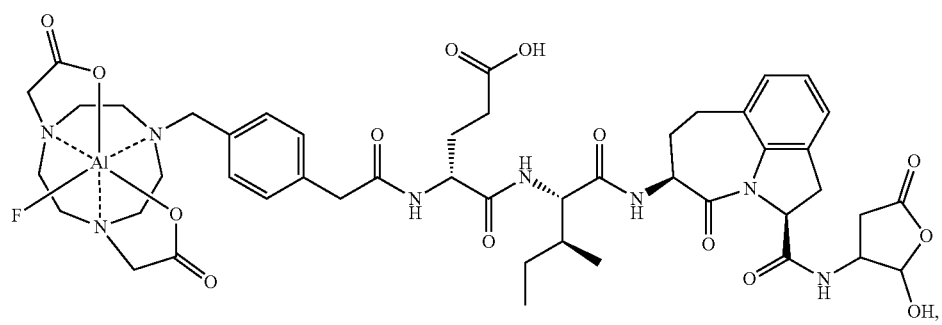
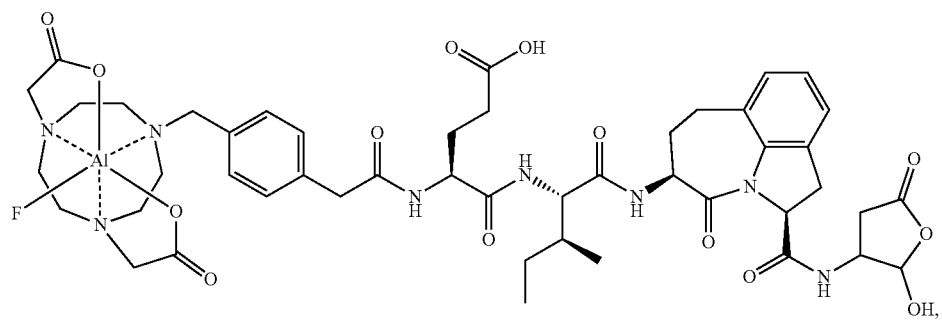

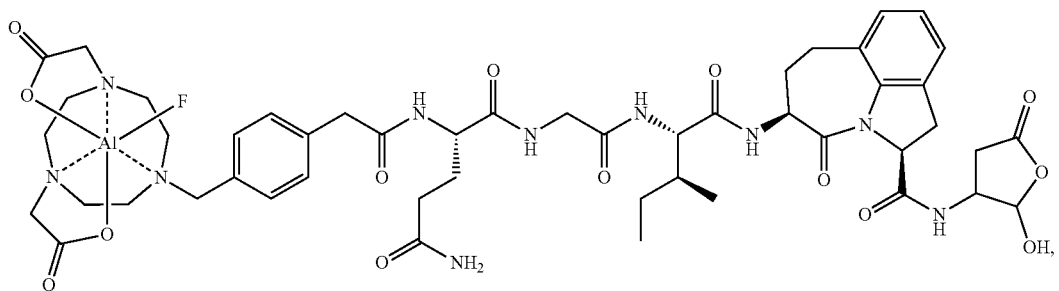
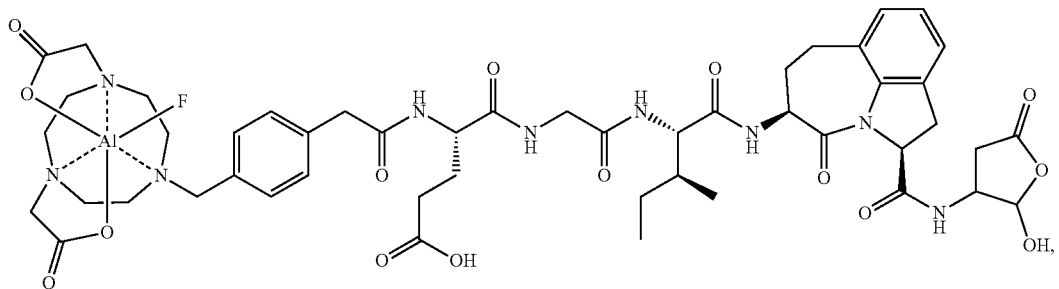
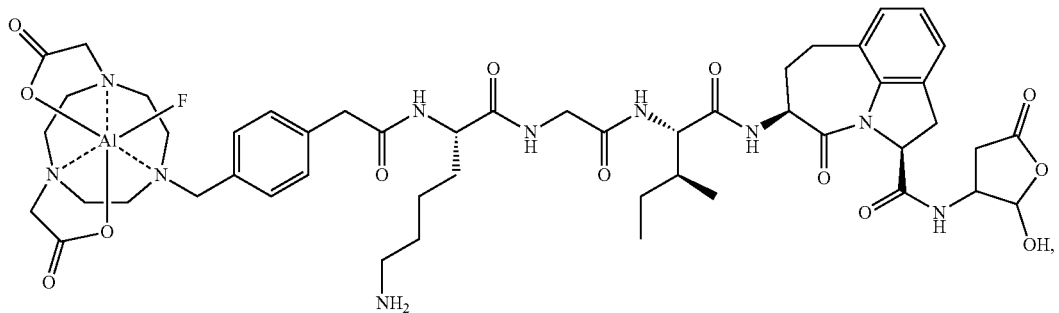
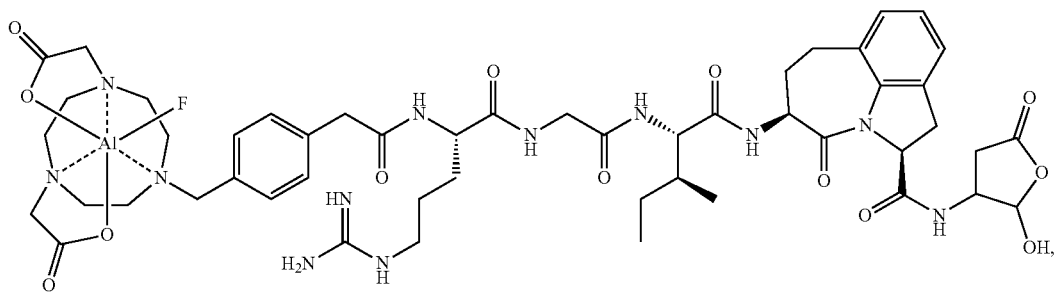
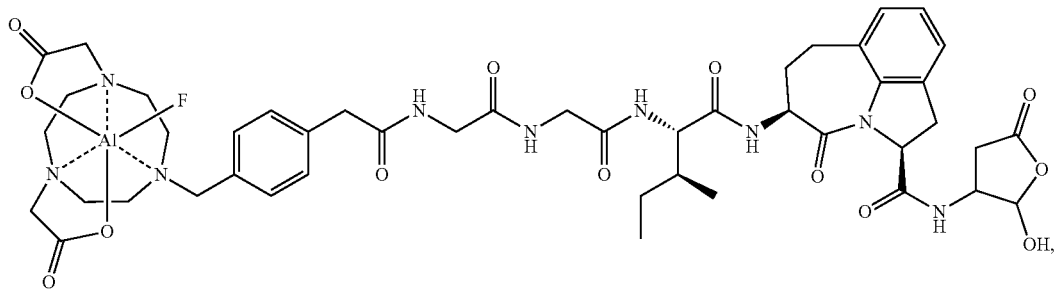

-continued
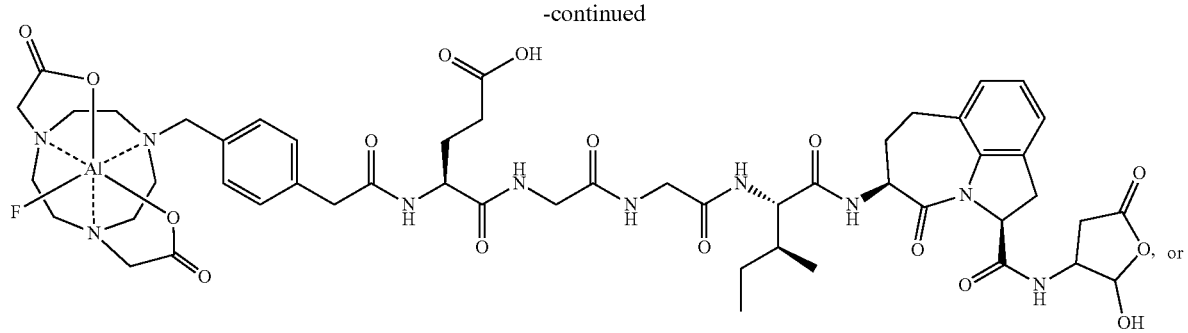
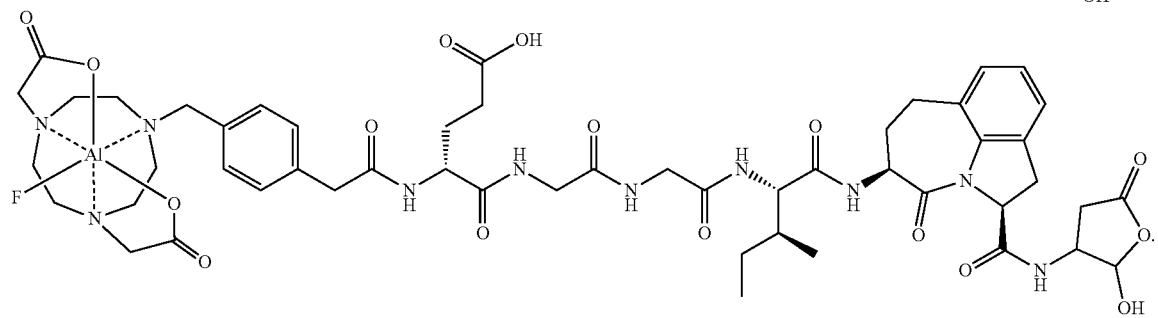
20. The compound, or a pharmaceutically acceptable salt thereof, of claim 19, wherein the compound is:
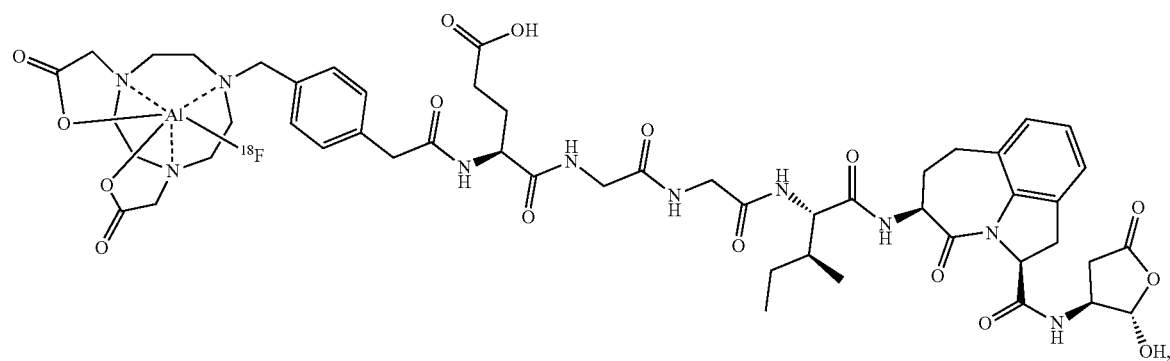
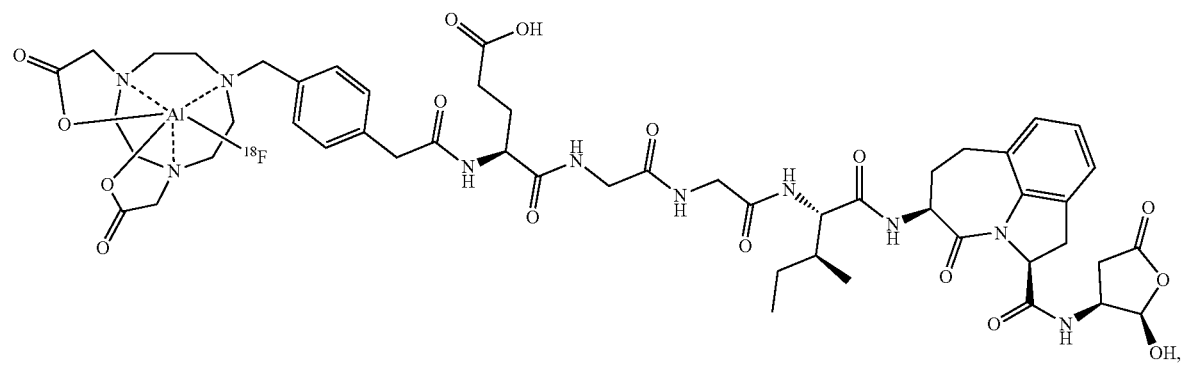

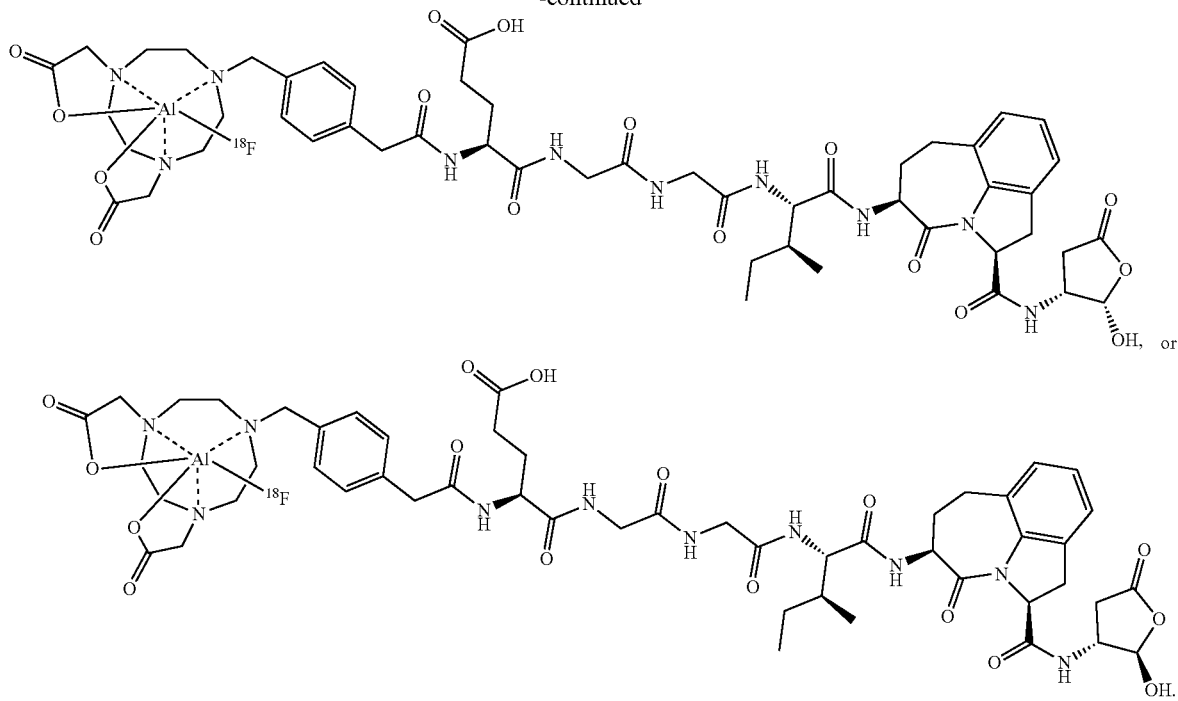

21. A pharmaceutical composition comprising a compound of claim 10, a stereoisomer thereof, or a pharmaceutically acceptable salt thereof, and a pharmaceutically acceptable carrier.

22. A kit comprising:
(i) a compound, or a pharmaceutically acceptable salt thereof, of claim 10 and
(ii) one or more additional therapeutic agents.

23. A method of treating an immunoregulatory abnormality in a subject in need thereof, the method comprising administering to said subject the compound of claim 10 and one or more additional therapeutic agent in an amount effective for treating said immunoregulatory abnormality.

24. A method of imaging granzyme B in a cell or tissue, a sample, a cell or tissue sample, the method comprising:
contacting the cell or tissue, the sample, the cell or tissue sample with a compound of claim 10, or a pharmaceutically acceptable salt thereof, and
imaging the cell or tissue, the sample, the cell or tissue sample with a suitable imaging technique, thereby imaging granzyme B in the cell or tissue, the sample, the cell or tissue sample;
wherein the compound contains a radioisotope, which optionally is $^{18}F$ or $^{68}Ga$.

25. A method of treating an immunoregulatory abnormality in a subject in need thereof, the method comprising administering to said subject a compound of claim 10, or a pharmaceutically acceptable salt thereof, in an amount effective for treating said immunoregulatory abnormality.

26. A method of monitoring an immune response in the treatment of a disease in a subject, the method comprising administering to the subject an effective amount of the compound of claim 10, or a pharmaceutically acceptable salt thereof, and imaging the subject with a suitable imaging technique.

* * * * *